US009818156B2

(12) United States Patent
Quinton

(10) Patent No.: US 9,818,156 B2
(45) Date of Patent: Nov. 14, 2017

(54) MULTIPLE MODULAR ASSET CONSTRUCTOR APPARATUSES, METHODS AND SYSTEMS

(71) Applicant: FMR LLC, Boston, MA (US)

(72) Inventor: Keith Quinton, Hanover, NH (US)

(73) Assignee: FMR LLC, Boston, MA (US)

( * ) Notice: Subject to any disclaimer, the term of this patent is extended or adjusted under 35 U.S.C. 154(b) by 388 days.

(21) Appl. No.: 14/601,061

(22) Filed: Jan. 20, 2015

(65) Prior Publication Data
US 2016/0210696 A1 Jul. 21, 2016

(51) Int. Cl.
G06Q 40/08 (2012.01)
G06Q 40/06 (2012.01)
(52) U.S. Cl.
CPC .................... G06Q 40/06 (2013.01)
(58) Field of Classification Search
None
See application file for complete search history.

(56) References Cited

U.S. PATENT DOCUMENTS 8,595,116 B1 * 11/2013 Bettinger, II .......... G06Q 40/04
705/36 R
2005/0108146 A1 * 5/2005 Bond .................... G06Q 40/06
705/37
2010/0057636 A1 * 3/2010 Brennan ................ G06Q 40/06
705/36 R

* cited by examiner

Primary Examiner — Robert R Niquette
(74) Attorney, Agent, or Firm — Hanchuk Kheit LLP; Walter G. Hanchuk

(57) ABSTRACT

The Multiple Modular Asset Class Constructor Apparatuses, Methods and Systems ("MMACC") transforms collateralized equity obligation structure parameters, asset search, tranche selections inputs via MMACC components into asset income distribution message, principal distribution message outputs. In one embodiment, the MMACC is an apparatus, with a memory having a component collection, including: a capital structure component, a preferred share class component, and a common share class component. The MMACC also has a processor to issue instructions from the component collection including instructions to obtain a capital structure input via said capital structure component from a system user and determine a preferred share class allocation via said capital structure input and said preferred share class component. The MMACC may use the preferred share class allocation derived from said capital structure input and said preferred share class component and determine a common share class allocation via said capital structure input and said common share class component. The MMACC may also output said common share class allocation derived from said capital structure input and said common share class component.

6 Claims, 25 Drawing Sheets

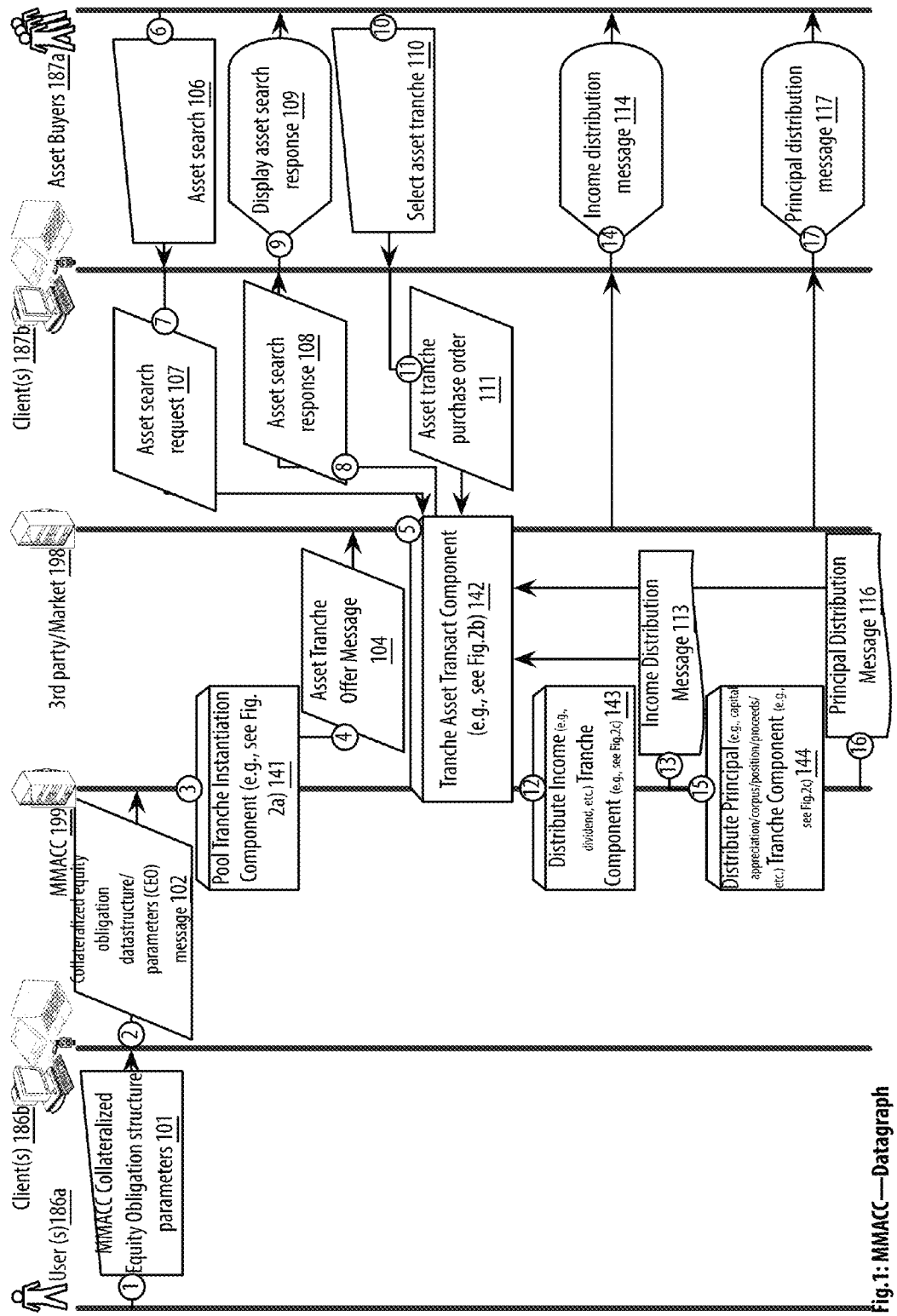

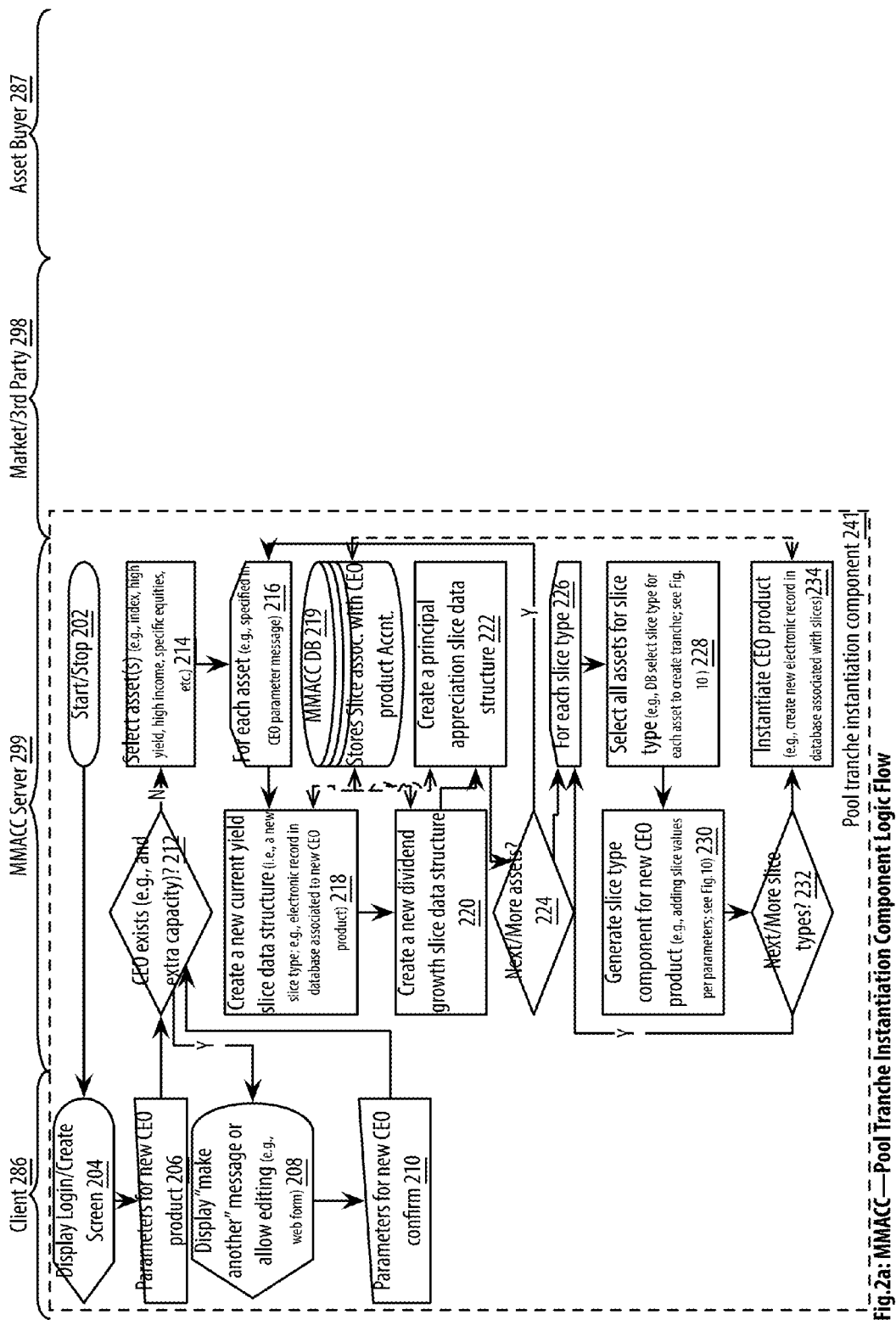
Fig.2a: MMACC—Pool Tranche Instantiation Component Logic Flow

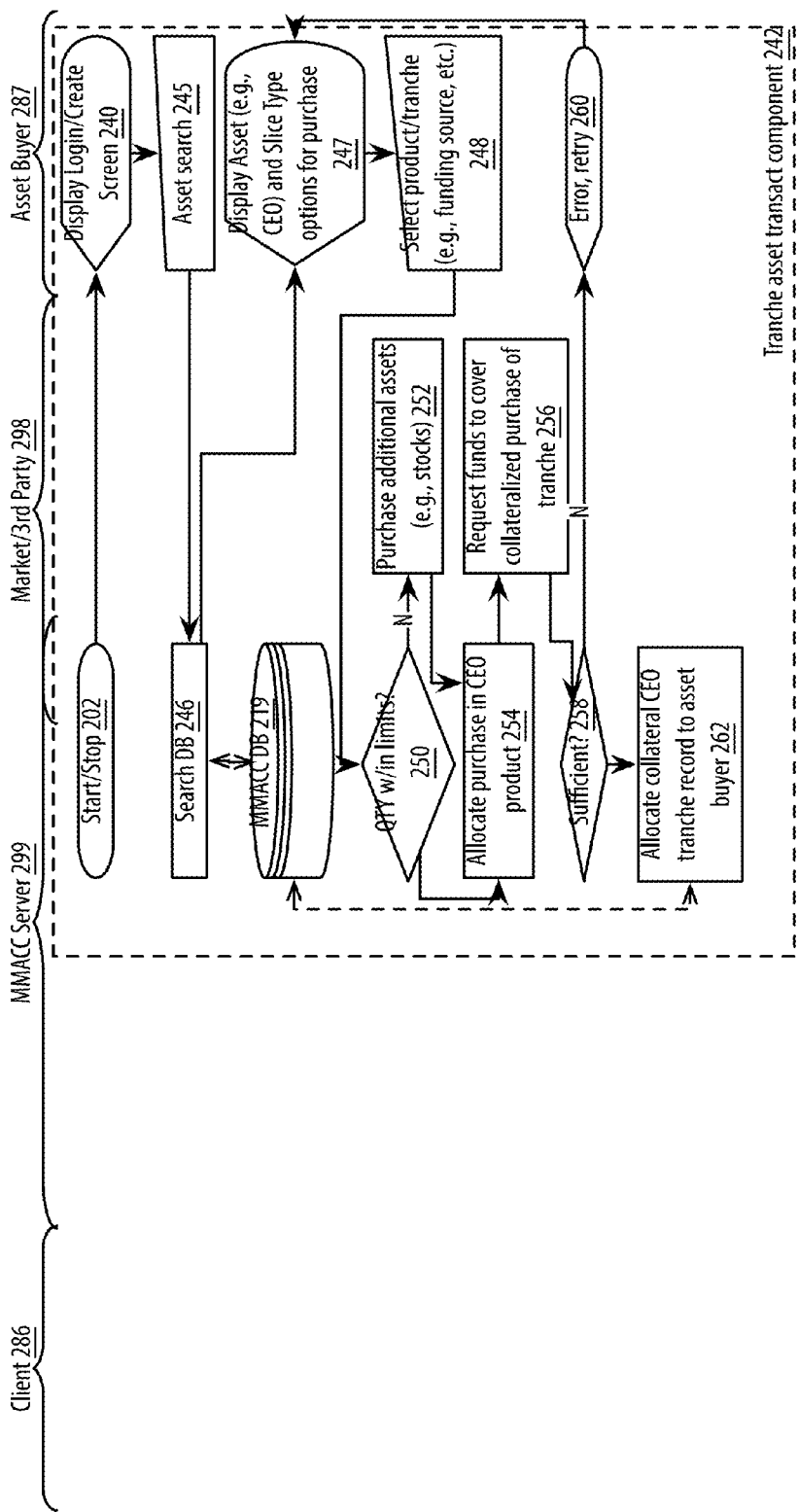
Fig.2b: MMACC—Transact Component Logic Flow

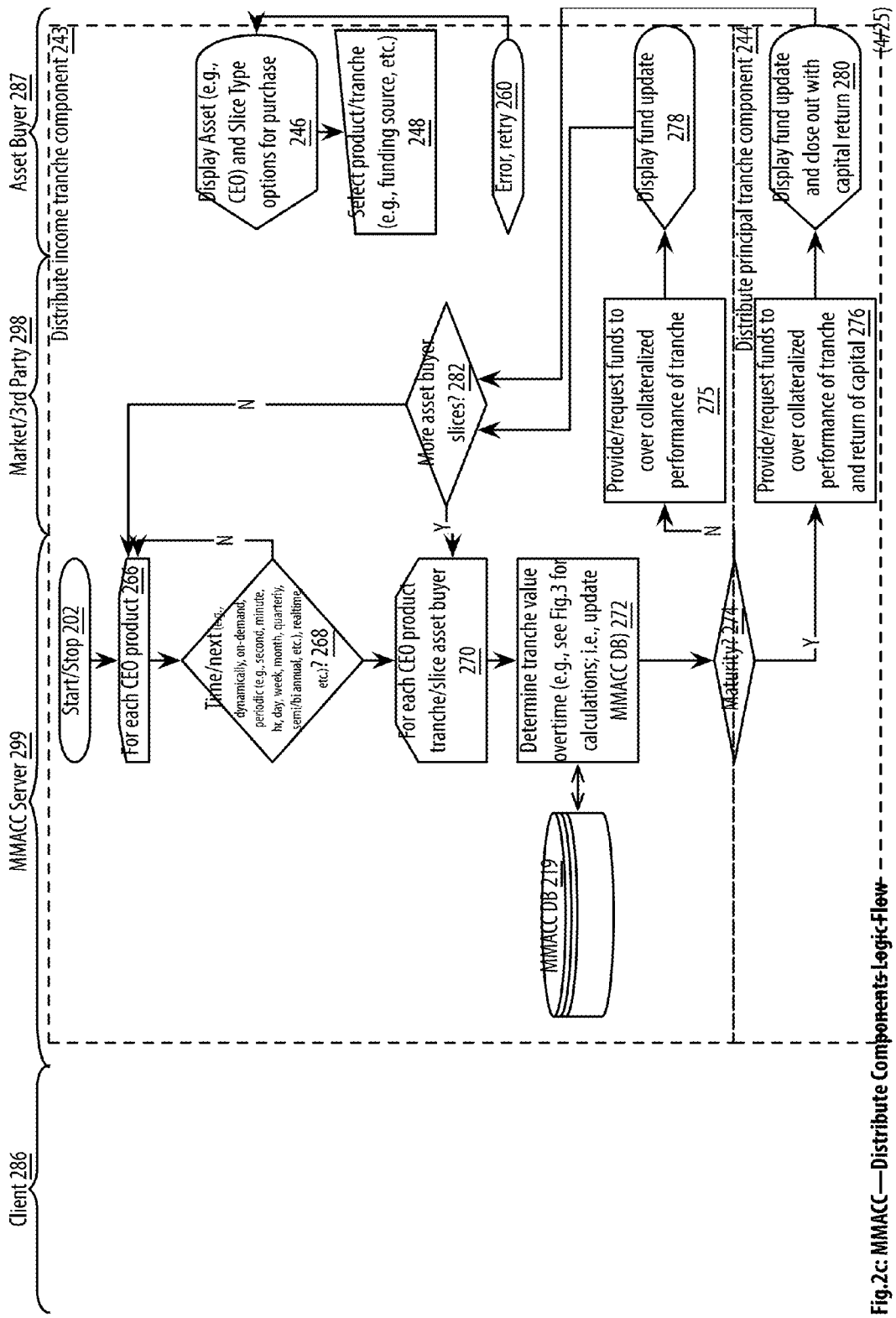
Fig.2c: MMACC—Distribute Components-Logic-Flow

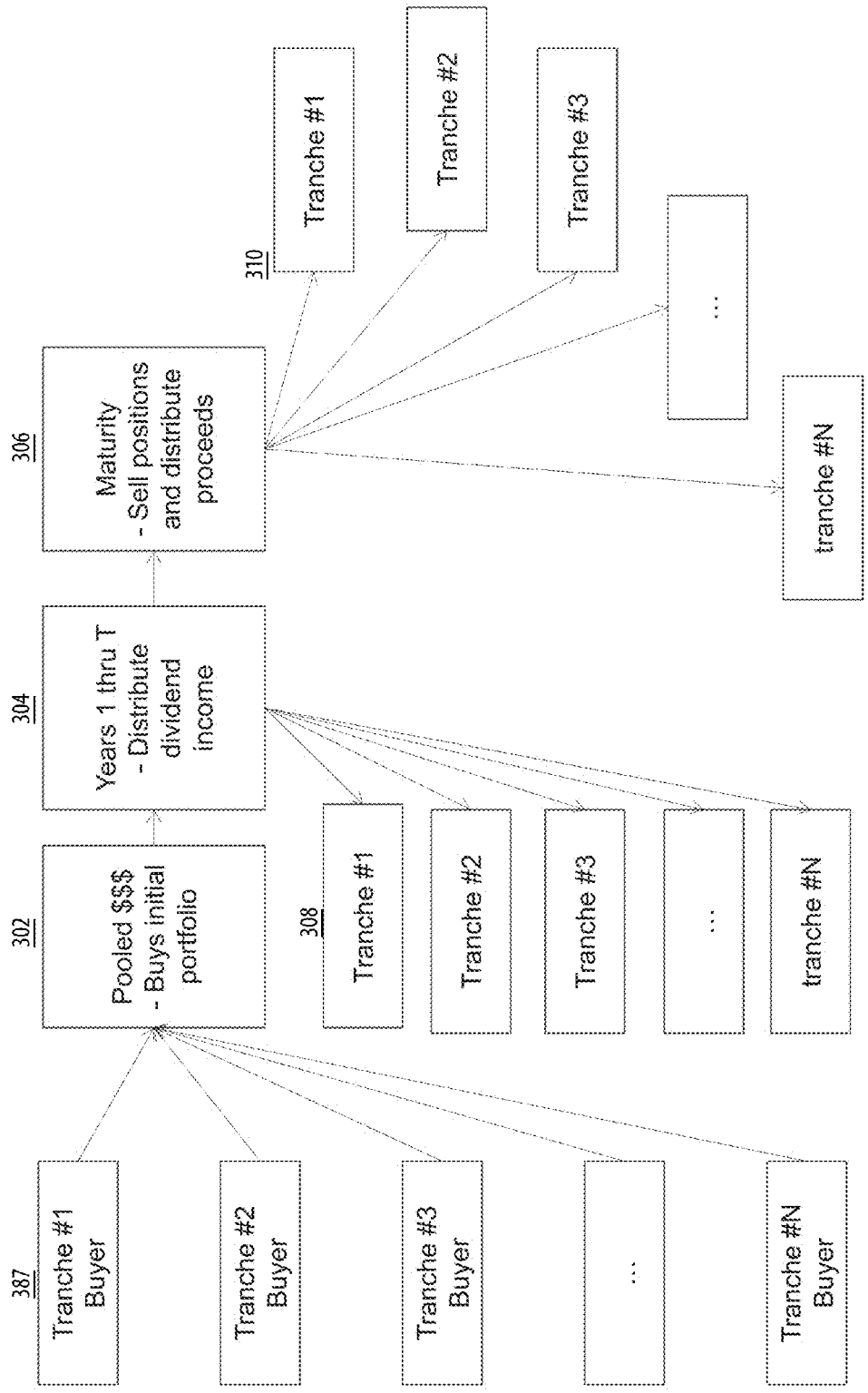
Fig.3: MMACC—Datagraph/Structure

| | Portfolio Dividend Income | Dividend Allocation | | |
|---|---|---|---|---|
| | | Tranche 1 | Tranche 2 | Tranche 3 |
| 2009 | 8,044,745 | $3,100,000 | $3,100,000 | $1,844,745 |
| 2010 | 8,287,523 | $3,100,000 | $3,100,000 | $2,087,523 |
| 2011 | 10,444,385 | $3,100,000 | $4,244,385 | $3,100,000 |
| 2012 | 13,651,874 | $3,100,000 | $7,451,874 | $3,100,000 |
| 2013 | 14,405,821 | $3,100,000 | $8,205,821 | $3,100,000 |
| Total: | | $15,500,000 | $26,102,079 | $13,232,268 |

| | Portfolio Market Value | Market Value Allocation | | |
|---|---|---|---|---|
| | | Tranche 1 | Tranche 2 | Tranche 3 |
| 2013 | $595,740,879 | $100,000,000 | $100,000,000 | $395,740,879 |
| 5 Year Simple Return: | | 15.5% | 26.1% | 309.0% |
| Annual IRR: | | 3.1% | 5.1% | 33.2% |

Fig. 4: MMACC—Example CEO Parameters 2008 Vintage

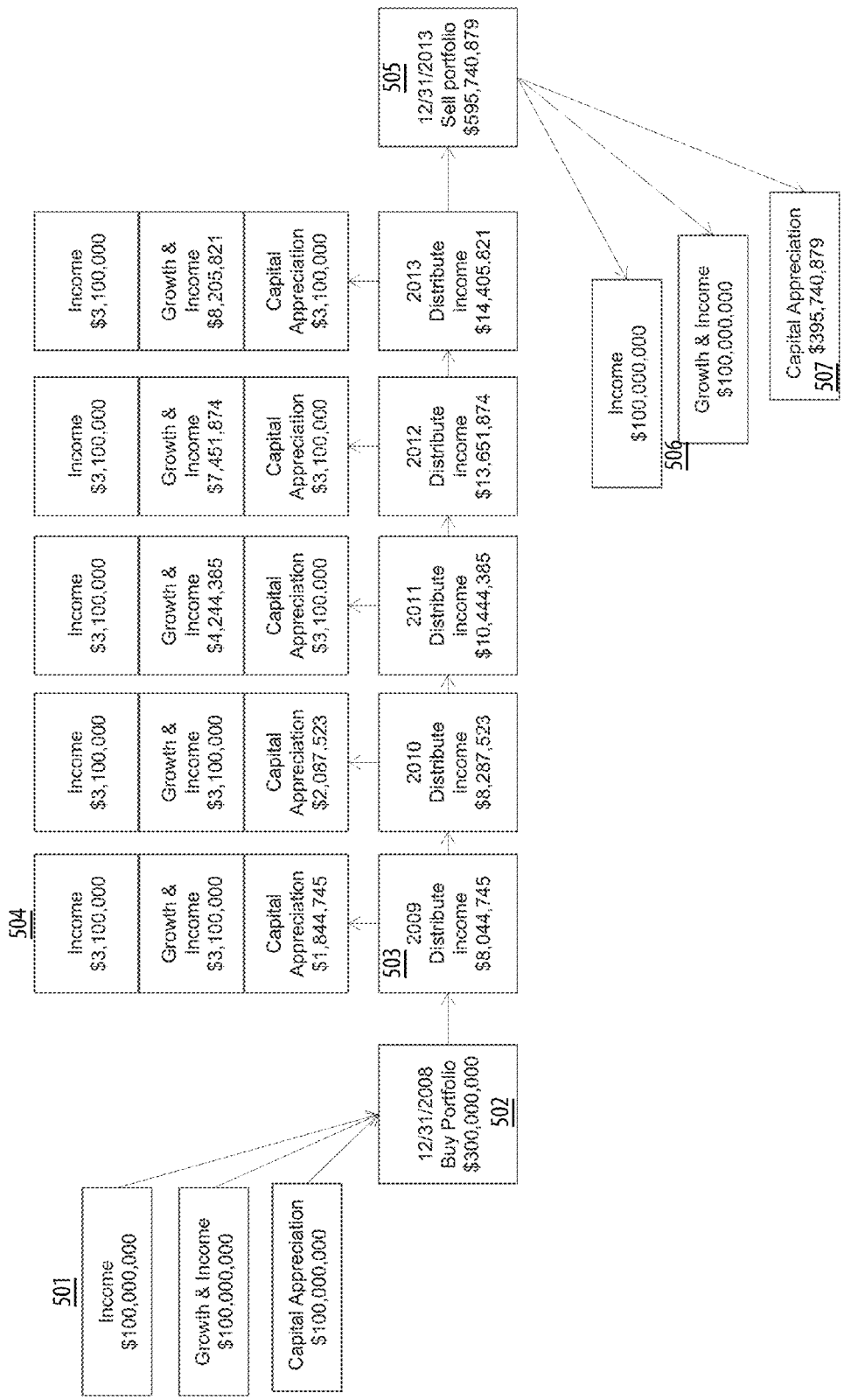
Fig.5: MMACC—2008 Vintage Flowchart

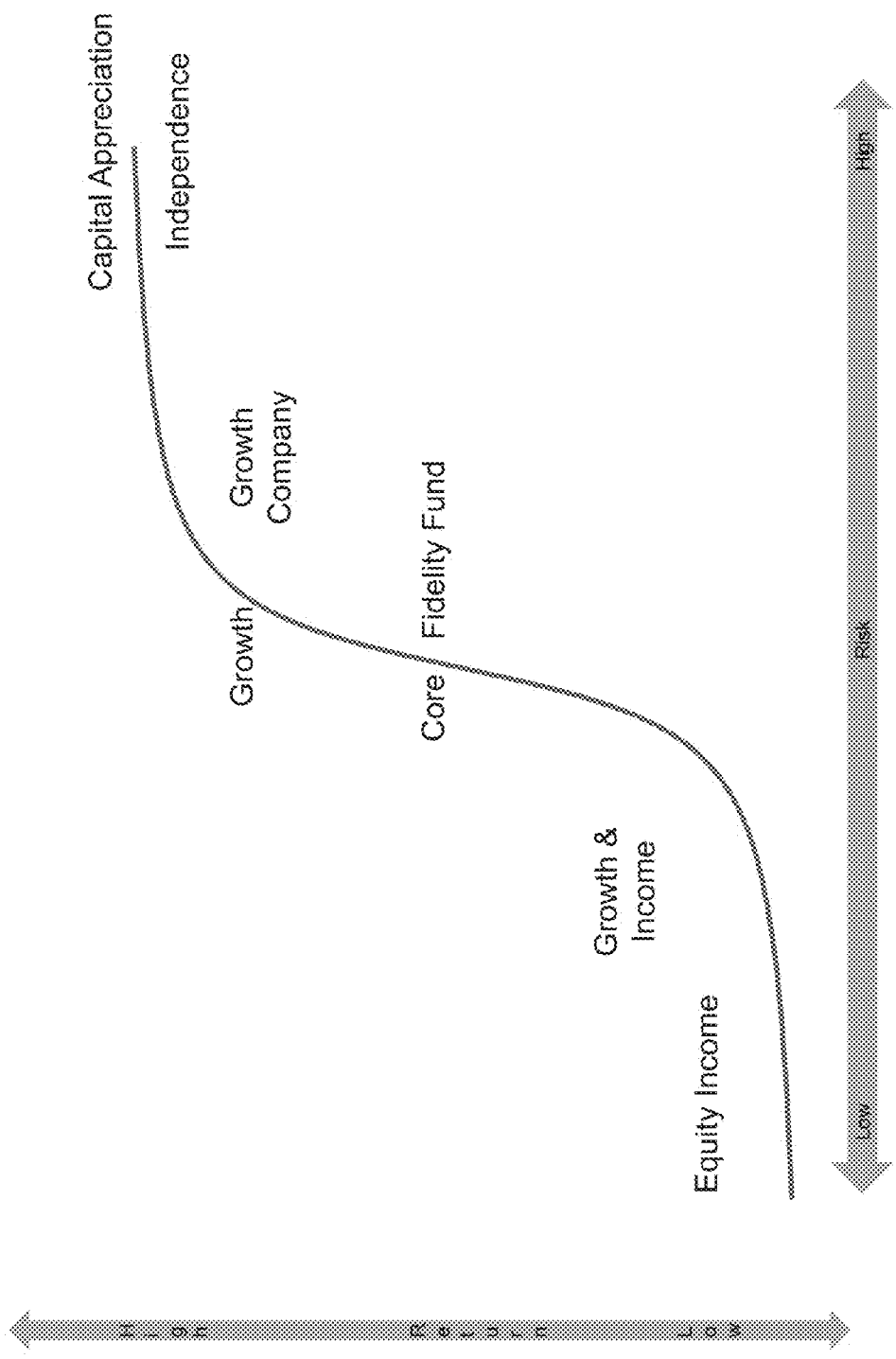
Fig.6: MMACC—Equity Product Line

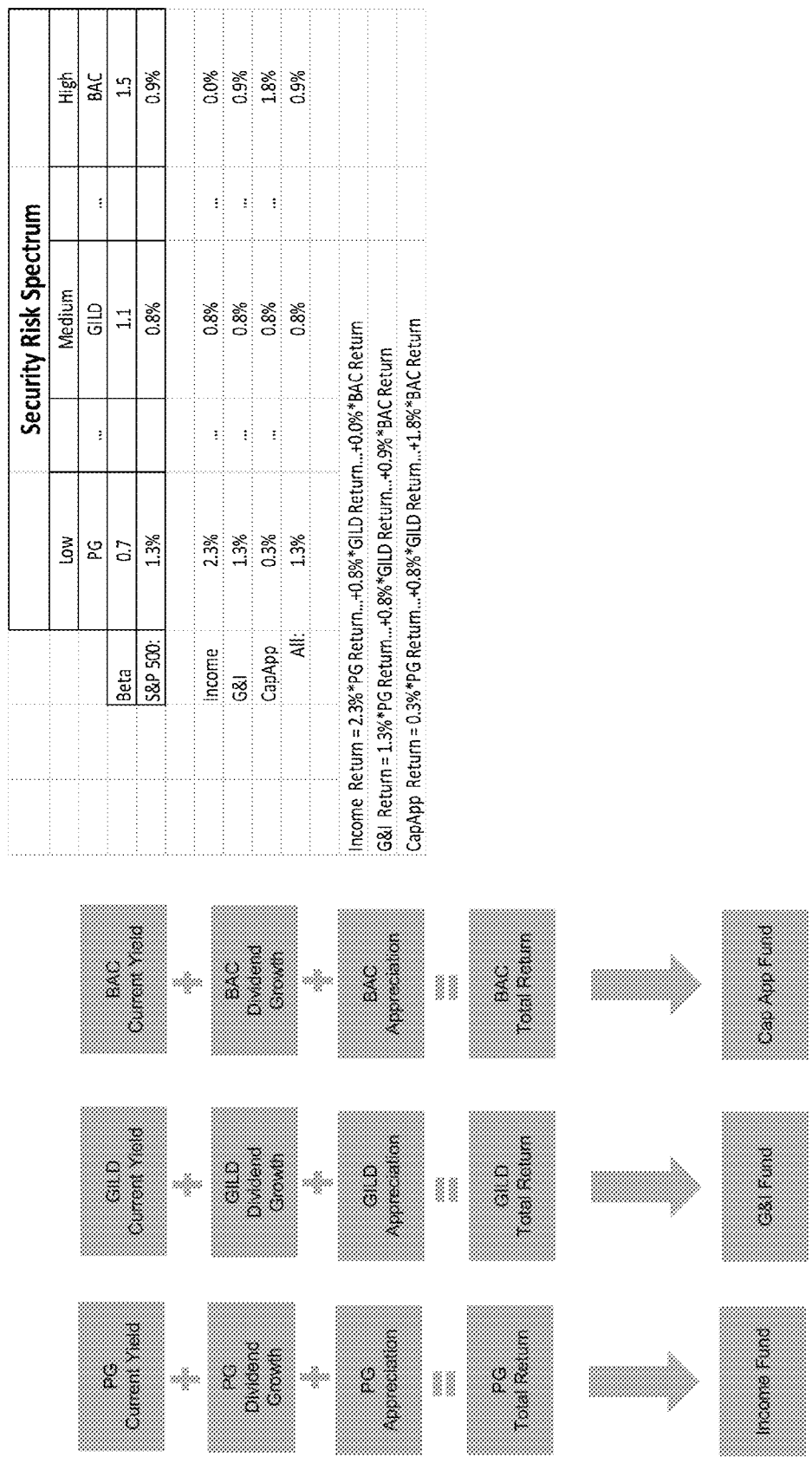
Fig. 7: MMACC—Equity Process

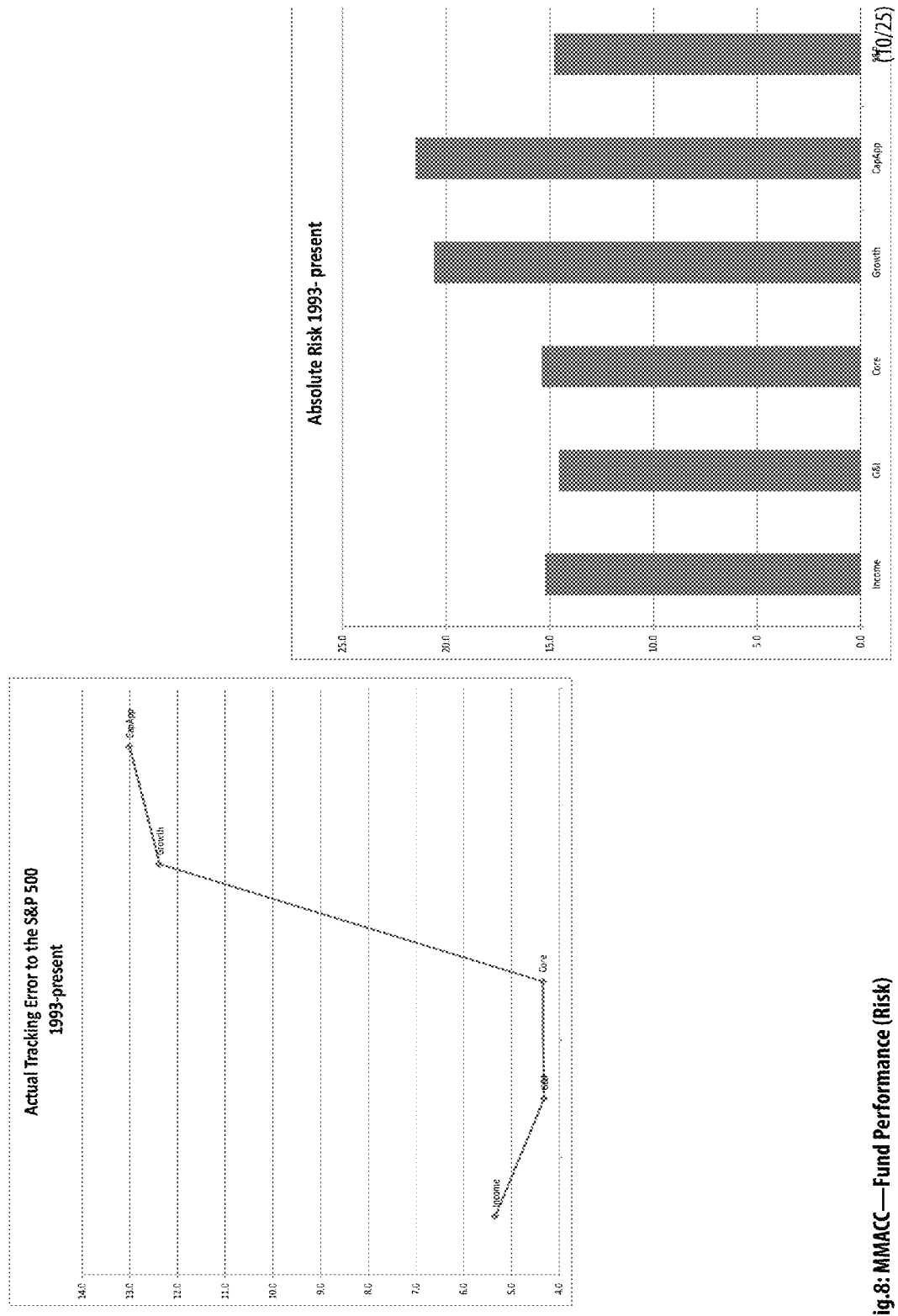
Fig.8: MMACC—Fund Performance (Risk)

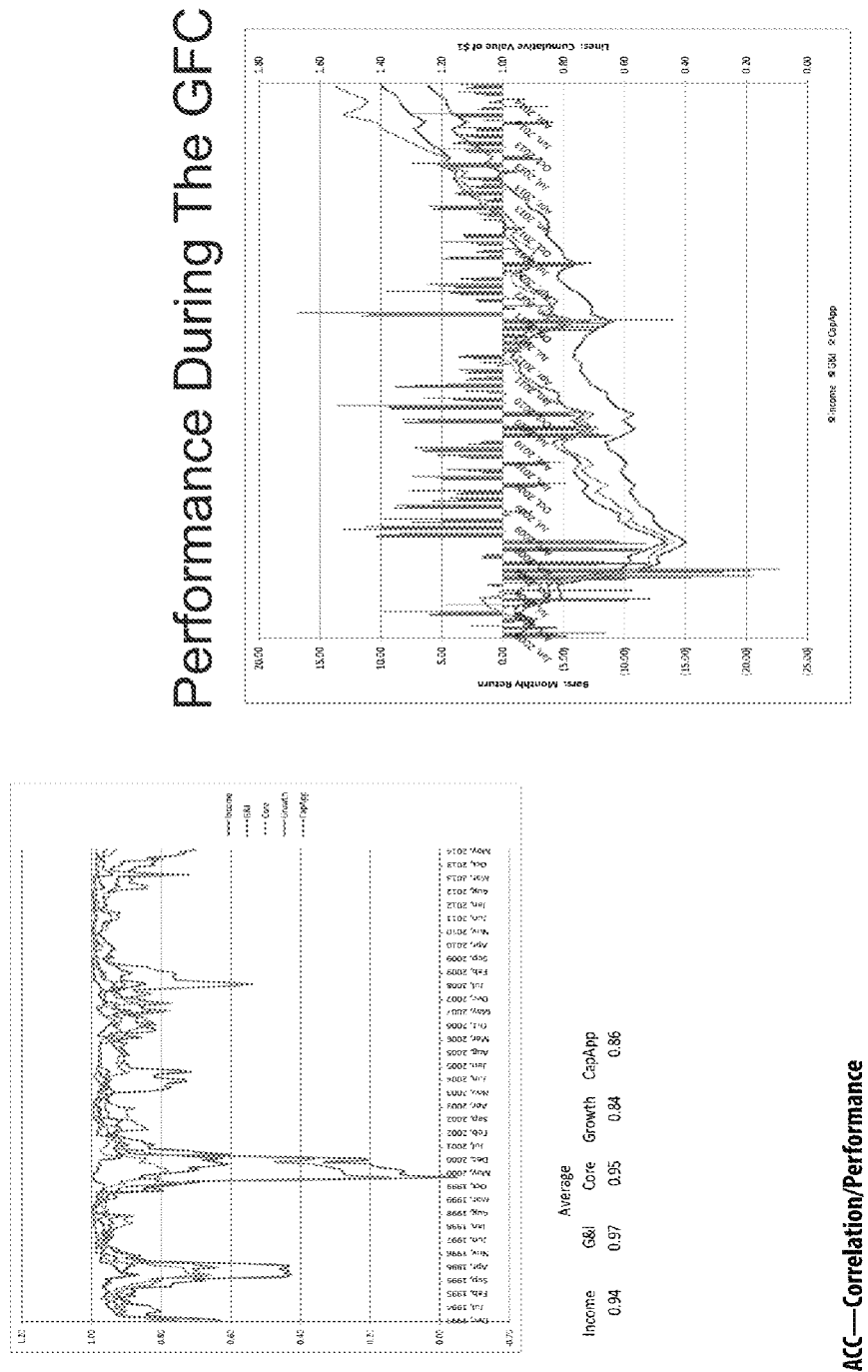
Fig.9: MMACC—Correlation/Performance

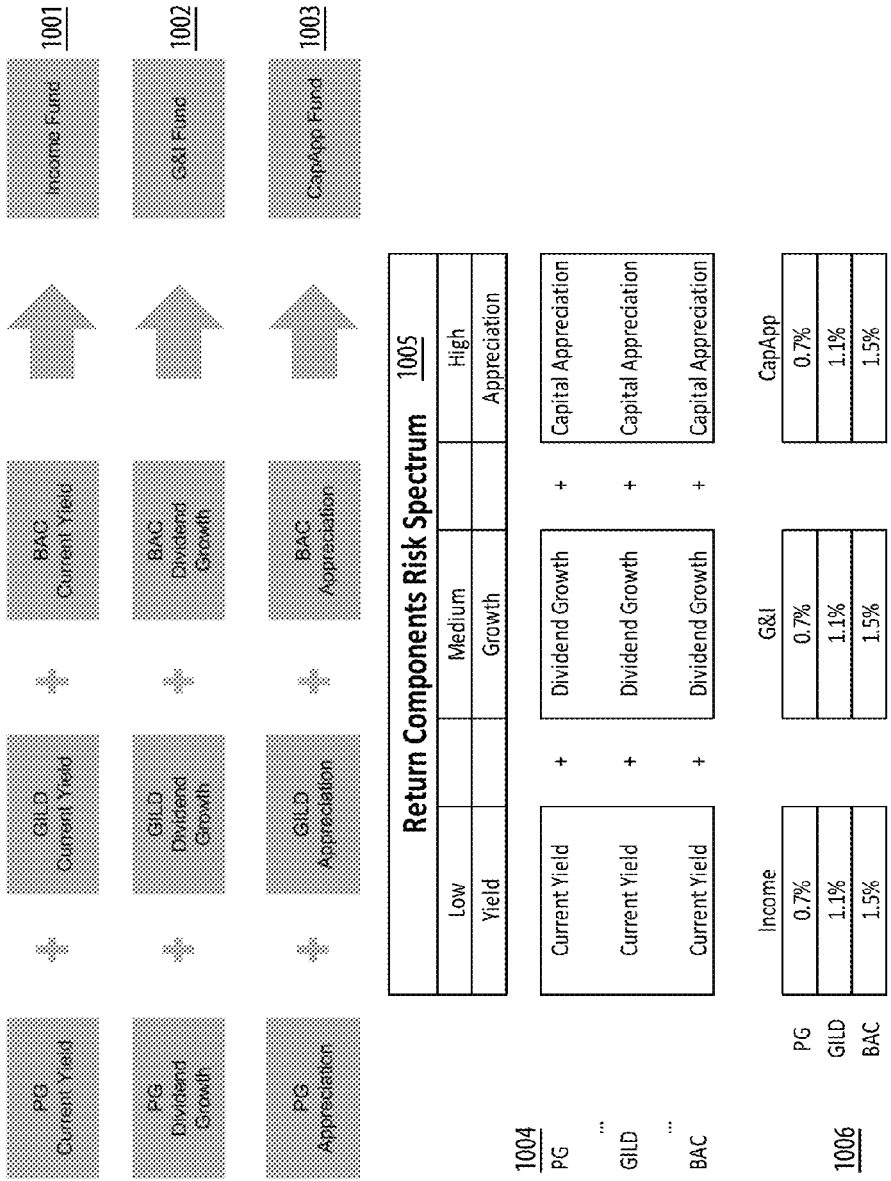
Fig. 10: MMACC—MMACC Structure

$300 MM Sold at 4% Yield

| | 0 | 1 | 2 | 3 | 4 | 5 | Total Return 1 | 2 | 3 | 4 | 5 | Overall | Average | STD | Sharpe |
|---|---|---|---|---|---|---|---|---|---|---|---|---|---|---|---|
| Index Price | 100 | 105 | 100 | 95 | 102 | 110 | | | | | | | | | |
| Index Yield | | 4.0% | 4.4% | 4.8% | 3.9% | 4.4% | | | | | | | | | |
| Portfolio | | | | | | | | | | | | | | | |
| Dividend income | | 12,000,000 | 13,860,000 | 14,400,000 | 11,115,000 | 13,464,000 | | | | | | | | | |
| Value | 300,000,000 | 315,000,000 | 300,000,000 | 285,000,000 | 306,000,000 | 330,000,000 | 9.0% | -0.4% | -0.2% | 11.3% | 12.2% | 31.6% | 6.4% | 6.2% | 1.03 |
| Income tranche | | | | | | | | | | | | | | | |
| Dividend income | | 4,000,000 | 4,000,000 | 4,000,000 | 4,000,000 | 4,000,000 | | | | | | | | | |
| Value | 100,000,000 | 100,000,000 | 100,000,000 | 100,000,000 | 100,000,000 | 100,000,000 | 4.0% | 4.0% | 4.0% | 4.0% | 4.0% | 20.0% | 4.0% | 0.0% | n.m. |
| Portfolio ex-Income | | | | | | | | | | | | | | | |
| Dividend income | | 8,000,000 | 9,860,000 | 10,400,000 | 7,115,000 | 9,464,000 | | | | | | | | | |
| Value | 200,000,000 | 215,000,000 | 200,000,000 | 185,000,000 | 206,000,000 | 230,000,000 | 11.5% | -2.4% | -2.3% | 15.2% | 16.2% | 37.4% | 7.7% | 9.3% | 0.82 |
| G&I Tranche | | | | | | | | | | | | | | | |
| Dividend income | | 4,000,000 | 5,860,000 | 6,400,000 | 4,000,000 | 5,464,000 | | | | | | | | | |
| Value | 100,000,000 | 100,000,000 | 100,000,000 | 100,000,000 | 100,000,000 | 100,000,000 | 4.0% | 5.9% | 6.4% | 4.0% | 5.5% | 25.7% | 5.1% | 1.1% | 4.69 |
| Portfolio ex-Income; ex-G&I (= Capp App) | | | | | | | | | | | | | | | |
| Dividend income | | 4,000,000 | 4,000,000 | 4,000,000 | 3,115,000 | 4,000,000 | | | | | | | | | |
| Value | 100,000,000 | 115,000,000 | 100,000,000 | 85,000,000 | 106,000,000 | 130,000,000 | 19.0% | -9.6% | -11.0% | 28.4% | 26.4% | 49.1% | 10.6% | 19.4% | 0.55 |

Fig. 11: MMACC — MMACC Hypothetical

1970 Tranche

| | Sold at: | 3.5% | Start | 1971 | 1972 | 1973 | 1974 | 1975 | | | Total Return | | | Overall | Average | STD | Sharpe |
|---|---|---|---|---|---|---|---|---|---|---|---|---|---|---|---|---|---|
| | | | | | | | | | 1 | 2 | 3 | 4 | 5 | | | | |
| | Index Price | | 92.15 | 102.09 | 118.05 | 97.55 | 68.56 | 90.19 | | | | | | | | | |
| | Index Dividend | | $3.19 | $3.16 | $3.19 | $3.61 | $3.72 | $3.73 | | | | | | | | | |
| | Index Yield | | 3.5% | 3.1% | 2.7% | 3.7% | 5.4% | 4.1% | | | | | | | | | |
| Portfolio | | | | | | | | | | | | | | | | | |
| | Income | | | 10,303,169 | 10,376,614 | 11,750,461 | 12,119,831 | 12,155,831 | 3.4% | 3.1% | 3.1% | 3.8% | 5.4% | 16.8% | 6.0% | 25.6% | 0.23 |
| 3,255,552 | Value | 300,000,000 | | 332,360,282 | 384,319,045 | 317,580,033 | 223,201,302 | 293,619,099 | 14.2% | 18.8% | -14.3% | -25.9% | 37.0% | | | | |
| 30.0% Income tranche | | | | | | | | | | | | | | | | | |
| | Income | | | 3,114,000 | 3,114,000 | 3,114,000 | 3,114,000 | 3,114,000 | 3.5% | 3.5% | 3.5% | 3.5% | 3.5% | 17.3% | 3.5% | 0.0% | n.m. |
| 976,668 | Value | 90,000,000 | | 90,000,000 | 90,000,000 | 90,000,000 | 90,000,000 | 90,000,000 | 3.5% | 3.5% | 3.5% | 3.5% | 3.5% | | | | |
| Portfolio ex-income | | | | | | | | | | | | | | | | | |
| | Income | | | 7,189,169 | 7,262,614 | 8,636,461 | 9,005,831 | 9,041,831 | 3.4% | 3.0% | 2.9% | 4.0% | 6.8% | 16.6% | 9.1% | 38.4% | 0.24 |
| | Value | 210,000,000 | | 242,360,282 | 294,319,045 | 227,580,033 | 133,201,302 | 203,619,099 | 18.8% | 24.4% | -19.7% | -37.5% | 59.7% | | | | |
| 30.0% G&I Tranche | | | | | | | | | | | | | | | | | |
| | Income | | | 3,114,000 | 3,114,000 | 4,484,461 | 4,853,831 | 4,889,831 | 3.5% | 3.5% | 5.0% | 5.4% | 5.4% | 22.7% | 4.5% | 1.0% | 4.52 |
| 976,668 | Value | 90,000,000 | | 90,000,000 | 90,000,000 | 90,000,000 | 90,000,000 | 90,000,000 | 3.5% | 3.5% | 5.0% | 5.4% | 5.4% | | | | |
| 40.0% CapApp Tranche | | | | | | | | | | | | | | | | | |
| | Income | | | 4,075,169 | 4,148,614 | 4,152,000 | 4,152,000 | 4,152,000 | 3.4% | 2.7% | 2.0% | 3.0% | 9.6% | 11.9% | 28.7% | 81.5% | 0.35 |
| 1,302,225 | Value | 120,000,000 | | 152,360,282 | 204,319,045 | 137,580,033 | 43,201,302 | 113,619,099 | 30.4% | 36.8% | -30.6% | -65.6% | 172.6% | | | | |

Fig. 12: MMACC—MMACC Actual

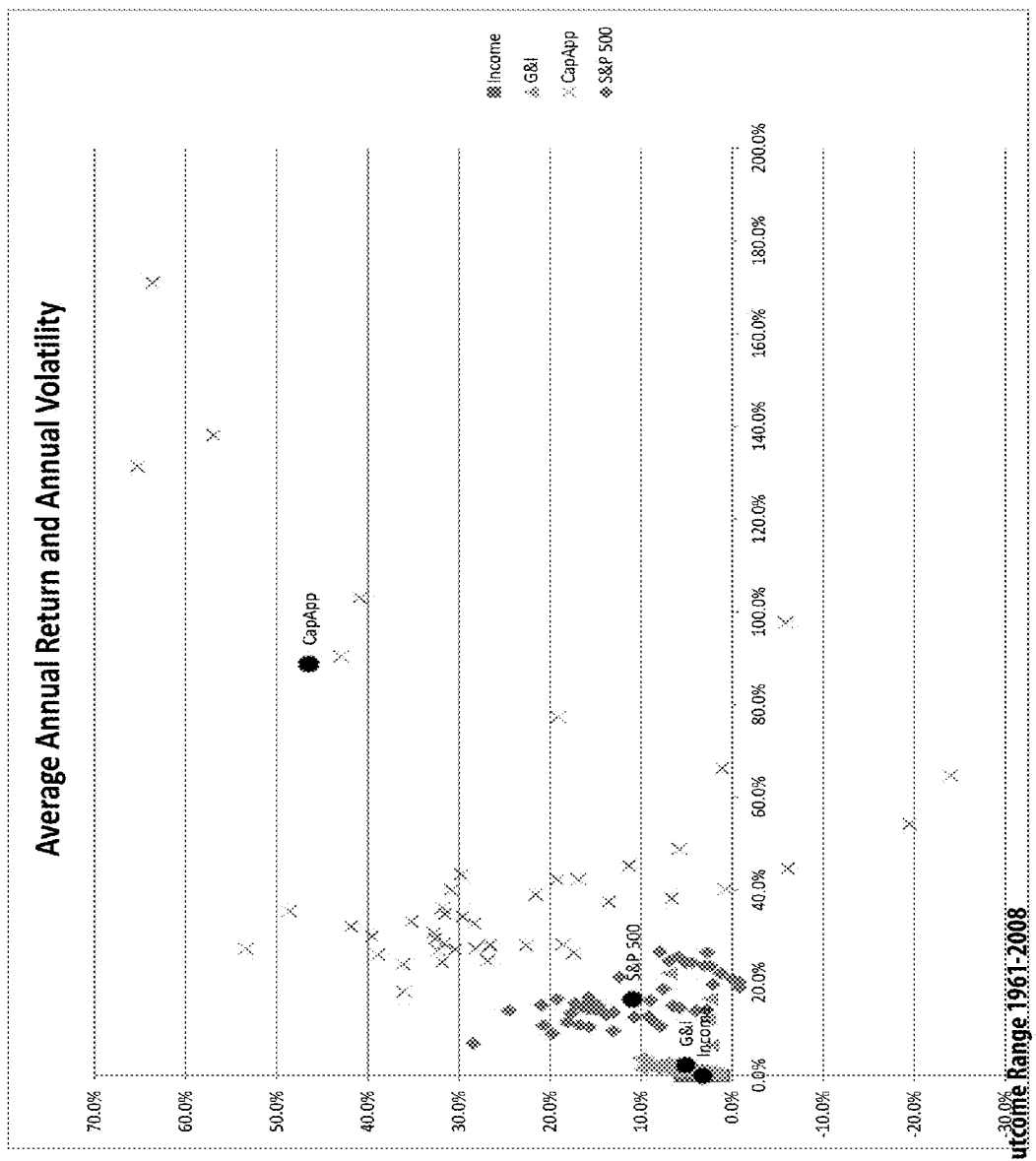
Fig. 13: MMACC—Outcome Range 1961-2008

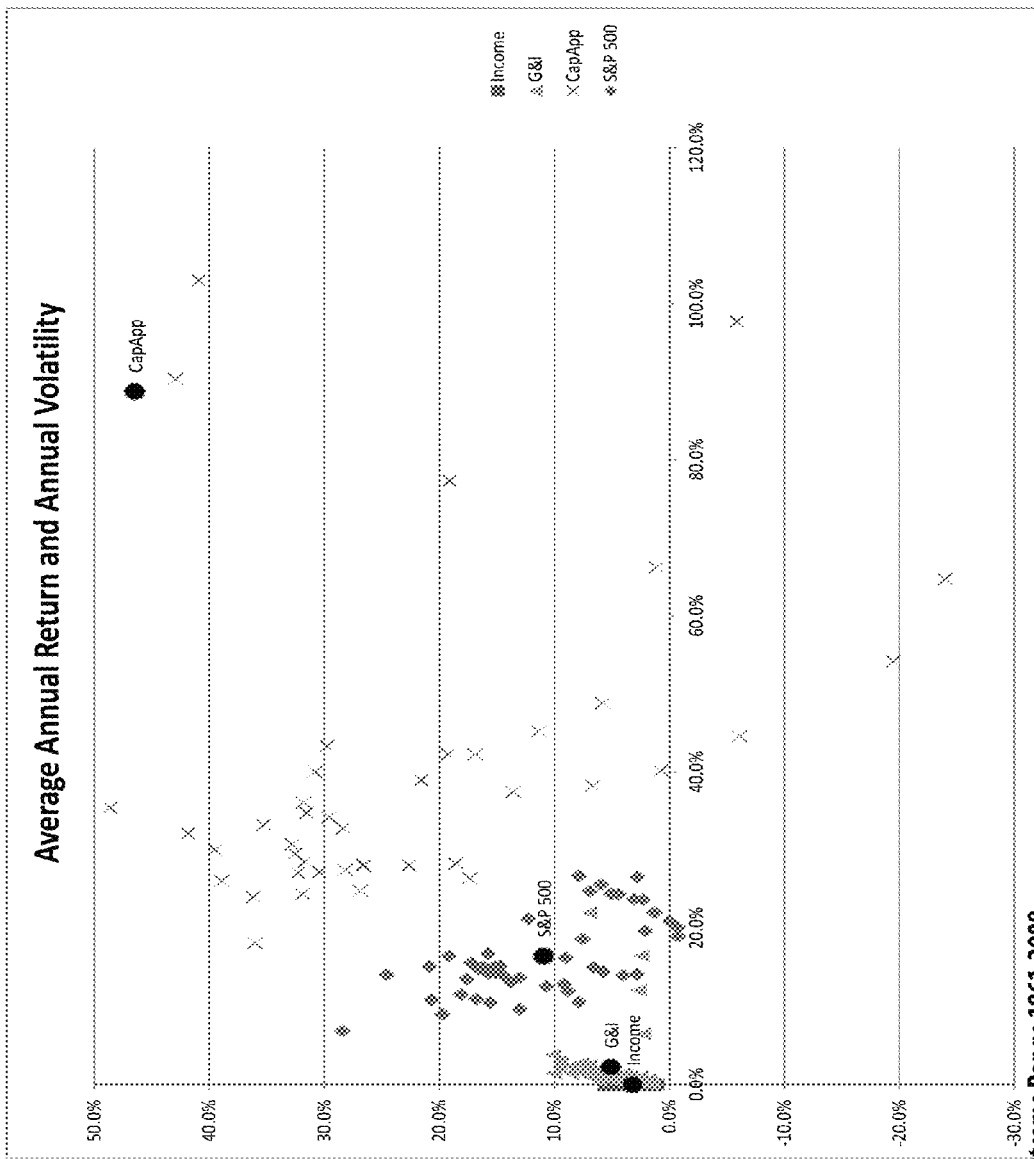
Fig.14: MMACC—Outcome Range 1961-2008

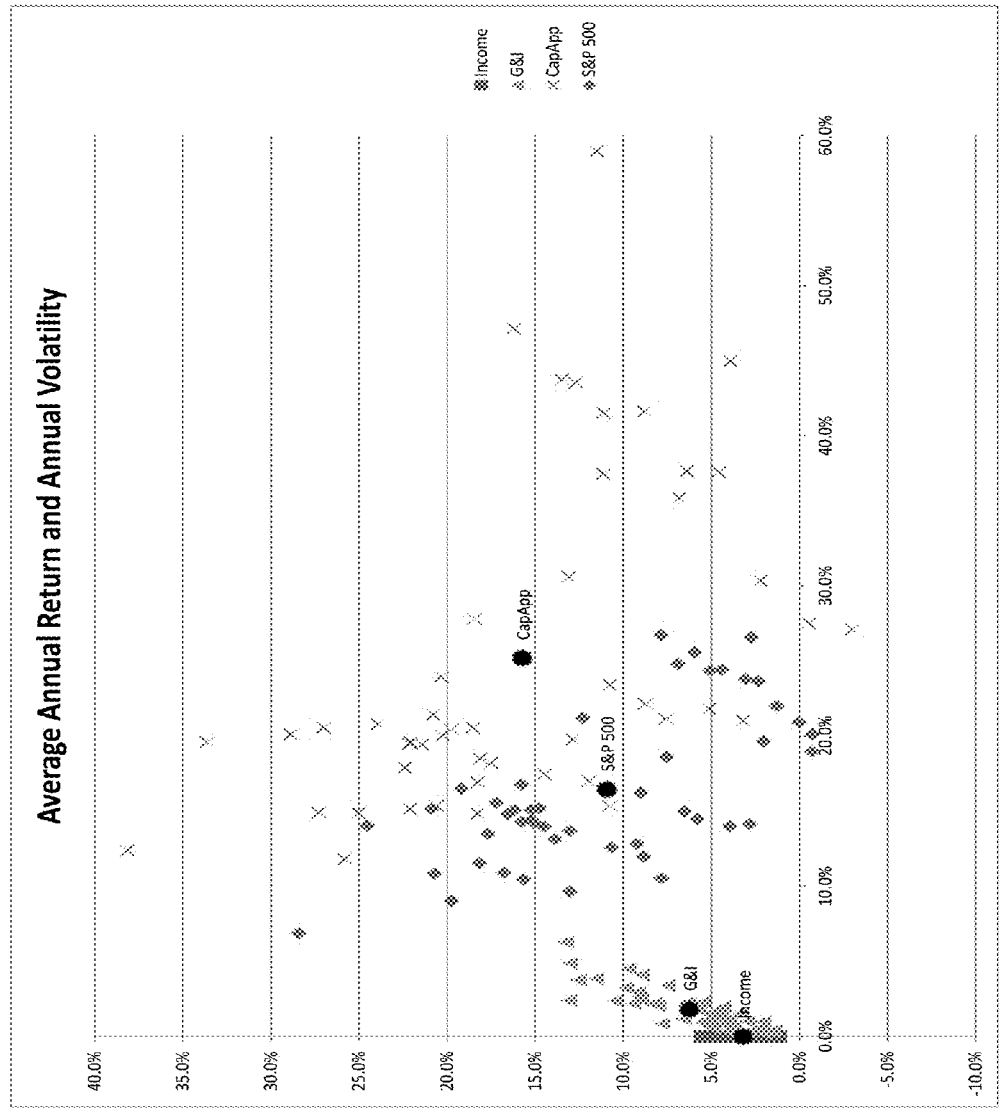
Fig.15: MMACC—Shift Risk Change Allocation 33:33:33 to 20:20:60

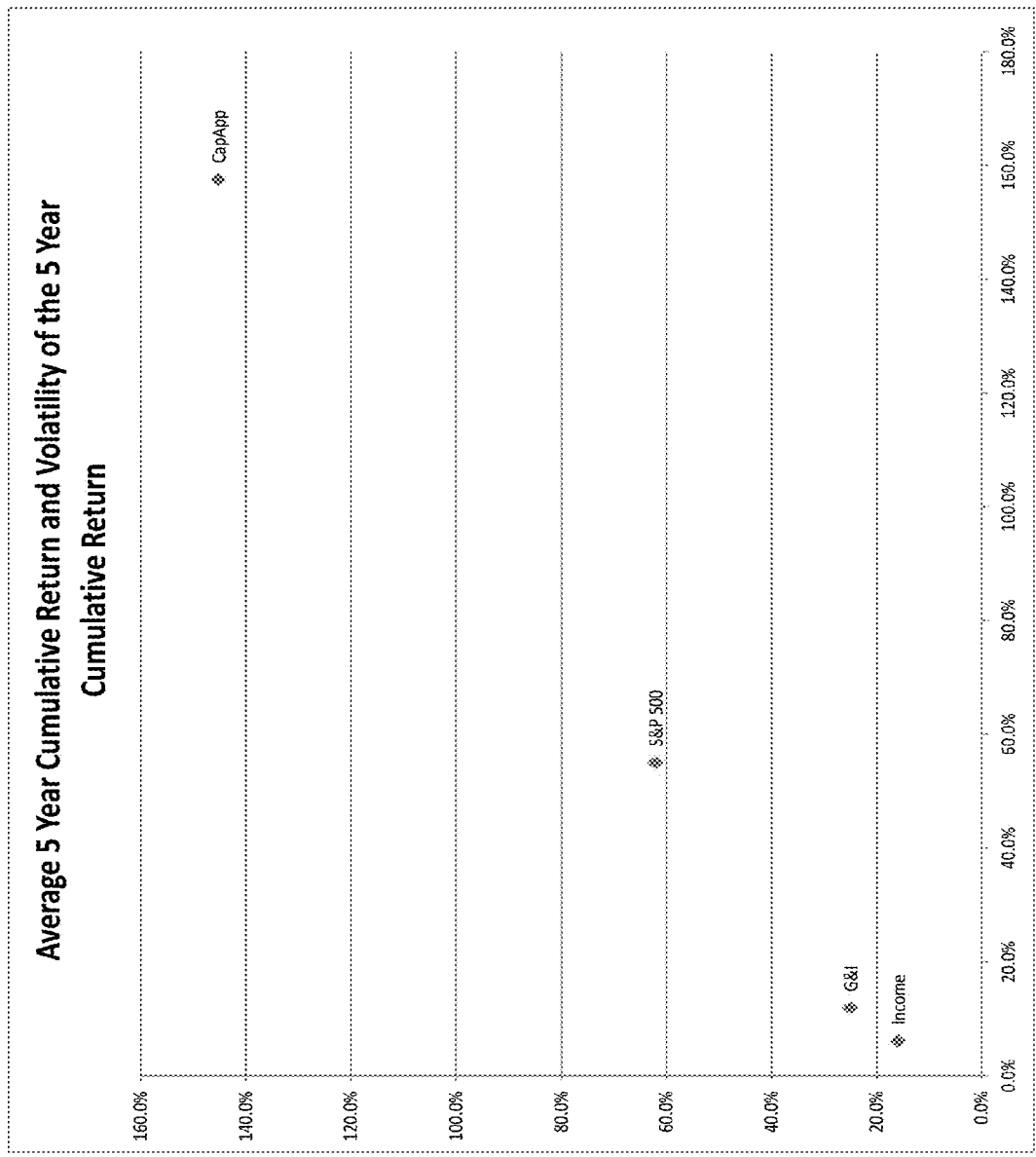
Fig.16: MMACC—5 Yr Outcomes 1961-2008

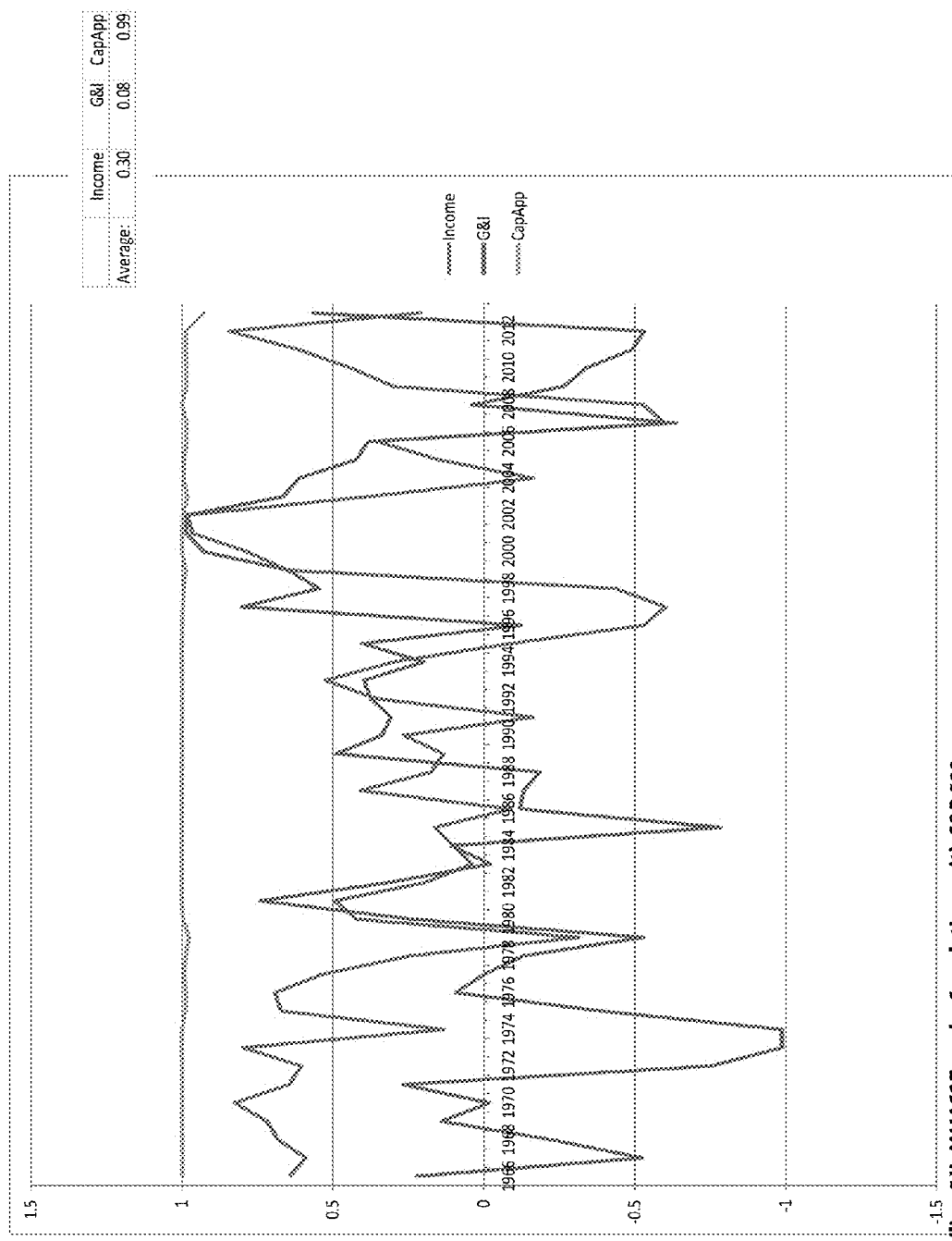
Fig. 17: MMACC—Trailing 5-Yr MMACC Tranche Correlations with S&P 500

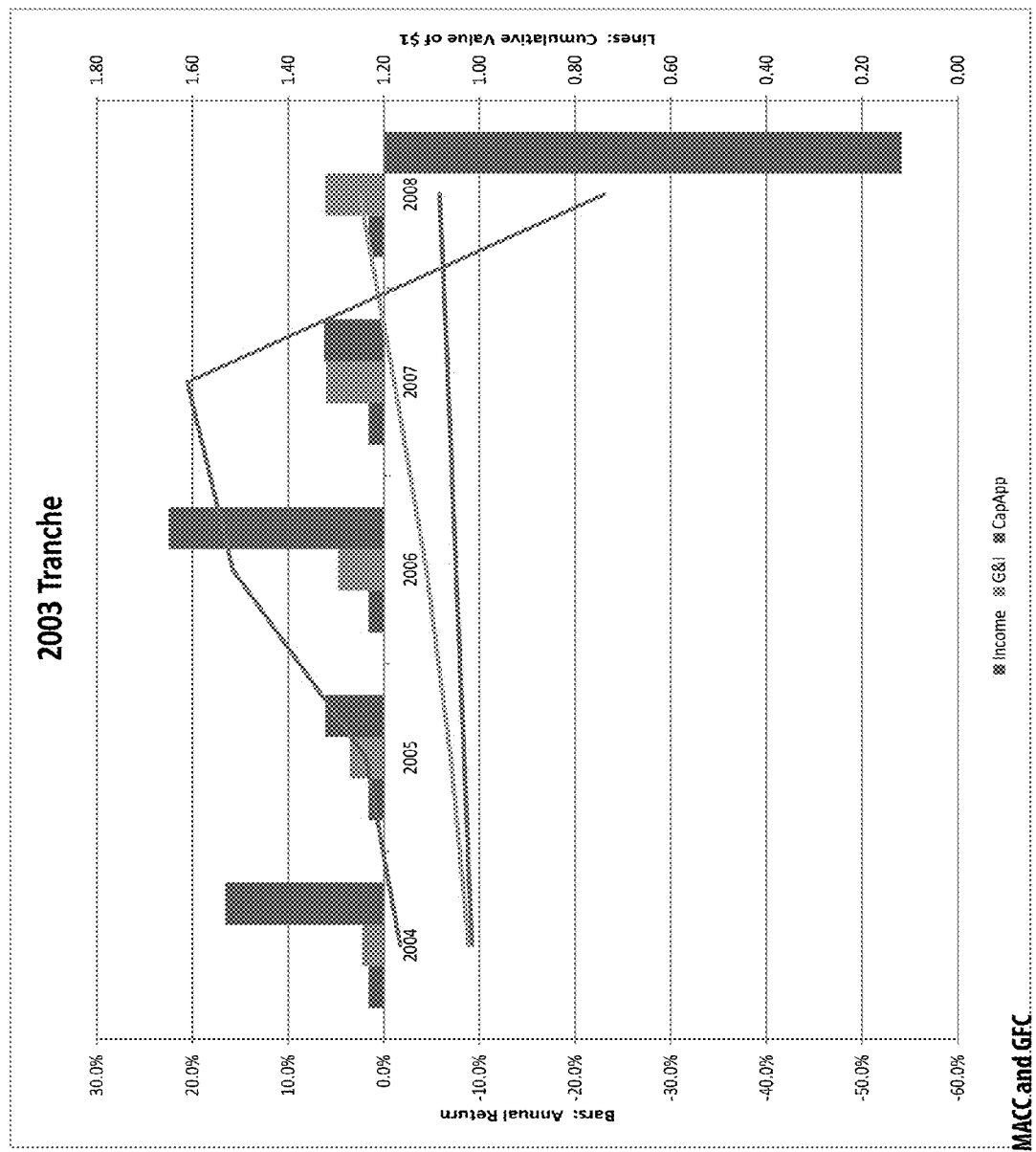
Fig.18: MMACC—MMACC and GFC

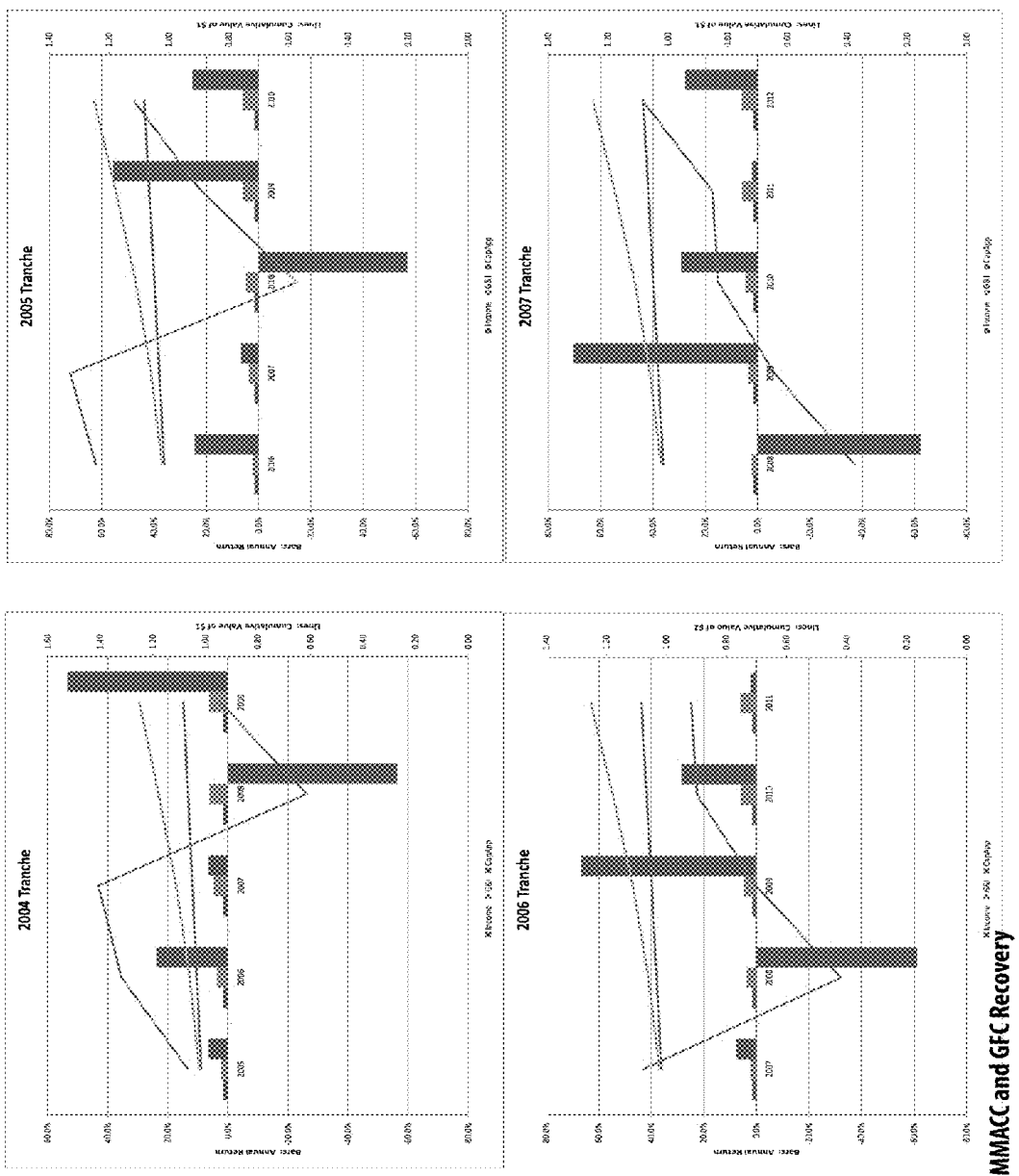
Fig. 19: MMACC—MMACC and GFC Recovery

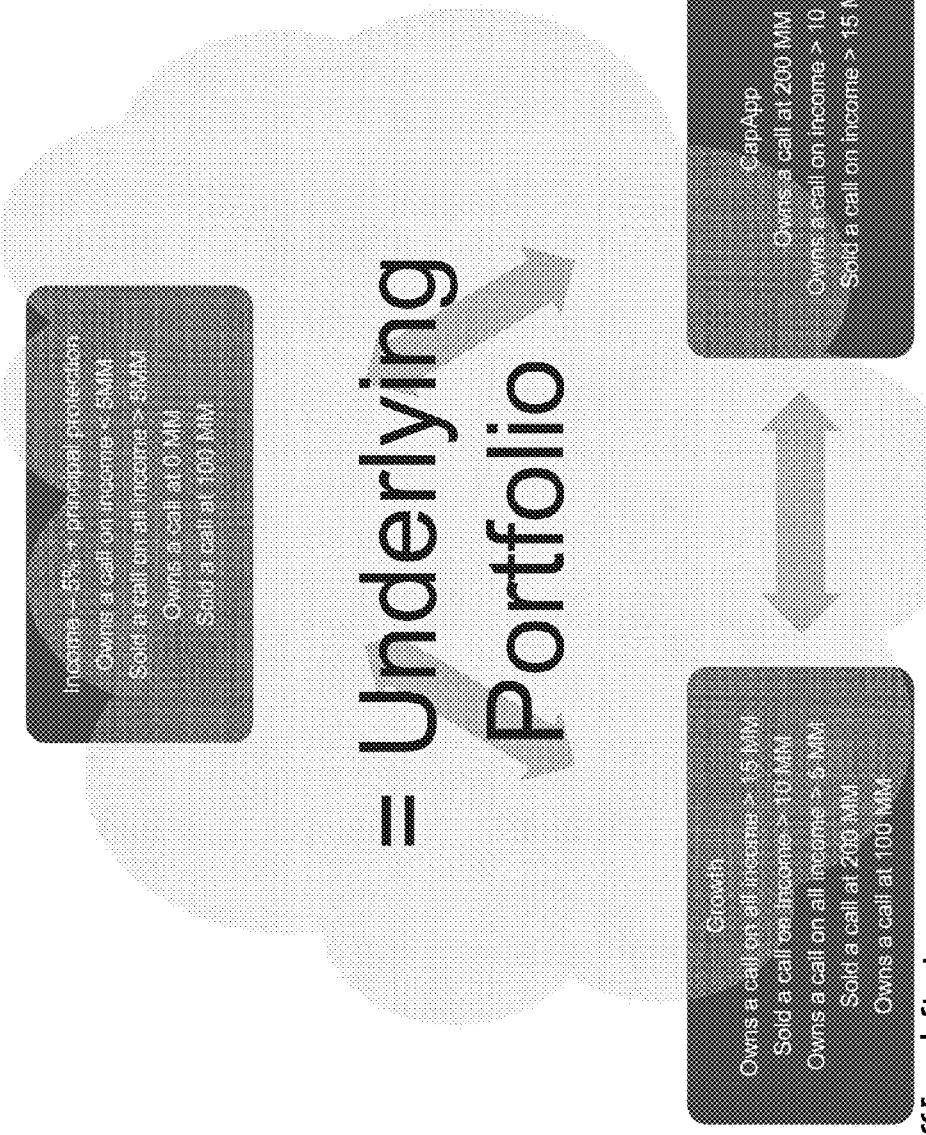
Fig.20: MMACC—MMACC Example Structure

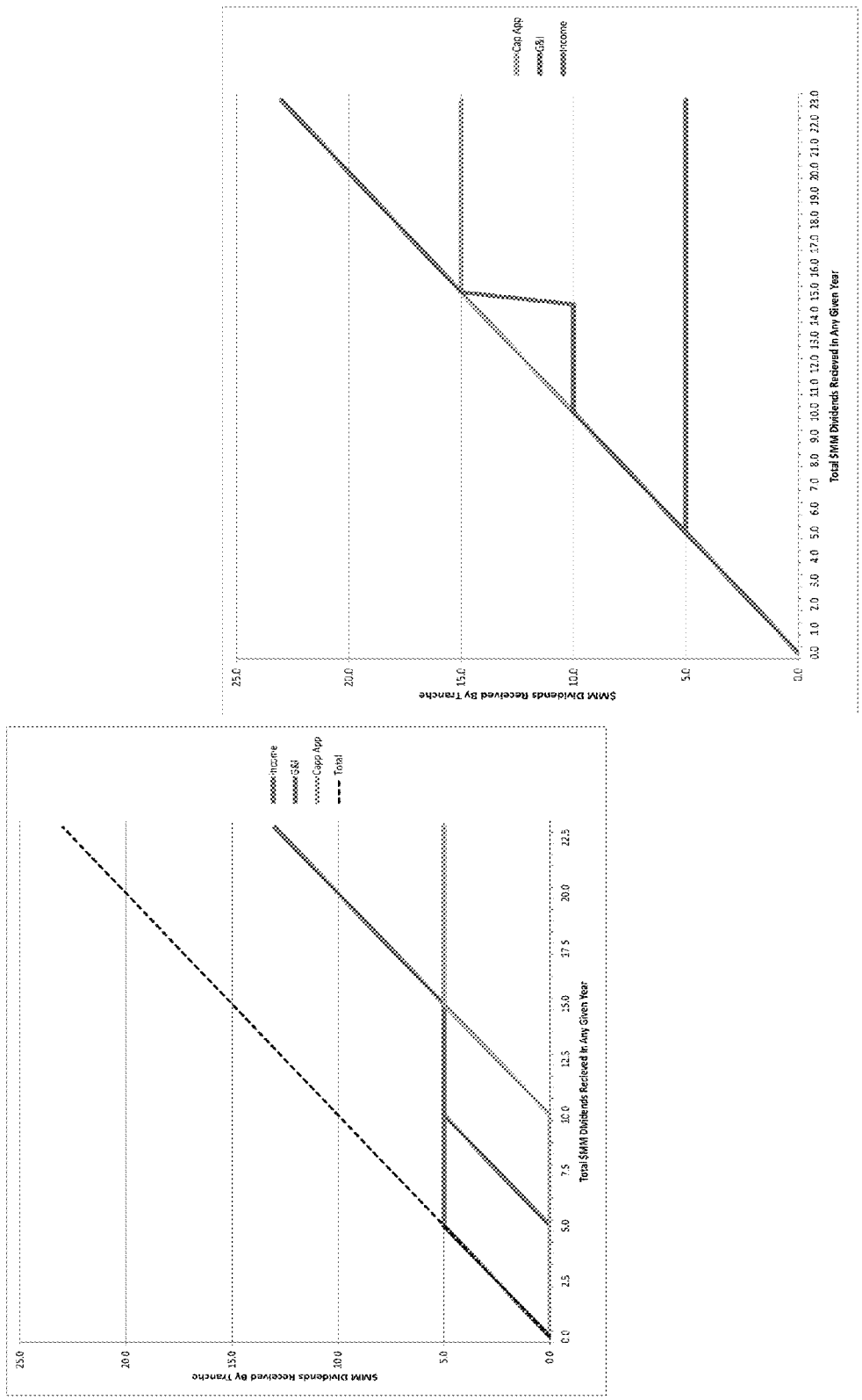
Fig.21: MMACC—MMACC as Option (Income)

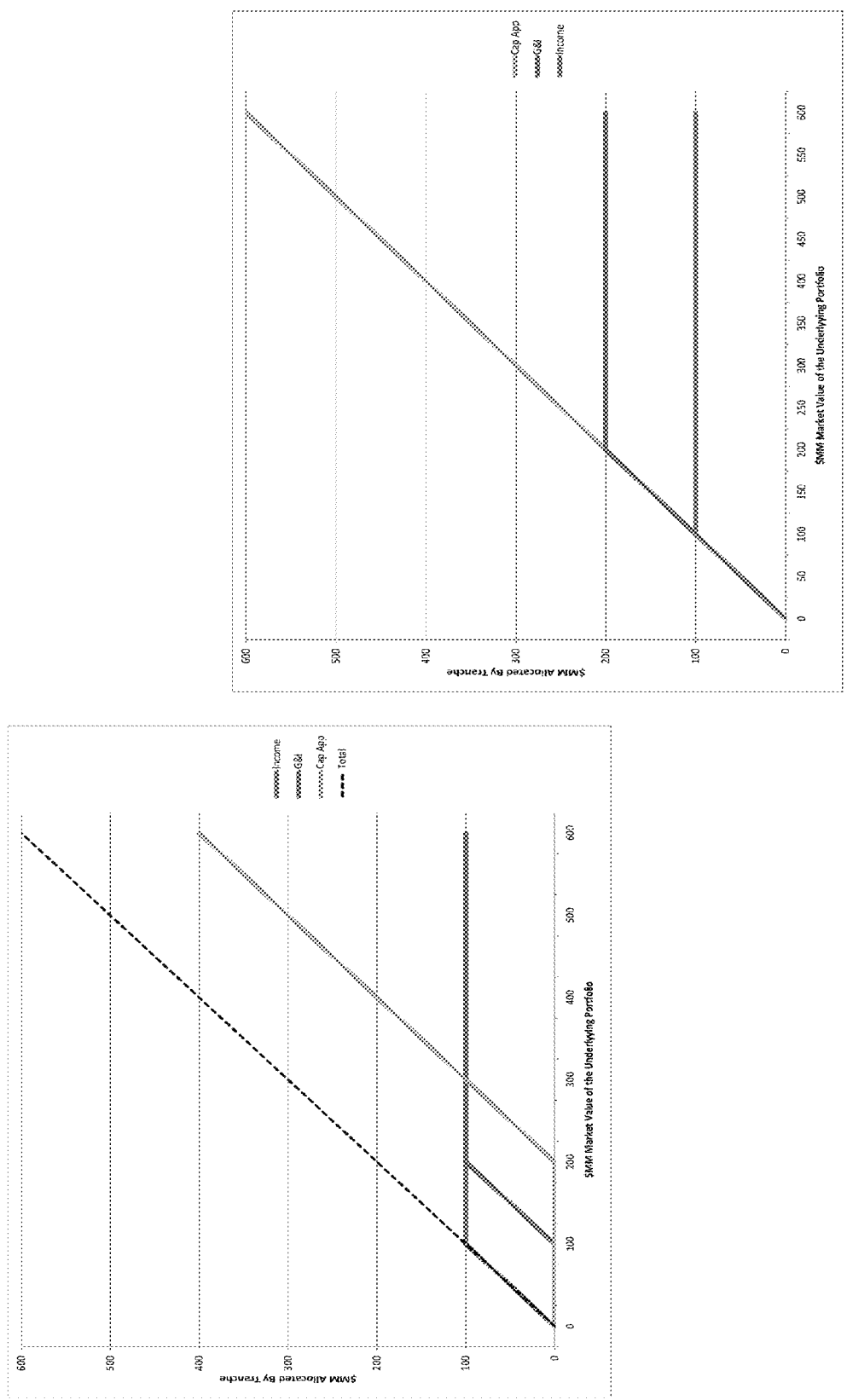
Fig.22: MMACC—MMACC as Option (Capital)

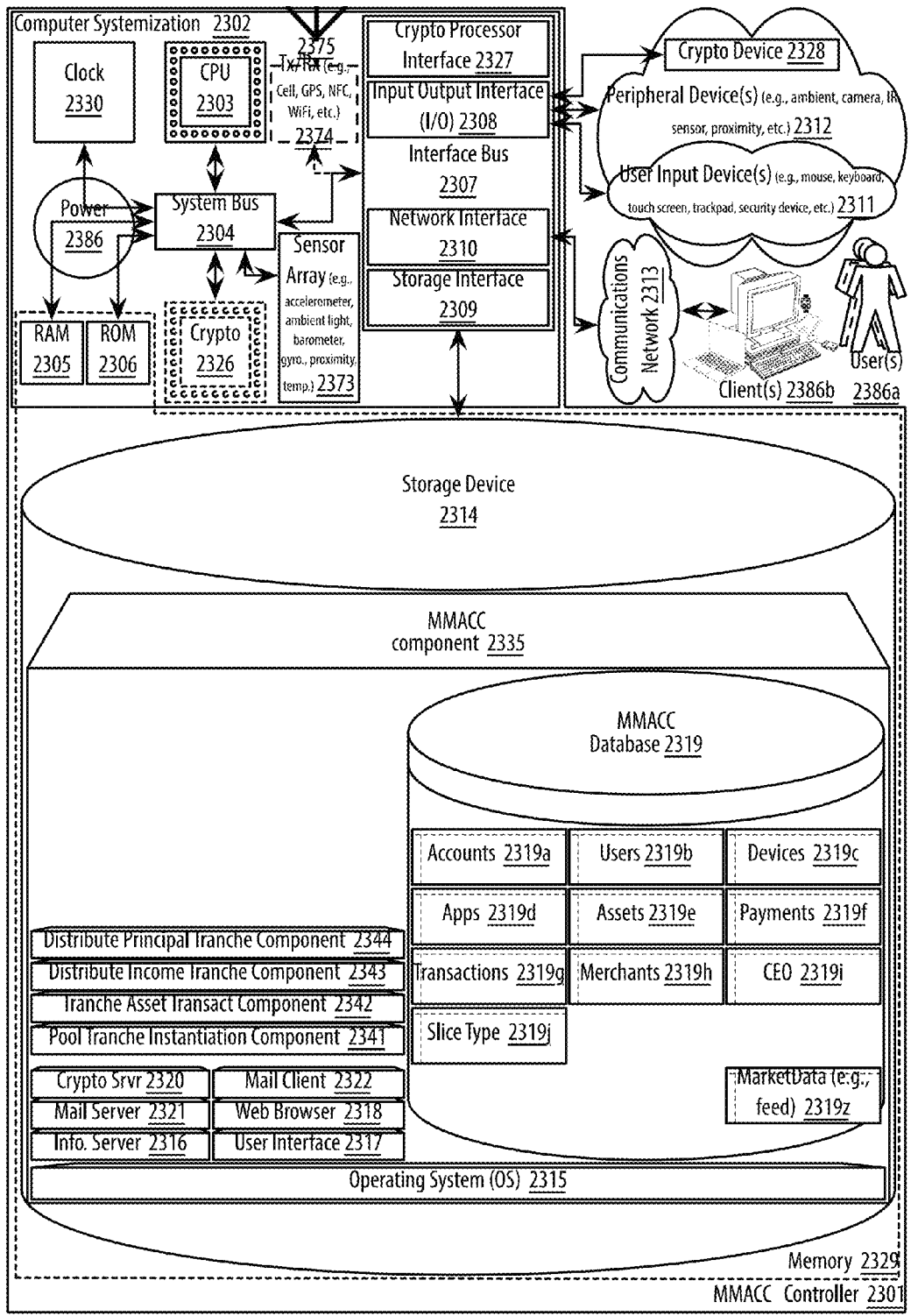
Fig.23: MMACC—Controller

MULTIPLE MODULAR ASSET CONSTRUCTOR APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address information technology, and more particularly, include Multiple Modular Asset Class Constructor Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. §112.

BACKGROUND

Information technology allows users to access streams of information through various user interfaces. Databases can track assets such as physical inventory, equity shares, accounts receivable/payable, debts/loans and derivatives thereof. Some assets have stable values while others vary greatly, the various assets sometimes generating income streams, while other times appreciate/depreciate. These different assets have different risk exposures and may be attractive to different types of owners.

BRIEF DESCRIPTION OF THE DRAWINGS

Appendices and/or drawings illustrating various, non-limiting, example, innovative aspects of the Multiple Modular Asset Class Constructor Apparatuses, Methods and Systems (hereinafter "MMACC") disclosure, include:

FIG. 1 shows a datagraph illustrating example embodiments of the MMACC;

FIG. 2a shows a logic flow diagram illustrating embodiments of a pool tranche instantiation component for the MMACC;

FIG. 2b shows a logic flow diagram illustrating embodiments of a tranche asset transact component for the MMACC;

FIG. 2c shows a logic flow diagram illustrating embodiments of a distribute income tranche and distribute principal tranche components for the MMACC;

FIG. 3 shows a datagraph illustrating example embodiments of the MMACC;

FIG. 4 shows a calculation worksheet illustrating embodiments of a 2008 vintage CEO datastructure parameters for the MMACC;

FIG. 5 shows a datagraph companion to the worksheet illustrating embodiments of a 2008 vintage CEO datastructure parameters for the MMACC;

FIG. 6 shows a graph illustrating embodiments an equity product line relationship between returns and risk for the MMACC;

FIG. 7 shows a datagraph illustrating funds' relationship between returns and risk for the MMACC;

FIG. 8 shows graphs illustrating funds' performances for the MMACC;

FIGS. 9A-B show graphs illustrating funds' correlated performances for the MMACC;

FIG. 10 show a datagraph illustrating a CEO structure for the MMACC;

FIG. 11 show a calculation worksheet illustrating a hypothetical CEO structure values for the MMACC;

FIG. 12 show a calculation worksheet actual 1970 CEO structure values for the MMACC;

FIGS. 13-14 show graphs of a range of outcomes from 1961-2008 of average annual returns and volatility for the example CEO structure for the MMACC;

FIG. 15 shows a graph of a range of outcomes from 1961-2008 of average annual returns and volatility with risk shifted by changing tranche allocations for the example CEO structure for the MMACC;

FIG. 16 shows a graph of a range of outcomes from 1961-2008 of average 5 year cumulative returns and volatility for the example CEO structure for the MMACC;

FIG. 17 shows a graph of a trailing 5 year MMACC tranche correlations with the S&P 500 for the example CEO structure for the MMACC;

FIGS. 18-19A-D show graphs of an annual return and cumulative value of a 2003-2007 tranche for the example CEO structure for the MMACC;

FIG. 20 shows a block diagram illustrating example tranche outcomes for a $300M fund with 5% yield for the example CEO structure for the MMACC;

FIGS. 21A-B show graphs illustrating dividends received by tranche vs dividends received in a given year, as an option (income) the example CEO structure for the MMACC;

FIGS. 22A-B show graphs illustrating dividends received by tranche vs dividends received in a given year, as an option (capital) the example CEO structure for the MMACC;

FIG. 23 shows a block diagram illustrating embodiments of a MMACC controller;

APPENDIX 1 illustrates initial purchase embodiments of the MMACC;

APPENDIX 2 illustrates 5 years of dividends embodiments of the MMACC; and

APPENDIX 3 illustrates Dec. 31, 2013 liquidation embodiments of the MMACC.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Multiple Modular Asset Class Constructor Apparatuses, Methods and Systems (hereinafter "MMACC") transforms collateralized equity obligation structure parameters, asset search, tranche selections inputs, via MMACC components (e.g., pool tranche instantiation 2341, tranche asset transact 2342, distribute income tranche 2343, distribute principal tranche 2344 of FIG. 23, etc.), into asset income distribution message, principal distribution message outputs. In another embodiment, the MMACC transforms a Capital Structure Component inputs via Preferred Share Class and Common Share Class components into a series of multi-share class product offerings. The Capital Structure Component may include one or more of a UIT (Unit Investment Trust) sub-component, a CLO (Collateralized Loan Obligation) & CEO (Collateralized Equity Obligation) sub-component and/or an ETF (Exchange Traded Fund) sub-component. The Preferred Share Class component may include one or more of an Income Share Class sub-component, and a Growth & Income Share Class sub-component. The Common Share Class component may include a Capital Appreciation sub-component. As such, the MMACC may transform straight equity products into more attractive instruments by dividing and allocating the return and risk streams. The MMACC, rather than allocate stocks to types of funds, allocates a portion of each stock's return to different possible funds: (1) Income, (2) Growth & Income and/or (3) Capital Appreciation via a plurality of share classes. As such, the MMACC components, in various embodiments, implement advantageous features as set forth below.

Introduction

The MMACC provides a new datastructure and data stream allowing asset owners to receive benefits and features that were never before available from a single asset type. The MMACC can create slices of value from pools of assets that were never before separable. In this way, an asset buyer may enjoy the just the dividend income (usually paying higher rates than bonds for example) in one slice of an asset pool, while a different asset buyer may enjoy just the asset appreciate component of that same asset pool without any dividend income. The MMACC provides asset buyers (e.g., investors) with a number of benefits including, but not limited to, providing them with what they want: income with stable principal, growth & income with some capital risk or capital appreciation; specific term/duration; no broker/underwriter credit risk—not a derivative; no reinvestment or roll risk; low cost. MMACC can employ a datastructure(s) representing: accounts receivable/payable (e.g., income), debts/loans, derivatives, dividends, equity, ETF, hybrid (e.g., permutations herein), indexes, mutual fund, notes, physical goods/inventory/products/services/etc., trust, etc. (hereinafter "asset" or "assets"), and/or a plurality of assets via an asset (e.g., equity) portfolio. In one embodiment, the MMACC help solve the problem that owners of assets (e.g., equity income products) may experience, i.e., where the market for the equity may move up and down while providing a dividend yield, and that fluctuation is unpalatable to the owner where the value change might be greater than a more moderate asset such as a bond. The MMACC can take datastructures representing assets, e.g., an equity portfolio, and rather than take assets (e.g., stocks) and split them up by risk (e.g., low risk stocks going into an equity income portfolio and high risk stocks going into capital appreciation portfolios), instead, the MMACC puts a pool of assets (e.g., stocks) and slices the components of the return of each stock into different stake holders of the pool (e.g., rather than take a stock A and say it is a low risk stock and put it into an equity income portfolio and the provide the return to an equity income investor receiving the total return of stock A, instead MMACC takes a datastructures representing a portfolio of stocks and take provides dividend income for each one of those stocks and allocate it to an equity income investor and then at the end of a specified holding period (e.g., 5 year maturity) the equity income holder will have first claim of getting the principal value they invested out of the portfolio). In other words, the MMACC slices the component return of each stock and allocates it rather than vertically putting each stock into a different portfolio. As such, MMACC allows the equity component may be sliced of for one group of investors and an income component may be sliced off for another group. In one embodiment, MMACC could allow trades during the maturity period. It may be sliced in numerous tranches to distribute and allocate portions of the income and capitol at the end of the maturity period based on different rules (e.g., taking an equity product and creating a piece out of it so its like a bond but with a higher income component where the MMACC would take a tranche out of the equity portfolio that provides to a stake holder holding until maturity, and when sold, the stake holder gets their principal back and whatever income made during that period). In addition to allowing stake holders owning an income component, equity component and also hybrid components. In one embodiment, MMACC provides a coverage ratio feature where, for example, MMACC buys $100 of stock and sells only $50 via an income component, then the MMACC has income from a $100 portfolio covering the income promised to the $50 income component (i.e., protecting the income portfolio). In one embodiment, the MMACC employs a collateralized loan obligation (CLO) structure to transact, but instead as a collateralized equity obligation datastructure (CEO). Although at one time primes and scores could take a stock and split the return of a stock into individual pieces, it was limited to as single stock and would work in perpetuity without maturity and set allowable trades of one or the other pieces; it did not allow for MMACC features such as, but not limited to: a portfolio context, multiple tranches, convergence ratios, fixed maturity periods, etc. In one embodiment, the MMACC allows users to set both (a) how much of each tranche is to be sold out of each aggregate pool and (b) set the income with an initial yield paid and is set at the beginning of the period and does not change (e.g., a portfolio that yields 2.5% and MMACC sells a 25% income tranche (e.g., sell maximum of 10%) and can move the income level up or down in the income tranche based on how much risk is to be taken across the other tranches). In another example, the MMACC allows adjustment of the tranche size (e.g., if you only sell $20 of income out of $100 pool, then there is $80 in the capital appreciation tranche, and the capital appreciation tranche provides a lot of support to cover the $20 of income over a given period). In one embodiment, the CEO may include a force majeure trigger option where unforeseen events may cause liquidation and variations on the obligation. As such, the CEO may establish a pool where a capital appreciation tranche covers the income tranche and appreciation and corpus of the capital appreciation tranche. The initial tranche allocation may vary infinitely, but for example, if there was an income component of guaranteed $80 income over a maturity period out of $100, and only $20 in the capital appreciation tranche, such a CEO would be very risky and leveraged as there is not a lot of capital in the capital tranche to cover short falls in the income tranche. In one embodiment, the MMACC charges an administrative fee for establishing pools and tranches within a electronic database/computer account and/or transactions in establishing such electronic records/accounts and requisite accounts.

It should be noted that a number of variations are offered by the MMACC. MMACC can vary: the Income/G&I/ capital appreciation income and capital allocations to optimize risk distribution; income allocation to optimize income attractiveness to investors. MMACC offers numerous style spaces: large, mid, small, growth, core, value, international, U.S., global, etc. MMACC can vary allocations of income and capital appreciation for negative wealth impactor optimization and it can add an "alpha" layer for income or appreciation. In one embodiment, the MMACC may create products with a 5 (or longer) year period. This provides brokers with the advantage of making a market with intra-period as the underlying holdings are liquid and transparent.

Some example product structures offered by the MMACC include:

Closed End Mutual Fund or U.I.T. With, e.g., 3, share classes: A: Income; B: Growth & Income; C: Capital Appreciation. Alternatively, these may be collapsed into, e.g., 2: preferred (income) and common (capital appreciation).

As such, the MMACC may produce Collateralized Equity Obligation (CEO) products with the following slices: tranche A, Income; tranche B, Growth & Income; tranche C, Capital Appreciation. Alternatively, the CEO may be formed as an ETF with publically disclosed holdings and AP's can create and redeem.

As such, the MMACC and its CEO datastructure products are revolutionary and transform normal asset/equities into more attractive instruments by slicing up and allocating the return and risk streams.

MMACC

FIG. 1 shows a datagraph illustrating example embodiments of the MMACC. The datagraph shows interactions between users 186a and their client devices 186b, a MMACC server(s) 199, market/$3^{rd}$ party server(s) 198, and asset buyers 187a and their client devices 187b. In one embodiment, the market server 198 may be incorporated into the MMACC itself. Users may be administrators, brokers, marketmakers, computerized systems, and/or the like 186a. Users can create MMACC datastructures and accompanying new asset products, e.g., users can provide specifications and parameters for such new products such as collateralized equity obligation datastructure (CEO) products.

As part of creation of new CEO products, the users may also specify the CEO's constituent slice types (or interchangeably slices and/or tranches). The CEOs may include a specification of constituent asset(s)/portfolio(s), slice types (e.g., income (e.g., current yield), income (e.g., dividend) growth, capital appreciation (e.g., corpus/position/principal/proceeds/etc.), hybrid (e.g., growth & income), total return, etc.), asset buyer share specification, asset buyer conditions, etc.

The asset buyers 187a may be looking to acquire slices of asset pools. The MMACC acts to create CEO products to the specifications of users 186a and makes otherwise unavailable asset slice types/tranches available to asset buyers where such products were simply never before available. The MMACC may interoperate with market servers and $3^{rd}$ party servers 198 (e.g., obtaining funds and/or assets from asset buyers to be used to populate and/or instantiate CEOs made by the MMACC 199).

As such, users 186a may provide MMACC CEO structure parameters 101 via their client devices 186b (e.g., app/web based client with web forms for parameter specification). The client device 186b may then in turn provide a CEO datastructure parameter message to the MMACC which will be used by the pool tranche component 141 (e.g., see FIG. 2a and 2341 of FIG. 23 for more detail) to create a new CEO product and associated tranches. In one embodiment, the client may provide the following example CEO datastructure parameter message 102, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<CEO_parameter_message>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MMACC.app</app_name>
        <app_version>1.0 </app_version>
        <app_webkit_name>Mobile Safari</client_webkit_name>
        <client_version>537.51.2</client_version>
    </client_details>
```

```
<client_details> //iOS Client with Webbrowser
    <client_IP>10.0.0.123</client_IP>
    <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
</client_details>
<client_details> //Android Client with Webbrowser
    <client_IP>10.0.0.123</client_IP>
    <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
    <client_product_type>Nexus S</client_product_type>
    <client_serial_number>YXXXXXXXXZ</client_serial_number>
    <client_UDID>FXXXXXXXXX-XXXX-XXXX-XXXX-XXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
</client_details>
<client_details> //Mac Desktop with Webbrowser
    <client_IP>10.0.0.123</client_IP>
    <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
    <client_product_type>MacPro5,1</client_product_type>
    <client_serial_number>YXXXXXXXXZ</client_serial_number>
    <client_UDID>FXXXXXXXXX-XXXX-XXXX-XXXX-XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
</client_details>
<CEO_datastructure>
    <CEO_name>myCoolProductName</CEO_name>
    <CEO_tranche1> //product parameter dials
        <Name>myCoolSafeHighIncomeStreamTranche</Name>
        <priority>medium</priority>
        <fundsRaised>$123</fundsRaised>
        <FixedYield>.01</FixedYield>
        <YieldUpside>%ofTheResidualDividendsPaidAnnually</YieldUpside>
            <PrincipalUpside> % of Residual Market Value Of The
Portfolio At Maturity </PrincipalUpside>
    </CEO_tranche1>
    <CEO_tranche2>
        <Name>myCoolGrowth+IncomeTranche</Name>
...
    <CEO_tranche2>
...
    <asset1>
        <name>PG</name>
        <ID>123abc</ID>
        <QTY>100</QTY>
        <InitialCost>$23.45</InitialCost>
        <CurrentValue>$25.55</CurrentValue>
        <InitialQuarterlyDividend>$0.55</InitialQuarterlyDividend>
        <CurrentQuarterlyDividend>$0.65</CurrentQuarterlyDividend>
        <PurchaseTime>2020-12-31:12:59:59</PurchaseTime>
        <Alpha>0.5</Alpha>
        <Beta>0.6</Beta>
        <CurrentYield>0.03</CurrentYield>
        <TotalReturn>.072345</TotalReturn>
    <asset2>
        <name>GILD</name>
...
    </asset2>
...
    <asset3>
        <name>BAC</name>
    </asset3>
```

```
...
    <SliceType1>
        <Type>Income</Type>
        <asset1SliceReturn>.007</asset1SliceReturn>
        <asset2SliceReturn>.011</asset2SliceReturn>
        <asset3SliceReturn>.015</asset3SliceReturn>
    </SliceType1>
    <SliceType2>
        <Type>Growth+Income</Type>
        <asset1SliceReturn>.007</asset1SliceReturn>
        <asset2SliceReturn>.011</asset2SliceReturn>
        <asset3SliceReturn>.015</asset3SliceReturn>
    </SliceType2>
        <Type>Capital Appreciation</Type>
        <asset1SliceReturn>.007</asset1SliceReturn>
        <asset2SliceReturn>.011</asset2SliceReturn>
        <asset3SliceReturn>.015</asset3SliceReturn>
    </SliceType3>
        <CEO_maturity_date>2025-12-31-23:59:59</CEO_maturity_date>
        <CEO_income_interval>quarterly</CEO_income_interval>
    </CEO_datastructure>
</CEO_parameter_message>
```

Once the MMACC 199 generates the CEO product datastructure, the MMACC stores it in its database. Then, the MMACC may make the CEO and/or its tranches available to the market via 3$^{rd}$ party servers 198 by sending an asset tranche offer message 104 detailing the types of CEO tranche products that are available. In one embodiment, the asset tranche offer message is the same as the CEO parameter message 102. In one embodiment, the 3$^{rd}$ party server and/or market servers 198 may be incorporated into the MMACC server 199; while in an alternative embodiment, while in another embodiment, either the MMACC or the 3$^{rd}$ party/market servers 198 may instantiate and execute the tranche asset transact component (e.g., see FIG. 2b and/or 2342 of FIG. 23 for more details). As such, the servers 198, 199 may store the asset tranche offer message 104 in their respective databases and make the new CEO product and tranches available for asset buyers 187 to search out such asset for procurement. In one embodiment, asset buyers 187a provide criteria via their clients 187b to search for desired assets employing the 3$^{rd}$ party/market servers 198 (e.g., in one embodiment, the servers are financial institution equity brokerage systems allowing for asset searches of items in their database systems, which now includes the new CEO products and tranches). The asset buyer's 187a client devices 187b may further on the search request and criteria 107 to the tranche asset transact component running on the server(s) 198, 199. An example PHP/SQL listing for querying a database for a an asset search is below:

```
<?PHP
    header('Content-Type: text/plain');
    mysql_connect("254.93.179.112",$DBserver,$password); // access
    database server
    mysql_select_db("Asset.SQL"); // select database table to search
    //create query for asset data
    $query = "SELECT assetName FROM AssetTable WHERE assetID
    LIKE '%' $123abc" ;
    $result = mysql_query($query); // perform the search query
    mysql_close("MMACC.SQL"); // close database access
?>
```

The server may run a database select command on the search criteria, and when CEO products and tranches are selected, the servers will generate an asset search response 108 providing a display of matching assets 109 to the asset buyers 187a. At this point, the asset buyers 187a may make selections of desired CEO products and/or tranches 110 and their client devices 187b will further on an asset tranche purchase order 111 back to the tranche asset transact component 142 at the server(s) 198, 199. The asset tranche purchase order may include payment credentials (e.g., bank account, credit card, etc.) along with desired quintiles of product, and the tranche asset transact component may use to obtain funds to secure the desired CEO product tranche for the asset buyer.

Once the asset buyers acquire the CEO product tranche, the MMACC may seek to make distributions according to asset buyers' secured right. The distribute income tranche component (e.g., see FIG. 2c and/or 2343 of FIG. 23 for more details) 143 seek to make payouts to all asset buyers having an income tranche CEO product (and/or hybrid/ apportioned product). Upon determining distributions, the distribute income tranche component 143 will issue an income distribution message 113 to the tranche asset transact component 142 which may in turn move funds to/from the asset buyers based on the performance of the CEO product tranche owned (e.g. pro-rata share) by the asset buyers, and as such, the asset buyers 187a will obtain an income distribution message informing them of such distribution 114. The MMACC server 199 will also seek to distribute capital appreciation via the distribute principal tranche component 144 (e.g., see FIG. 2c and/or 2344 of FIG. 23 for more details), which also compute the appropriate distribution of asset appreciation and issue a principal distribution message 116 to the tranche asset transact component 142, similarly causing fund movement and a principal distribution message 117 to the asset buyers 187a.

FIG. 2a shows a logic flow diagram illustrating embodiments of a pool tranche instantiation component for the MMACC. The pool tranche instantiation component 241 initializes 202 and may provide a display login/create screen 204. In one embodiment, an existing asset/brokerage order and account system may be modified to allow users 286 to create new CEO datastructures and products. In one embodiment, the XML fields from the CEO parameter message 102 may be used to generate web form text fields, pop up lists, and/or other widgets for the specification of such parameters for transfer via HTTPS POST command. Upon logging in 204 and supplying parameters for the new CEO product (e.g., via web form with corresponding fields for the parameters), the client 286 may send the CEO parameter message 102 to the MMACC server 299, and it may determine if such a CEO product already exists and if there is enough capacity for additional asset buyers for the product 212. If the product does exist and has enough capacity, the user may be presented with a massage for them to confirm 210 that they want to make another CEO product with similar features and give it a new and unique name. Then the MMACC server 299 may select asset(s) to be employed for the new CEO product 214. Then, for each asset 216, the MMACC will create a new current yield slice data structure (e.g., as specified in the CEO parameter message 102) 218. In one implementation, after receiving the new CEO parameter message 102, the MMACC server may parse the message and create/update CEO product record tables and associated slice record tables. An exemplary listing, written substantially in the form of PHP/SQL commands, to update the records in the MMACC database, is provided below:

```
<?PHP
header('Content-Type: text/plain');
// store input data in a database
mysql_connect("201.408.185.132",$DBserver,$password); // access
database server
mysql_select("MMACC_DB.SQL"); // select database to append
mysql_query("UPDATE CEO
SET CEO_name = 'myCoolProductName' , CEO_tranche1Name =
'myCoolSafeHighIncomeStreamTranche' , SliceType1 = 'Income' ,
asset1SliceType1Return = '.007', asset2SliceType1Return = '.011',
asset3SliceType1Return = '.015' , timestamp = '2020-02-22 15:22:43'
WHERE username = 'JDoe@gmail.com'");
mysql_close("MMACC_DB.SQL"); // close connection to database
?>
```

Similarly, the MMACC then creates a new dividend growth slide data structure 220 and then it creates a principal appreciation slice data structure 222. It should be noted, that various apportionments may be specified via the CEO parameter datastructure 102 where the current yield, dividend growth and/or principal appreciation slices have no value, all the value, and/or any number of permutation/hybrid values between the slices. It should also be noted that in another embodiment, the hybrids may employ plurality of slices (e.g., more than 3). The MMACC then determines if there are more assets and if so 224, execution will iterate 216 until all assets have been examined 224. Upon examining all the assets specified for the new CEO product 224, the MMACC server 299 will then examine and iterate for each slice type specified by the CEO parameter datastructure 102. For each slice type the MMACC will select all the assets for that slice type. An example PHP/SQL listing for querying a database for a assets for the slice type is below:

```
<?PHP
header('Content-Type: text/plain');
mysql_connect("254.93.179.112",$DBserver,$password); // access
database server
mysql_select_db("Asset.SQL"); // select database table to search
//create query for asset data
$query = "SELECT sliceID FROM AssetTable WHERE assetID
LIKE '%' $123abc" ;
$result = mysql_query($query); // perform the search query
mysql_close("MMACC.SQL"); // close database access
?>
```

By selecting all the assets associated with a slice type (e.g., sliceID), the MMACC may create tranche of that slice type (e.g., see FIG. 10 for more details). The slice datastructure may then be updated to be associated with all the identified and related assets (e.g., assetID) and adding slice type values to the asset records (e.g., sliceIDs). An exemplary listing, written substantially in the form of PHP/SQL commands, to update the records in the MMACC database, is provided below:

```
<?PHP
header('Content-Type: text/plain');
// Update Assets with related slice IDs
mysql_connect("201.408.185.132",$DBserver,$password); // access
database server
mysql_select("MMACC_DB.SQL"); // select database to append
mysql_query("UPDATE Asset
SET sliceID = 'myCoolSafeHighIncomeStreamTranche' , timestamp =
'2020-02-22 15:22:43'
WHERE username = 'JDoe@gmail.com'");
mysql_close("MMACC_DB.SQL"); // close connection to database
?>
<?PHP
header('Content-Type: text/plain');
// Update Slices with related Asset IDs
mysql_connect("201.408.185.132",$DBserver,$password); // access
database server
mysql_select("MMACC_DB.SQL"); // select database to append
mysql_query("UPDATE Slice
SET assetName = 'PG' , assetID = '123abc' , timestamp = '2020-02-22
15:22:43'
WHERE username = 'JDoe@gmail.com'");
mysql_close("MMACC_DB.SQL"); // close connection to database
?>
```

The MMACC determine if there are more slice types 232 and if so it continues to iterate through the slice types 226, otherwise the CEO datastructure is instantiated 234. An exemplary listing, written substantially in the form of PHP/SQL commands, to create/update the records in the MMACC database, is provided below:

```
<?PHP
header('Content-Type: text/plain');
// Create/Update CEO datastructure product with related asset slice IDs
mysql_connect("201.408.185.132",$DBserver,$password); // access
database server
mysql_select("MMACC_DB.SQL"); // select database to append
mysql_query("UPDATE CEO
SET CEO_name = 'myCoolProductName' , CEO_tranche1Name =
'myCoolSafeHighIncomeStreamTranche' , SliceType1 = 'Income'
sliceID1 = '123abc' , asset1 = 'PG' , asset1ID = 'abc123' ...
SliceType2...asset2... , timestamp = '2020-02-22 15:22:43'
WHERE username = 'JDoe@gmail.com'");
mysql_close("MMACC_DB.SQL"); // close connection to database
?>
```

FIG. 2b shows a logic flow diagram illustrating embodiments of a tranche asset transact component for the MMACC. The tranche asset transact component 242 initializes 202 and may provide a display login/create screen 240. As has already been discussed 106 of FIG. 1, asset buyers 287 may provide asset search criteria 245 to search the server(s) 298, 299 (and as has already been noted, the tranche asset transact component may run on either and/or both the MMACC 299 and/or market/$3^{rd}$ party server(s) 298). The search results may be presented to the asset buyers 247 (e.g., CEO product, tranche options, etc.) for purchase. The asset buyer 287 may then select a desired product/tranche (e.g., along with a funding source, constraints and/or conditions, etc.) 248 and the MMACC server will determine if the quantities are within the limits/availability of current CEO product offerings 250. If not 250, the server(s) may need to purchase additional assets 252 so that the CEO product constraints are maintained. Then a purchase of the CEO product (e.g., tranche) 254 will commence (e.g., the server(s) may request funds to cover the collateralized purchase of the tranche 256). If funds are not sufficient 258, an error message and retry option may be presented to the asset buyer 260 and the process may iterate 247. Once sufficient funds are obtained 258, the server(s) will allocate the collateral CEO tranche record to the asset buyer by updating the slice record with the asset buyer's identifier. An exemplary listing, written substantially in the form of PHP/SQL commands, to create/update the records in the MMACC database, is provided below:

```
<?PHP
  header('Content-Type: text/plain');
  // Create/Update CEO datastructure product with asset buyer's ID
  mysql_connect("201.408.185.132",$DBserver,$password); // access
  database server
  mysql_select("MMACC_DB.SQL"); // select database to append
  mysql_query("UPDATE CEO
  SET userID = '123-45-6789', timestamp = '2020-02-22 15:22:43'
  WHERE sliceID = 'abc123'");
  mysql_close("MMACC_DB.SQL"); // close connection to database
?>
```

FIG. 2c shows a logic flow diagram illustrating embodiments of a distribute income tranche and distribute principal tranche components for the MMACC. The tranche asset transact component 242 initializes 202 and may iterate fore each CEO datastructure record (e.g., product) 266. For each CEO, the MMACC will determine if a threshold time interval (e.g., dynamically, on-demand, periodic (e.g., second, minute, hour, day, week, month, quarterly, semi/bi annual, etc.), realtime, etc.) has elapsed 268 and if not, the MMACC will continue to iterate 266. If a threshold interval has elapsed for a specific CEO product 266, 268, then the MMACC will iterate for each CEO product slice and asset buyer 270. As such, fore each asset buyer's tranche 270, the MMACC 299 will then determine the tranche value over time (e.g., see FIG. 3 for more calculation details) and update the MMACC database 219 accordingly 272. Thereafter if there is maturity due on the asset buyer's tranche 274, the distribute income tranche component 243 will provide (or request) funds to cover collateralized performance of the tranche (e.g., pay out income) 275 and provide notification of the update 278 (and tranche iteration will continue if there are more asset buyer slices 282, 270, or continue to the next CEO product 266 there are no more slices 282. However, if the MMACC server 299 determines there is a maturity due 274, then the distribute principal tranche component 244 will similarly provide (or request) funds to cover collateralized performance of the tranche (e.g., pay out income and return capital) 276 and provide notification of the update 278 (and tranche iteration will continue if there are more asset buyer slices 282, 270, or continue to the next CEO product 266 there are no more slices 282.

FIG. 3 shows a datagraph illustrating example embodiments of the MMACC. It is an alternative embodiment to FIG. 1 and shows multiple asset (e.g., tranche) buyers 1 thru N 387 may have their funds pooled to buy an initial portfolio 302. For some term of years 1 thru T, the MMACC will distribute (e.g., dividend) income to tranches 1 thru N 308, and then at maturity, the positions will be sold and proceeds will be distributed to the tranches 310. One can create many CEO datastructure product permutations by manipulating the product parameter 'dials' as specified in the CEO parameter message 102. The dials vary the structure of the tranches, and the distribute income tranche component 243 and distribute principal tranche component 244 of FIG. 2c may use the following calculations for determining tranche structure over time:

$$Income_{n,t} = \text{Minimum}\left(MV_{n,0} \times Y_n, \sum_{m=1}^{M} S_m \times D_{m,t} - \sum_{nn=1}^{n-1} Income_{nn,t}\right) +$$

$$\left(\sum_{m=1}^{M} S_m \times D_{m,t} - \sum_{nn=1}^{N} Income_{nn,t}\right) \times YU_n$$

$$MV_{n,t} = \text{Minimum}\left(MV_{n,0}, \sum_{m=1}^{M} S_m \times P_{m,t} - \sum_{nn=1}^{n-1} MV_{nn,t}\right) +$$

$$\left(\sum_{m=1}^{M} S_m \times P_{m,t} - \sum_{nn=1}^{N} MV_{nn,t}\right) \times CU_n$$

Subject to: $\sum_{n=1}^{N} YU_n = 1$; $\sum_{n=1}^{N} CU_n = 1$; tranches are in order of claim where the above has the following values:
  N=number of tranches; n=1 to N
  T=number of time periods; t=1 to T; t=0=initial investment
  M=number of securities in the portfolio; m=1 to M
  D=dividends per share, $D_{m,t}$=security m's dividend at time t
  S=shares held; $S_m$=shares held in security m
  P=price; $P_{m,t}$=security m's price at time t
  Y=yield; % yield tranche was sold with
  YU=yield upside; % of excess portfolio income any tranche is entitled to
  CU=capital upside; % of excess portfolio capital any tranche is entitled to
  MV=market value of a tranche; $MV_{n,t}$
  Income=income paid to each tranche; $Income_{n,t}$ We can use the above to drive a 'Vintage 2008' product parameter example to see the resulting products. With the CEO datastructure having the following values:

| Example product parameters for '2008 Vintage' example | |
|---|---|
| Underlying Portfolio | Large Cap U.S. Stocks |
| Number of Tranches | 3: Income, Growth & Income, Capital Appreciation |
| Maturity date or length For Each Tranche | 5 Years (Dec. 31, 2008-Dec. 31, 2013) |
| Funds Raised | $100,000,000 × 3 |
| Fixed Yield | 3.1%/3.1%/3.1% |
| Yield upside | 0%/100%/0% |
| Priority | $1^{st}/2^{nd}/3$rd |
| Principal Upside | 0%/0%/100% |

FIG. 4 shows a calculation worksheet illustrating embodiments of a 2008 vintage CEO datastructure parameters for the MMACC. It uses the above parameters showing tranche levels, income, market value allocation, portfolio market value, 5 year returns and annual IRR.

FIG. 5 shows a datagraph companion to the worksheet illustrating embodiments of a 2008 vintage CEO datastructure parameters for the MMACC. Three tranches 501 of $100,000,000 each are pooled into a portfolio on Dec. 31, 2008 502. Each year's distribution per tranche 504 is broken down per FIG. 4's worksheet and with totals per year 503. The aggregated total 505 at maturity Dec. 31, 2013 is further broken out to show the income and growth and income tranches returned the principal $100,000,000 each 506, and the capital appreciation tranche benefited from growth 507.

FIG. 6 shows a graph illustrating embodiments an equity product line relationship between returns and risk for the MMACC. FIG. 7 shows a datagraph illustrating funds' relationship between returns and risk for the MMACC. FIG. 8 shows graphs illustrating funds' performances for the MMACC. FIG. 9 shows graphs illustrating funds' correlated performances for the MMACC. One may conclude that such equity funds have high/similar absolute risk and are highly correlated with the S&P and will lose money if the S&P is down significantly. As such, current equity income funds do not provide principal protection and are too risky to be used as a bond substitute.

In contrast, rather than allocate stocks to types of funds, the MMACC may allocate a portion of each stock's return to different funds. As such, dividend income and the most principal protection=Income Dividend income and dividend growth and some principal protection=Growth and Income. Also, the MMACC provides possible dividend income and all the capital appreciation with the least principal protection=Capital Appreciation. An example CEO product from the MMACC may illustrate this contrast more effectively. FIGS. 10-22 will provide example CEO structures and show relative performances to such funds.

FIG. 10 show a datagraphs illustrating a CEO structure for the MMACC. The CEO includes 3 slices: an income fund slice 1001, growth and income slice 1002, and a capital appreciation slice 1003. Constituent assets 1004 are compared across a risk spectrum 1005 and returns rates 1006. FIG. 11 show a datagraphs illustrating a CEO structure values for the MMACC. FIG. 12 show a calculation worksheet actual 1970 CEO structure values for the MMACC. FIGS. 13-14 show graphs of a range of outcomes from 1961-2008 of average annual returns and volatility for the example CEO structure for the MMACC. FIG. 15 shows a graph of a range of outcomes from 1961-2008 of average annual returns and volatility with risk shifted by changing tranche allocations for the example CEO structure for the MMACC. FIG. 16 shows a graph of a range of outcomes from 1961-2008 of average 5 year cumulative returns and volatility for the example CEO structure for the MMACC. FIG. 17 shows a graph of a trailing 5 year MMACC tranche correlations with the S&P 500 for the example CEO structure for the MMACC. FIGS. 18-19 show graphs of a annual return and cumulative value of a 2003-tranche for the example CEO structure for the MMACC. FIG. 20 shows a block diagram illustrating example tranche outcomes for a $300 M fund with 5% yield for the example CEO structure for the MMACC. FIG. 21 shows a graph illustrating dividends received by tranche vs dividends received in a given year, as an option (income) the example CEO structure for the MMACC. FIG. 22 shows a graph illustrating dividends received by tranche vs dividends received in a given year, as an option (capital) the example CEO structure for the MMACC. FIG. 23 shows a block diagram illustrating embodiments of a MMACC controller. APPENDIX 1 illustrates initial purchase embodiments of the MMACC. APPENDIX 2 illustrates 5 years of dividends embodiments of the MMACC. APPENDIX 3 illustrates Dec. 31, 2013 liquidation embodiments of the MMACC.

MMACC Controller

FIG. 23 shows a block diagram illustrating embodiments of a MMACC controller. In this embodiment, the MMACC controller 2301 may serve to aggregate, process, store, search, serve, identify, instruct, generate, match, and/or facilitate interactions with a computer through information technology technologies, and/or other related data.

Typically, users, which may be people and/or other systems, may engage information technology systems (e.g., computers) to facilitate information processing. In turn, computers employ processors to process information; such processors 2303 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2329 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the MMACC controller 2301 may be connected to and/or communicate with entities such as, but not limited to: one or more users from peripheral devices 2312 (e.g., user input devices 2311); an optional cryptographic processor device 2328; and/or a communications network 2313.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The MMACC controller 2301 may be based on computer systems that may comprise, but are not limited to, components such as: a computer systemization 2302 connected to memory 2329.

Computer Systemization

A computer systemization 2302 may comprise a clock 2330, central processing unit ("CPU(s)") and/or "processor(s)" (these terms are used interchangeable throughout the disclosure unless noted to the contrary)) 2303, a memory 2329 (e.g., a read only memory (ROM) 2306, a random access memory (RAM) 2305, etc.), and/or an interface bus 2307, and most frequently, although not necessarily, are all interconnected and/or communicating through a system bus 2304 on one or more (mother)board(s) 2302 having conductive and/or otherwise transportive circuit pathways through which instructions (e.g., binary encoded signals) may travel to effectuate communications, operations, storage, etc. The computer systemization may be connected to a power source 2386; e.g., optionally the power source may be internal. Optionally, a cryptographic processor 2326 may be connected to the system bus. In another embodiment, the cryptographic processor, transceivers (e.g., ICs) 2374, and/or sensor array (e.g., accelerometer, altimeter, ambient light, barometer, global positioning system (GPS) (thereby allowing MMACC controller to determine its location), gyroscope, magnetometer, pedometer, proximity, ultra-violet sensor, etc.) 2373 may be connected as either internal and/or external peripheral devices 2312 via the interface bus I/O 2308 (not pictured) and/or directly via the interface bus 2307. In turn, the transceivers may be connected to antenna(s) 2375, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11 g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks), netbooks, tablets (e.g., iPads, Android and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2329 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the MMACC controller and beyond through various interfaces. Should processing requirements dictate a greater amount speed and/or capacity, distributed processors (e.g., Distributed MMACC), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the MMACC may be achieved by implementing a microcontroller such as CAST's R8051XC2 microcontroller; Intel's MCS 51 (i.e., 8051 microcontroller); and/or the like. Also, to implement certain features of the MMACC, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the MMACC component collection (distributed or otherwise) and/or features may be implemented via the microprocessor and/or via embedded components; e.g., via ASIC, coprocessor, DSP, FPGA, and/or the like. Alternately, some implementations of the MMACC may be implemented with embedded components that are configured and used to achieve a variety of features or signal processing.

Depending on the particular implementation, the embedded components may include software solutions, hardware solutions, and/or some combination of both hardware/software solutions. For example, MMACC features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the MMACC features. A hierarchy of programmable interconnects allow logic blocks to be interconnected as needed by the MMACC system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the MMACC may be developed on regular FPGAs and then migrated into a fixed version that more resembles ASIC implementations. Alternate or coordinating implementations may migrate MMACC controller features to a final ASIC instead of or in addition to FPGAs. Depending on the implementation all of the aforementioned embedded components and microprocessors may be considered the "CPU" and/or "processor" for the MMACC.

Power Source

The power source 2386 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2386 is connected to at least one of the interconnected subsequent components of the MMACC thereby providing an electric current to all subsequent components. In one example, the power source 2386 is connected to the system bus component 2304. In an alternative embodiment, an outside power source 2386 is provided through a connection across the I/O 2308 interface. For example, a USB and/or IEEE 1394 connection carries both data and power across the connection and is therefore a suitable source of power.

Interface Adapters

Interface bus(ses) 2307 may accept, connect, and/or communicate to a number of interface adapters, conventionally although not necessarily in the form of adapter cards, such as but not limited to: input output interfaces (I/O) 2308, storage interfaces 2309, network interfaces 2310, and/or the like. Optionally, cryptographic processor interfaces 2327 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2309 may accept, communicate, and/or connect to a number of storage devices such as, but not limited to: storage devices 2314, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2310 may accept, communicate, and/or connect to a communications network 2313. Through a communications network 2313, the MMACC controller is accessible through remote clients 2333*b* (e.g., computers with web browsers) by users 2333*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., Distributed MMACC), architectures may similarly be employed to pool, load balance, and/or otherwise decrease/increase the communicative bandwidth required by the MMACC controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 2310 may be used to engage with various communications network types 2313. For example, multiple network interfaces may be employed to allow for the communication over broadcast, multicast, and/or unicast networks.

Input Output interfaces (I/O) 2308 may accept, communicate, and/or connect to user, peripheral devices 2312 (e.g., input devices 2311), cryptographic processor devices 2328, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 2312 may be connected and/or communicate to I/O and/or other facilities of the like such as network interfaces, storage interfaces, directly to the interface bus, system bus, the CPU, and/or the like. Peripheral devices may be external, internal and/or part of the MMACC controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 2311 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the MMACC controller may be embodied as an embedded, dedicated, and/or monitor-less (i.e., headless) device, wherein access would be provided over a network interface connection.

Cryptographic units such as, but not limited to, microcontrollers, processors 2326, interfaces 2327, and/or devices 2328 may be attached, and/or communicate with the MMACC controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 2329. However, memory is a fungible technology and resource, thus, any number of memory embodiments may be employed in lieu of or in concert with one another. It is to be understood that the MMACC controller and/or a computer systemization may employ various forms of memory 2329. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2329 will include ROM 2306, RAM 2305, and a storage device 2314. A storage device 2314 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RANI/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 2329 may contain a collection of program and/or database components and/or data such as, but not limited to: operating system component(s) 2315 (operating system); information server component(s) 2316 (information server); user interface component(s) 2317 (user interface); Web browser component(s) 2318 (Web browser); database(s) 2319; mail server component(s) 2321; mail client component(s) 2322; cryptographic server component(s) 2320 (cryptographic server); the MMACC component(s) 2335; and/or the like (i.e., collectively a component collection). These components may be stored and accessed from the storage devices and/or from storage devices accessible through an interface bus. Although non-conventional program components such as those in the component collection, typically, are stored in a local storage device 2314, they may also be loaded and/or stored in memory such as: peripheral devices, RAM, remote storage facilities through a communications network, ROM, various forms of memory, and/or the like.

Operating System

The operating system component 2315 is an executable program component facilitating the operation of the MMACC controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the MMACC controller to communicate with other entities through a communications network 2313. Various communication protocols may be used by the MMACC controller as a subcarrier transport mechanism for interaction, such as, but not limited to: multicast, TCP/IP, UDP, unicast, and/or the like.

Information Server

An information server component 2316 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the MMACC controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the MMACC database 2319, operating systems, other program components, user interfaces, Web browsers, and/or the like.

Access to the MMACC database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the MMACC. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the MMACC as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome; Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 2317 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2318 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the MMACC enabled nodes. The combined application may be nugatory on systems employing standard Web browsers.

Mail Server

A mail server component 2321 is a stored program component that is executed by a CPU 2303. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the MMACC. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the MMACC mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2322 is a stored program component that is executed by a CPU 2303. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2320 is a stored program component that is executed by a CPU 2303, cryptographic processor 2326, cryptographic processor interface 2327, cryptographic processor device 2328, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption)

security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the MMACC may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the MMACC component to engage in secure transactions if so desired. The cryptographic component facilitates the secure accessing of resources on the MMACC and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The MMACC Database

The MMACC database component 2319 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the MMACC database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the MMACC database is implemented as a data-structure, the use of the MMACC database 2319 may be integrated into another component such as the MMACC component 2335. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 2319 includes several tables 2319a-z:

An accounts table 2319a includes fields such as, but not limited to: an accountID, accountOwnerID, accountContactID, assetIDs, deviceIDs, paymentIDs, transactionIDs, userIDs, CEO_ID, SliceTypeID, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 2319b includes fields such as, but not limited to: a userID, userSSN, taxID, userContactID, accountID, assetIDs, deviceIDs, paymentIDs, transactionIDs, CEO_ID, SliceTypeID, userType (e.g., MMACC product user, asset buyer, agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a MMACC);

An devices table 2319c includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppinstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, power_condition, temperature_setting, speed_adjust, hold_duration, part_actuation, and/or the like. Device table may, in some embodiments, include fields corresponding to one or more Bluetooth profiles, such as those published at https://www- .bluetooth.org/en-us/specification/adopted-specifications, and/or other device specifications, and/or the like;

An apps table 2319*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 2319*e* includes fields such as, but not limited to: assetID, accountID, userID, distributorAccountID, distributorPaymentID, distributorOnwerID, CEO_ID, SliceTypeID, assetType, assetName, assetCode, assetQuantity, assetCost, assetPrice, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetConditions, initialCost, currentValue, initialQuarterlyDividend, currentQuarterlyDividend, purchaseTime, alpha, beta, currentYield, totalReturn, and/or the like;

A payments table 2319*f* includes fields such as, but not limited to: paymentID, accountID, userID, CEO_ID, SliceTypeID, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 2319*g* includes fields such as, but not limited to: transactionID, accountID, assetIDs, deviceIDs, paymentIDs, transactionIDs, userID, merchantID, CEO_ID, SliceTypeID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 2319*h* includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An CEO table 2319*i* includes fields such as, but not limited to: CEO_ID, sliceID, CEO_Name, SliceType, SliceName, assetID, accountID, userID, distributorAccountID, distributorPaymentID, distributorOnwerID, priority, fundsRaised, FixedYield, YieldUpside, and/or the like;

An SliceType table 2319*i* includes fields such as, but not limited to: SliceTypeID, CEO_ID, sliceID, SliceType, SliceName, assetID, accountID, userID, distributorAccountID, distributorPaymentID, distributorOnwerID, priority, fundsRaised, FixedYield, YieldUpside, and/or the like;

A market_data table 2319*z* includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi.

In one embodiment, the MMACC database may interact with other database systems. For example, employing a distributed database system, queries and data access by search MMACC component may treat the combination of the MMACC database, an integrated data security layer database as a single database entity.

In one embodiment, user programs may contain various user interface primitives, which may serve to update the MMACC. Also, various accounts may require custom database tables depending upon the environments and the types of clients the MMACC may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2319*a*-*z*. The MMACC may be configured to keep track of various settings, inputs, and parameters via database controllers.

The MMACC database may communicate to and/or with other components in a component collection, including itself, and/or facilities of the like. Most frequently, the MMACC database communicates with the MMACC component, other program components, and/or the like. The database may contain, retain, and provide information regarding other nodes and data.

The MMACCs

The MMACC component 2335 is a stored program component that is executed by a CPU. In one embodiment, the MMACC component incorporates any and/or all combinations of the aspects of the MMACC that was discussed in the previous figures. As such, the MMACC affects accessing, obtaining and the provision of information, services, transactions, and/or the like across various communications networks. The features and embodiments of the MMACC discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the MMACC's features and facilities, and in many cases reduce the costs, energy consumption/requirements, and extend the life of MMACC's underlying infrastructure; this has the added benefit of making the MMACC more reliable. Similarly, many of the features and mechanisms are designed to be easier for users to use and access, thereby broadening the audience that may enjoy/employ and exploit the feature sets of the MMACC; such ease of use also helps to increase the reliability of the MMACC. In addition, the feature sets include heightened security as noted via the Cryptographic components 2320, 2326, 2328 and throughout, making access to the features and data more reliable and secure The MMACC transforms collateralized equity obligation structure parameters, asset search, tranche selections inputs, via MMACC components (e.g., pool tranche instantiation 2341, tranche asset transact 2342, distribute income tranche 2343, distribute principal tranche 2344 of FIG. 23), into asset income distribution message, principal distribution message outputs.

The MMACC component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the MMACC server employs a cryptographic server to encrypt and decrypt communications. The MMACC component may communicate to and/or with other components in a component collection, including itself, and/or facilities of the like. Most frequently, the MMACC component communicates with the MMACC database, operating systems, other program components, and/or the like. The MMACC may contain, communicate, generate, obtain, and/or provide program component, system, user, and/or data communications, requests, and/or responses.

Distributed MMACCs

The structure and/or operation of any of the MMACC node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the MMACC controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the MMACC controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
   $input = "";
   $input = socket_read($client, 1024);
   $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for Multiple Modular Asset Class Constructor Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a MMACC individual and/or enterprise user, database configuration and/or relational model, data type, data transmission and/or network framework, syntax structure, and/or the like, various embodiments of the MMACC, may be implemented that enable a great deal of flexibility and customization. For example, aspects of the MMACC may be adapted for separating, e.g., physical, asset benefits and liabilities across slices of an asset collection. While various embodiments and discussions of the MMACC have included information technology, however, it is to be understood that the embodiments described herein may be readily configured and/or customized for a wide variety of other applications and/or implementations.

APPENDIX 1

Example MMACC embodiments (initial purchases)
2008 Tranche - 5 Year Maturity
Initialization (Dec. 31, 2008)

| Company Name | Initial Weight (%) | $ Invested | Purchase Price* | Shares |
|---|---|---|---|---|
| Sum: | 100.00 | 300,000,001 | | |
| 3M Company | 0.51 | 1,530,116 | 57.5 | 26,592 |
| Abbott Laboratories | 1.06 | 3,177,767 | 53.4 | 59,542 |
| Abercrombie & Fitch Co. Class A | 0.03 | 77,053 | 23.1 | 3,340 |
| Adobe Systems Incorporated | 0.14 | 433,796 | 21.3 | 20,376 |
| Advanced Micro Devices, Inc. | 0.02 | 50,437 | 2.2 | 23,351 |
| AES Corporation | 0.07 | 212,729 | 8.2 | 25,817 |
| Aetna Inc. | 0.17 | 504,301 | 28.5 | 17,695 |
| Affiliated Computer Services Inc. Cl A | 0.06 | 172,015 | 46.0 | 3,744 |
| Aflac Incorporated | 0.27 | 819,965 | 45.8 | 17,888 |
| Agilent Technologies, Inc. | 0.07 | 209,930 | 15.6 | 13,431 |
| Air Products and Chemicals, Inc. | 0.13 | 404,279 | 50.3 | 8,042 |
| AK Steel Holding Corporation | 0.01 | 40,063 | 9.3 | 4,299 |
| Akamai Technologies, Inc. | 0.03 | 97,937 | 15.1 | 6,490 |
| Alcoa Inc. | 0.12 | 345,820 | 11.3 | 30,712 |
| Allegheny Energy | 0.07 | 219,665 | 33.9 | 6,487 |
| Allegheny Technologies Incorporated | 0.03 | 94,339 | 25.5 | 3,695 |
| Allergan, Inc. | 0.16 | 475,808 | 40.3 | 11,801 |
| Allstate Corporation | 0.22 | 673,794 | 32.8 | 20,568 |
| Altera Corporation | 0.06 | 190,685 | 16.7 | 11,411 |
| Altria Group, Inc. | 0.40 | 1,190,765 | 15.1 | 79,068 |
| Amazon.com, Inc. | 0.21 | 632,917 | 51.3 | 12,342 |
| Ameren Corporation | 0.09 | 269,889 | 33.3 | 8,115 |
| American Capital, Ltd. | 0.01 | 25,708 | 3.2 | 7,935 |
| American Electric Power Company, Inc. | 0.17 | 515,389 | 33.3 | 15,486 |
| American Express Company | 0.28 | 825,678 | 18.6 | 44,511 |
| American International Group, Inc. | 0.05 | 162,000 | 31.4 | 5,159 |
| American Tower Corporation | 0.15 | 446,343 | 29.3 | 15,223 |
| Ameriprise Financial, Inc. | 0.06 | 194,168 | 23.4 | 8,312 |
| AmerisourceBergen Corporation | 0.07 | 213,778 | 17.8 | 11,990 |
| Amgen Inc. | 0.78 | 2,348,072 | 57.8 | 40,659 |
| Amphenol Corporation Class A | 0.05 | 161,759 | 12.0 | 13,491 |
| Anadarko Petroleum Corporation | 0.23 | 679,085 | 38.6 | 17,616 |
| Analog Devices, Inc. | 0.07 | 212,539 | 19.0 | 11,175 |
| Aon plc | 0.16 | 472,922 | 45.7 | 10,353 |
| Apache Corporation | 0.32 | 957,188 | 74.5 | 12,843 |
| Apartment Investment and Management Company C | 0.01 | 44,878 | 11.6 | 3,886 |
| Apollo Education Group, Inc. Class A | 0.10 | 313,266 | 76.6 | 4,089 |
| Apple Inc. | 0.97 | 2,911,545 | 12.2 | 238,791 |
| Applied Materials, Inc. | 0.17 | 521,557 | 10.1 | 51,486 |
| Archer-Daniels-Midland Company | 0.24 | 709,699 | 28.8 | 24,617 |
| Assurant, Inc. | 0.05 | 135,408 | 30.0 | 4,514 |
| AT&T Inc. | 2.15 | 6,445,124 | 28.5 | 226,145 |
| Autodesk, Inc. | 0.06 | 170,638 | 19.7 | 8,684 |
| Automatic Data Processing, Inc. | 0.26 | 766,735 | 39.3 | 19,490 |
| AutoNation, Inc. | 0.01 | 40,904 | 9.9 | 4,140 |
| AutoZone, Inc. | 0.07 | 204,789 | 139.5 | 1,468 |
| AvalonBay Communities, Inc. | 0.06 | 179,268 | 60.6 | 2,959 |
| Avery Dennison Corporation | 0.04 | 133,498 | 32.7 | 4,079 |
| Avon Products, Inc. | 0.13 | 393,112 | 24.0 | 16,359 |
| Baker Hughes Incorporated | 0.13 | 378,474 | 32.1 | 11,802 |
| Ball Corporation | 0.05 | 150,968 | 20.8 | 7,260 |
| Bank of America Corporation | 0.90 | 2,711,107 | 14.1 | 192,550 |
| Bank of New York Mellon Corporation | 0.42 | 1,247,596 | 28.3 | 44,038 |
| Baxter International Inc. | 0.43 | 1,275,396 | 53.6 | 23,799 |
| BB&T Corporation | 0.19 | 582,200 | 27.5 | 21,202 |
| Becton, Dickinson and Company | 0.21 | 638,049 | 68.4 | 9,330 |
| Bed Bath & Beyond Inc. | 0.08 | 253,335 | 25.4 | 9,966 |
| Bemis Company, Inc. | 0.03 | 90,576 | 23.7 | 3,825 |
| Best Buy Co., Inc. | 0.12 | 364,376 | 28.1 | 12,962 |
| Big Lots, Inc. | 0.02 | 45,661 | 14.5 | 3,151 |
| Biogen Idec Inc. | 0.18 | 533,269 | 47.6 | 11,196 |
| BJ Services Co | 0.04 | 130,738 | 11.7 | 11,203 |
| Black & Decker Corporation | 0.03 | 96,418 | 41.8 | 2,306 |
| BMC Software, Inc. | 0.06 | 193,632 | 26.9 | 7,196 |
| Boeing Company | 0.40 | 1,199,991 | 42.7 | 28,123 |
| Boston Properties, Inc. | 0.08 | 254,974 | 55.0 | 4,636 |

APPENDIX 1-continued

Example MMACC embodiments (initial purchases)
2008 Tranche - 5 Year Maturity
Initialization (Dec. 31, 2008)

| Company Name | Initial Weight (%) | $ Invested | Purchase Price* | Shares |
|---|---|---|---|---|
| Boston Scientific Corporation | 0.15 | 445,987 | 7.7 | 57,621 |
| Bristol-Myers Squibb Company | 0.59 | 1,766,255 | 23.3 | 75,968 |
| Broadcom Corporation Class A | 0.10 | 289,233 | 17.0 | 17,044 |
| Brown-Forman Corporation Class B | 0.06 | 193,791 | 34.3 | 5,646 |
| Burlington Northern | 0.27 | 815,563 | 75.7 | 10,772 |
| C. R. Bard, Inc. | 0.11 | 320,763 | 84.3 | 3,807 |
| C.H. Robinson Worldwide, Inc. | 0.12 | 357,322 | 55.0 | 6,493 |
| CA, Inc. | 0.09 | 280,097 | 18.5 | 15,116 |
| Cabot Oil & Gas Corporation | 0.03 | 103,119 | 6.5 | 15,865 |
| Cameron International Corporation | 0.06 | 172,693 | 20.5 | 8,424 |
| Campbell Soup Company | 0.08 | 236,940 | 30.0 | 7,895 |
| Capital One Financial Corporation | 0.16 | 479,303 | 31.9 | 15,030 |
| Cardinal Health, Inc. | 0.16 | 475,691 | 34.5 | 13,800 |
| Carnival Corporation | 0.14 | 407,849 | 24.3 | 16,770 |
| Caterpillar Inc. | 0.34 | 1,034,075 | 44.7 | 23,149 |
| CB Richard Ellis Group Inc. | 0.01 | 36,968 | 4.3 | 8,558 |
| CBS Corporation Class B | 0.07 | 213,693 | 8.2 | 26,092 |
| Celgene Corporation | 0.32 | 971,988 | 27.6 | 35,166 |
| CenterPoint Energy, Inc. | 0.06 | 166,676 | 12.6 | 13,207 |
| Centex Corp. | 0.02 | 50,760 | 10.6 | 4,771 |
| CenturyLink, Inc. | 0.04 | 105,024 | 27.3 | 3,843 |
| Cephalon Inc | 0.07 | 202,355 | 77.0 | 2,627 |
| CF Industries Holdings, Inc. | 0.04 | 107,269 | 49.2 | 2,182 |
| Charles Schwab Corporation | 0.19 | 580,633 | 16.2 | 35,908 |
| Chesapeake Energy Corporation | 0.11 | 335,615 | 16.2 | 20,755 |
| Chevron Corporation | 1.92 | 5,767,461 | 74.0 | 77,970 |
| Chubb Corporation | 0.23 | 696,155 | 51.0 | 13,650 |
| Ciena Corporation | 0.01 | 23,222 | 6.7 | 3,466 |
| Cigna Corporation | 0.06 | 177,728 | 16.9 | 10,548 |
| Cincinnati Financial Corporation | 0.06 | 181,148 | 29.1 | 6,231 |
| Cintas Corporation | 0.04 | 117,134 | 23.2 | 5,042 |
| Cisco Systems, Inc. | 1.22 | 3,662,443 | 16.3 | 224,690 |
| CIT Group Inc. (Old) | 0.02 | 62,815 | 4.5 | 13,836 |
| Citigroup Inc. | 0.47 | 1,403,241 | 67.1 | 20,913 |
| Citrix Systems, Inc. | 0.05 | 164,305 | 23.6 | 6,971 |
| Clorox Company | 0.10 | 295,754 | 55.6 | 5,323 |
| CME Group Inc. Class A | 0.18 | 534,951 | 41.6 | 12,853 |
| CMS Energy Corporation | 0.03 | 87,761 | 10.1 | 8,681 |
| Coach, Inc. | 0.09 | 260,575 | 20.8 | 12,546 |
| Coca-Cola Company | 1.15 | 3,456,518 | 22.6 | 152,707 |
| Coca-Cola Enterprises, Inc. | 0.05 | 146,416 | 12.0 | 12,171 |
| Cognizant Technology Solutions Corporation Class A | 0.07 | 201,809 | 9.0 | 22,349 |
| Colgate-Palmolive Company | 0.44 | 1,327,517 | 34.3 | 38,737 |
| Comcast Corporation Class A | 0.62 | 1,865,439 | 16.9 | 110,512 |
| Comerica Incorporated | 0.04 | 114,633 | 19.9 | 5,775 |
| Computer Sciences Corporation | 0.07 | 204,274 | 35.1 | 5,813 |
| Compuware Corporation | 0.02 | 63,849 | 6.8 | 9,459 |
| ConAgra Foods, Inc. | 0.09 | 283,089 | 16.5 | 17,157 |
| ConocoPhillips | 0.99 | 2,963,495 | 51.8 | 57,210 |
| CONSOL Energy Inc. | 0.07 | 198,727 | 28.6 | 6,953 |
| Consolidated Edison, Inc. | 0.14 | 408,786 | 38.9 | 10,501 |
| Constellation Brands, Inc. Class A | 0.04 | 117,803 | 15.8 | 7,470 |
| Constellation Energy Group Inc. | 0.06 | 171,783 | 25.1 | 6,847 |
| Convergys Corporation | 0.01 | 30,026 | 6.4 | 4,684 |
| Cooper Industries PLC Cl A | 0.06 | 194,406 | 29.2 | 6,651 |
| Corning Incorporated | 0.19 | 568,442 | 9.5 | 59,648 |
| Costco Wholesale Corporation | 0.29 | 869,695 | 52.5 | 16,566 |
| Coventry Health Care Inc. | 0.03 | 85,068 | 14.9 | 5,717 |
| Covidien Plc | 0.23 | 700,331 | 36.2 | 19,325 |
| CSX Corporation | 0.16 | 491,525 | 10.8 | 45,413 |
| Cummins Inc. | 0.07 | 206,561 | 26.7 | 7,728 |
| CVS Health Corporation | 0.53 | 1,584,018 | 28.7 | 55,115 |
| D.R. Horton, Inc. | 0.02 | 74,744 | 7.1 | 10,572 |
| Danaher Corporation | 0.19 | 555,458 | 28.3 | 19,624 |
| Darden Restaurants, Inc. | 0.05 | 150,016 | 28.2 | 5,324 |
| DaVita HealthCare Partners Inc. | 0.07 | 197,455 | 24.8 | 7,967 |
| Dean Foods Company | 0.04 | 106,163 | 35.9 | 2,954 |
| Deere & Company | 0.21 | 627,928 | 38.3 | 16,386 |
| Dell Inc. | 0.23 | 680,037 | 10.2 | 66,410 |
| DENTSPLY International Inc. | 0.05 | 161,421 | 28.2 | 5,716 |
| Developers Diversified Realty Corp. | 0.01 | 22,523 | 4.9 | 4,615 |
| Devon Energy Corporation | 0.37 | 1,114,056 | 65.7 | 16,954 |
| DirecTV Group Inc. | 0.16 | 480,159 | 22.9 | 20,959 |

APPENDIX 1-continued

Example MMACC embodiments (initial purchases)
2008 Tranche - 5 Year Maturity
Initialization (Dec. 31, 2008)

| Company Name | Initial Weight (%) | $ Invested | Purchase Price* | Shares |
|---|---|---|---|---|
| Discover Financial Services | 0.06 | 175,514 | 9.5 | 18,417 |
| Dominion Resources, Inc. | 0.27 | 799,557 | 35.8 | 22,309 |
| Dover Corporation | 0.08 | 234,930 | 32.9 | 7,136 |
| Dow Chemical Company | 0.18 | 534,944 | 15.1 | 35,450 |
| Dr Pepper Snapple Group, Inc. | 0.05 | 158,197 | 16.3 | 9,735 |
| DTE Energy Company | 0.07 | 223,155 | 35.7 | 6,256 |
| Duke Energy Corporation | 0.24 | 728,820 | 45.0 | 16,185 |
| Dun & Bradstreet Corporation | 0.05 | 159,722 | 77.2 | 2,069 |
| Dynegy Inc. | 0.01 | 38,816 | 1,228.6 | 32 |
| E*TRADE Financial Corporation | 0.01 | 24,834 | 11.5 | 2,160 |
| E. I. du Pont de Nemours and Company | 0.29 | 876,095 | 25.3 | 34,628 |
| Eastman Chemical Company | 0.03 | 88,277 | 15.9 | 5,568 |
| Eastman Kodak Company | 0.02 | 67,787 | 6.6 | 10,302 |
| Eaton Corp. | 0.10 | 314,568 | 24.9 | 12,656 |
| eBay Inc. | 0.19 | 574,628 | 14.0 | 41,162 |
| Ecolab Inc. | 0.08 | 226,147 | 35.2 | 6,434 |
| Edison International | 0.13 | 401,597 | 32.1 | 12,503 |
| El Paso Corp. | 0.07 | 210,695 | 7.8 | 26,909 |
| Electronic Arts Inc. | 0.07 | 197,513 | 16.0 | 12,314 |
| Eli Lilly and Company | 0.52 | 1,546,167 | 40.3 | 38,395 |
| Embarq Corp. | 0.07 | 196,142 | 36.0 | 5,454 |
| EMC Corporation | 0.27 | 819,950 | 10.5 | 78,314 |
| Emerson Electric Co. | 0.36 | 1,077,657 | 36.6 | 29,436 |
| Ensco plc | 0.05 | 154,512 | 28.4 | 5,442 |
| Entergy Corporation | 0.20 | 603,985 | 83.1 | 7,266 |
| EOG Resources, Inc. | 0.21 | 637,684 | 33.3 | 19,155 |
| Equifax Inc. | 0.04 | 128,544 | 26.5 | 4,847 |
| Equitable Resources Inc. | 0.06 | 168,475 | 33.6 | 5,022 |
| Equity Residential | 0.10 | 311,290 | 29.8 | 10,439 |
| Estee Lauder Companies Inc. Class A | 0.05 | 137,653 | 15.5 | 8,892 |
| Exelon Corporation | 0.47 | 1,404,034 | 55.6 | 25,248 |
| Expedia, Inc. | 0.02 | 66,235 | 16.5 | 4,019 |
| Expeditors International of Washington, Inc. | 0.09 | 270,736 | 33.3 | 8,138 |
| Express Scripts Holding Company | 0.17 | 522,105 | 27.5 | 18,993 |
| Exxon Mobil Corporation | 5.19 | 15,582,884 | 79.8 | 195,201 |
| Family Dollar Stores, Inc. | 0.05 | 139,781 | 26.1 | 5,362 |
| Fastenal Company | 0.06 | 172,817 | 17.4 | 9,918 |
| Federated Investors, Inc. Class B | 0.02 | 57,648 | 17.0 | 3,399 |
| FedEx Corporation | 0.26 | 766,205 | 64.2 | 11,944 |
| Fidelity National Information Services, Inc. | 0.04 | 118,625 | 16.3 | 7,291 |
| Fifth Third Bancorp | 0.06 | 183,050 | 8.3 | 22,161 |
| First Horizon National Corporation | 0.03 | 83,275 | 9.2 | 9,011 |
| FirstEnergy Corp. | 0.19 | 568,294 | 48.6 | 11,698 |
| Fiserv, Inc. | 0.07 | 223,525 | 18.2 | 12,292 |
| Flowserve Corporation | 0.04 | 111,743 | 17.2 | 6,509 |
| Fluor Corporation | 0.10 | 312,534 | 44.9 | 6,965 |
| Ford Motor Company | 0.07 | 209,930 | 2.3 | 91,672 |
| Forest Laboratories, Inc. | 0.10 | 294,573 | 25.5 | 11,565 |
| Fortune Brands Inc. | 0.08 | 237,470 | 41.3 | 5,753 |
| FPL Group Inc. | 0.26 | 789,424 | 50.3 | 15,685 |
| Franklin Resources, Inc. | 0.12 | 370,215 | 21.3 | 17,414 |
| Freeport-McMoRan, Inc. | 0.12 | 354,197 | 12.2 | 28,985 |
| Frontier Communications Corporation Class B | 0.03 | 104,415 | 8.7 | 11,947 |
| GameStop Corp. Class A | 0.05 | 136,132 | 21.7 | 6,285 |
| Gannett Co., Inc. | 0.02 | 70,032 | 8.0 | 8,754 |
| Gap, Inc. | 0.08 | 239,594 | 13.4 | 17,894 |
| General Dynamics Corporation | 0.29 | 861,574 | 57.6 | 14,960 |
| General Electric Company | 2.18 | 6,529,650 | 16.2 | 403,065 |
| General Mills, Inc. | 0.26 | 778,971 | 30.4 | 25,645 |
| General Motors Corporation | 0.02 | 74,964 | 3.2 | 23,426 |
| Genuine Parts Company | 0.08 | 231,643 | 37.9 | 6,118 |
| Genworth Financial, Inc. Class A | 0.02 | 47,038 | 2.8 | 16,621 |
| Genzyme Corp. | 0.23 | 689,004 | 66.4 | 10,381 |
| Gilead Sciences, Inc. | 0.60 | 1,805,338 | 25.6 | 70,604 |
| Goldman Sachs Group, Inc. | 0.48 | 1,432,029 | 84.4 | 16,969 |
| Goodrich Corp. | 0.06 | 174,881 | 37.0 | 4,724 |
| Goodyear Tire & Rubber Company | 0.02 | 55,279 | 6.0 | 9,260 |
| Google Inc. Class A | 0.94 | 2,824,175 | 154.0 | 18,342 |
| Graham Holdings Co. | 0.03 | 89,768 | 390.3 | 230 |
| H&R Block, Inc. | 0.10 | 295,522 | 22.7 | 13,007 |
| H. J. Heinz Company | 0.15 | 453,707 | 37.6 | 12,067 |
| Halliburton Company | 0.21 | 623,538 | 18.2 | 34,298 |
| Harley-Davidson, Inc. | 0.05 | 151,622 | 17.0 | 8,935 |

APPENDIX 1-continued

Example MMACC embodiments (initial purchases)
2008 Tranche - 5 Year Maturity
Initialization (Dec. 31, 2008)

| Company Name | Initial Weight (%) | $ Invested | Purchase Price* | Shares |
|---|---|---|---|---|
| Harman International Industries, Incorporated | 0.01 | 37,586 | 16.7 | 2,247 |
| Harris Corporation | 0.07 | 196,527 | 38.1 | 5,165 |
| Hartford Financial Services Group, Inc. | 0.06 | 189,850 | 16.4 | 11,562 |
| Hasbro, Inc. | 0.05 | 138,681 | 29.2 | 4,754 |
| HCP, Inc. | 0.09 | 269,247 | 27.8 | 9,696 |
| Hershey Company | 0.07 | 221,112 | 34.7 | 6,365 |
| Hess Corporation | 0.19 | 583,938 | 53.6 | 10,886 |
| Hewlett-Packard Company | 1.14 | 3,410,705 | 36.3 | 93,985 |
| Home Depot, Inc. | 0.50 | 1,497,761 | 23.0 | 65,063 |
| Honeywell International Inc. | 0.31 | 915,016 | 32.8 | 27,871 |
| Hospira, Inc. | 0.05 | 164,259 | 26.8 | 6,125 |
| Host Hotels & Resorts, Inc. | 0.05 | 151,800 | 7.6 | 20,053 |
| Hudson City Bancorp, Inc. | 0.11 | 319,247 | 16.0 | 20,003 |
| Humana Inc. | 0.08 | 241,363 | 37.3 | 6,474 |
| Huntington Bancshares Incorporated | 0.04 | 107,603 | 7.7 | 14,047 |
| Illinois Tool Works Inc. | 0.18 | 529,406 | 35.1 | 15,104 |
| IMS Health Inc. | 0.04 | 105,807 | 15.2 | 6,979 |
| Ingersoll-Rand Plc | 0.07 | 212,250 | 17.4 | 12,233 |
| Integrys Energy Group, Inc. | 0.04 | 126,050 | 43.0 | 2,933 |
| Intel Corporation | 1.04 | 3,129,068 | 14.7 | 213,443 |
| IntercontinentalExchange, Inc. | 0.08 | 228,554 | 82.4 | 2,772 |
| International Business Machines Corporation | 1.45 | 4,338,901 | 84.2 | 51,555 |
| International Flavors & Fragrances Inc. | 0.03 | 89,696 | 29.7 | 3,018 |
| International Game Technology | 0.04 | 134,465 | 11.9 | 11,309 |
| International Paper Company | 0.06 | 193,608 | 11.8 | 16,407 |
| Interpublic Group of Companies, Inc. | 0.02 | 72,418 | 4.0 | 18,287 |
| Intuit Inc. | 0.10 | 292,198 | 23.8 | 12,282 |
| Intuitive Surgical, Inc. | 0.06 | 190,613 | 127.0 | 1,501 |
| Invesco Ltd. | 0.07 | 213,326 | 14.4 | 14,773 |
| ITT Corporation | 0.11 | 320,483 | 92.0 | 3,484 |
| J. C. Penney Company, Inc. | 0.06 | 167,969 | 19.7 | 8,526 |
| J. M. Smucker Company | 0.07 | 197,064 | 43.4 | 4,545 |
| Jabil Circuit, Inc. | 0.02 | 54,565 | 6.8 | 8,084 |
| Jacobs Engineering Group Inc. | 0.08 | 226,792 | 48.1 | 4,715 |
| Janus Capital Group Inc. | 0.02 | 48,644 | 8.0 | 6,058 |
| JDS Uniphase Corporation | 0.01 | 30,795 | 3.7 | 8,437 |
| Johnson & Johnson | 2.12 | 6,370,364 | 59.8 | 106,474 |
| Johnson Controls, Inc. | 0.14 | 414,078 | 18.2 | 22,802 |
| Jones Apparel Group Inc. | 0.01 | 18,760 | 5.9 | 3,201 |
| JPMorgan Chase & Co. | 1.51 | 4,516,035 | 31.5 | 143,230 |
| Juniper Networks, Inc. | 0.12 | 354,754 | 17.5 | 20,260 |
| KB Home | 0.01 | 39,349 | 13.6 | 2,889 |
| Kellogg Company | 0.14 | 423,922 | 43.9 | 9,668 |
| KeyCorp | 0.05 | 161,846 | 8.5 | 18,996 |
| Kimberly-Clark Corporation | 0.28 | 837,412 | 52.7 | 15,878 |
| Kimco Realty Corporation | 0.05 | 160,647 | 18.3 | 8,788 |
| King Pharmaceuticals | 0.03 | 100,450 | 10.6 | 9,459 |
| KLA-Tencor Corporation | 0.05 | 141,200 | 21.8 | 6,480 |
| Kohl's Corporation | 0.14 | 423,307 | 36.2 | 11,694 |
| Kraft Foods Inc. | 0.50 | 1,513,749 | 26.9 | 56,378 |
| Kroger Co. | 0.22 | 661,277 | 26.4 | 25,039 |
| L-3 Communications Holdings, Inc. | 0.11 | 338,056 | 73.8 | 4,582 |
| Laboratory Corporation of America Holdings | 0.09 | 266,948 | 64.4 | 4,145 |
| Legg Mason, Inc. | 0.04 | 119,330 | 21.9 | 5,446 |
| Leggett & Platt, Incorporated | 0.03 | 91,052 | 15.2 | 5,994 |
| Lennar Corporation Class A | 0.02 | 47,011 | 8.7 | 5,422 |
| Leucadia National Corporation | 0.04 | 134,486 | 19.8 | 6,792 |
| Lexmark International, Inc. Class A | 0.03 | 80,930 | 26.9 | 3,009 |
| Life Technologies Corporation | 0.05 | 154,358 | 23.3 | 6,622 |
| Limited Brands Inc. | 0.03 | 104,252 | 10.0 | 10,384 |
| Lincoln National Corporation | 0.06 | 184,999 | 18.8 | 9,819 |
| Linear Technology Corporation | 0.06 | 188,217 | 22.1 | 8,509 |
| Lockheed Martin Corporation | 0.36 | 1,074,243 | 84.1 | 12,776 |
| Loews Corporation | 0.13 | 392,395 | 28.3 | 13,890 |
| Lorillard, Inc. | 0.12 | 363,444 | 18.8 | 19,349 |
| Lowe's Companies, Inc. | 0.40 | 1,210,408 | 21.5 | 56,246 |
| LSI Corporation | 0.03 | 81,446 | 3.3 | 24,756 |
| M&T Bank Corporation | 0.06 | 170,081 | 57.4 | 2,963 |
| Macy's Inc | 0.06 | 167,041 | 10.4 | 16,139 |
| Manitowoc Company, Inc. | 0.01 | 43,320 | 8.7 | 5,002 |
| Marathon Oil Corporation | 0.25 | 740,816 | 27.4 | 27,077 |
| Marriott International, Inc. Class A | 0.07 | 218,876 | 19.2 | 11,377 |
| Marsh & McLennan Companies, Inc. | 0.16 | 478,794 | 24.3 | 19,728 |

APPENDIX 1-continued

Example MMACC embodiments (initial purchases)
2008 Tranche - 5 Year Maturity
Initialization (Dec. 31, 2008)

| Company Name | Initial Weight (%) | $ Invested | Purchase Price* | Shares |
|---|---|---|---|---|
| Marshall & Ilsley | 0.05 | 136,249 | 13.6 | 9,989 |
| Masco Corporation | 0.05 | 153,719 | 11.1 | 13,811 |
| Massey Energy Co. | 0.02 | 45,053 | 13.8 | 3,267 |
| MasterCard Incorporated Class A | 0.13 | 396,957 | 14.3 | 27,773 |
| Mattel, Inc. | 0.07 | 220,078 | 16.0 | 13,755 |
| MBIA Inc. | 0.01 | 29,424 | 4.1 | 7,229 |
| McAfee | 0.07 | 202,499 | 34.6 | 5,858 |
| McCormick & Company, Incorporated | 0.05 | 158,935 | 31.9 | 4,989 |
| McDonald's Corporation | 0.89 | 2,659,916 | 62.2 | 42,771 |
| McGraw Hill Financial, Inc. | 0.09 | 279,880 | 23.2 | 12,069 |
| McKesson Corporation | 0.14 | 410,079 | 38.7 | 10,588 |
| MeadWestvaco Corporation | 0.02 | 73,349 | 11.2 | 6,555 |
| Medco Health Solutions | 0.27 | 800,967 | 41.9 | 19,112 |
| Medtronic, Inc. | 0.45 | 1,348,296 | 31.4 | 42,912 |
| Memc Electronic Materials Inc. | 0.04 | 123,000 | 14.3 | 8,613 |
| Merck & Co., Inc. | 0.82 | 2,466,417 | 30.4 | 81,132 |
| Meredith Corporation | 0.01 | 23,741 | 17.1 | 1,387 |
| MetLife, Inc. | 0.35 | 1,061,633 | 34.9 | 30,454 |
| Microchip Technology Incorporated | 0.05 | 136,321 | 19.5 | 6,980 |
| Micron Technology, Inc. | 0.03 | 77,378 | 2.6 | 29,310 |
| Microsoft Corporation | 1.90 | 5,707,141 | 19.4 | 293,577 |
| Millipore Corp | 0.04 | 109,212 | 51.5 | 2,120 |
| Molex Incorporated | 0.03 | 78,321 | 14.5 | 5,405 |
| Molson Coors Brewing Company Class B | 0.09 | 279,410 | 48.9 | 5,712 |
| Monsanto Company | 0.49 | 1,479,260 | 70.4 | 21,027 |
| Monster Worldwide, Inc. | 0.02 | 57,169 | 12.1 | 4,729 |
| Moody's Corporation | 0.05 | 149,748 | 20.1 | 7,454 |
| Morgan Stanley | 0.22 | 653,690 | 16.0 | 40,754 |
| Motorola Inc. | 0.13 | 385,284 | 31.0 | 12,425 |
| Murphy Oil Corporation | 0.11 | 324,195 | 44.4 | 7,310 |
| Mylan Inc. | 0.04 | 115,642 | 9.9 | 11,693 |
| Nabors Industries Ltd. | 0.04 | 130,720 | 12.0 | 10,921 |
| NASDAQ OMX Group, Inc. | 0.04 | 129,090 | 24.7 | 5,224 |
| National Oilwell Varco, Inc. | 0.13 | 391,404 | 24.4 | 16,015 |
| National Semiconductor Corp | 0.03 | 75,383 | 10.1 | 7,486 |
| NetApp, Inc. | 0.06 | 176,999 | 14.0 | 12,670 |
| New York Times Company Class A | 0.01 | 32,762 | 7.3 | 4,470 |
| Newell Rubbermaid Inc. | 0.03 | 104,035 | 9.8 | 10,638 |
| Newmont Mining Corporation | 0.24 | 709,545 | 40.7 | 17,434 |
| News Corp. Cl A | 0.27 | 802,284 | 9.1 | 88,260 |
| Nicor Inc | 0.02 | 60,245 | 34.7 | 1,734 |
| NIKE, Inc. Class B | 0.26 | 767,841 | 25.5 | 30,111 |
| NiSource Inc. | 0.04 | 115,449 | 11.0 | 10,524 |
| Noble Corp. | 0.07 | 223,742 | 22.1 | 10,129 |
| Noble Energy, Inc. | 0.11 | 326,286 | 24.6 | 13,258 |
| Nordstrom, Inc. | 0.03 | 81,410 | 13.3 | 6,116 |
| Norfolk Southern Corporation | 0.22 | 668,557 | 47.1 | 14,210 |
| Northern Trust Corporation | 0.15 | 446,264 | 52.1 | 8,559 |
| Northrop Grumman Corporation | 0.19 | 565,091 | 45.0 | 12,546 |
| Novell, Inc. | 0.02 | 51,540 | 3.9 | 13,249 |
| Novellus Systems Inc. | 0.02 | 46,249 | 12.3 | 3,748 |
| Nucor Corporation | 0.19 | 556,612 | 46.2 | 12,048 |
| NVIDIA Corporation | 0.06 | 166,320 | 8.1 | 20,610 |
| NYSE Euronext | 0.09 | 278,437 | 27.4 | 10,169 |
| Occidental Petroleum Corporation | 0.62 | 1,864,438 | 60.0 | 31,079 |
| Office Depot, Inc. | 0.01 | 31,436 | 3.0 | 10,549 |
| Omnicom Group Inc | 0.11 | 321,073 | 26.9 | 11,927 |
| Oracle Corporation | 0.89 | 2,665,355 | 17.7 | 150,330 |
| PACCAR Inc | 0.13 | 398,051 | 28.6 | 13,918 |
| Pactiv Corp | 0.04 | 125,450 | 24.9 | 5,042 |
| Pall Corporation | 0.04 | 128,825 | 28.4 | 4,531 |
| Parker-Hannifin Corporation | 0.09 | 263,079 | 42.5 | 6,184 |
| Patterson Companies, Inc. | 0.02 | 65,606 | 18.8 | 3,499 |
| Paychex, Inc. | 0.11 | 323,836 | 26.3 | 12,323 |
| Peabody Energy Corporation | 0.08 | 232,779 | 22.8 | 10,232 |
| People's United Financial, Inc. | 0.08 | 237,961 | 17.8 | 13,346 |
| Pepco Holdings, Inc. | 0.05 | 147,356 | 17.8 | 8,297 |
| Pepsi Bottling | 0.04 | 116,733 | 22.5 | 5,186 |
| PepsiCo, Inc. | 1.09 | 3,264,359 | 54.8 | 59,601 |
| PerkinElmer, Inc. | 0.02 | 63,044 | 13.9 | 4,532 |
| Pfizer Inc. | 1.53 | 4,582,659 | 17.7 | 258,761 |
| PG&E Corporation | 0.18 | 536,243 | 38.7 | 13,853 |
| Philip Morris International Inc. | 1.13 | 3,377,865 | 43.5 | 77,634 |

APPENDIX 1-continued

Example MMACC embodiments (initial purchases)
2008 Tranche - 5 Year Maturity
Initialization (Dec. 31, 2008)

| Company Name | Initial Weight (%) | $ Invested | Purchase Price* | Shares |
|---|---|---|---|---|
| Pinnacle West Capital Corporation | 0.04 | 124,305 | 32.1 | 3,869 |
| Pioneer Natural Resources Company | 0.02 | 73,075 | 16.2 | 4,516 |
| Pitney Bowes Inc. | 0.07 | 201,550 | 25.5 | 7,910 |
| Plum Creek Timber Company, Inc. | 0.07 | 222,359 | 34.7 | 6,401 |
| PNC Financial Services Group, Inc. | 0.22 | 654,639 | 49.0 | 13,360 |
| Polo Ralph Lauren Corp. | 0.03 | 98,042 | 45.4 | 2,159 |
| PPG Industries, Inc. | 0.09 | 267,379 | 42.4 | 6,302 |
| PPL Corporation | 0.15 | 441,651 | 30.7 | 14,391 |
| Praxair, Inc. | 0.23 | 702,512 | 59.4 | 11,835 |
| Precision Castparts Corp. | 0.11 | 318,235 | 59.5 | 5,350 |
| Principal Financial Group, Inc. | 0.07 | 224,622 | 22.6 | 9,952 |
| Procter & Gamble Company | 2.36 | 7,083,139 | 61.8 | 114,577 |
| Progress Energy Inc. | 0.13 | 402,326 | 39.9 | 10,096 |
| Progressive Corporation | 0.13 | 383,985 | 14.8 | 25,927 |
| Prologis | 0.05 | 141,603 | 13.9 | 10,195 |
| Prudential Financial, Inc. | 0.16 | 492,363 | 30.3 | 16,271 |
| Public Service Enterprise Group Incorporated | 0.19 | 566,525 | 29.2 | 19,422 |
| Public Storage | 0.13 | 382,436 | 79.5 | 4,811 |
| PulteGroup, Inc. | 0.03 | 89,639 | 10.9 | 8,201 |
| QLogic Corporation | 0.02 | 65,982 | 13.4 | 4,909 |
| QUALCOMM Incorporated | 0.76 | 2,276,244 | 35.8 | 63,529 |
| Quest Diagnostics Incorporated | 0.11 | 315,626 | 51.9 | 6,080 |
| Questar Corporation | 0.07 | 217,571 | 32.7 | 6,656 |
| Qwest Communications International Inc | 0.07 | 204,633 | 3.6 | 56,218 |
| R.R. Donnelley & Sons Company | 0.04 | 106,832 | 13.6 | 7,867 |
| RadioShack Corporation | 0.02 | 57,307 | 11.9 | 4,800 |
| Range Resources Corporation | 0.07 | 205,000 | 34.4 | 5,961 |
| Raytheon Company | 0.27 | 811,019 | 51.0 | 15,890 |
| Regions Financial Corporation | 0.07 | 211,370 | 8.0 | 26,554 |
| Republic Services, Inc. | 0.10 | 305,417 | 24.8 | 12,320 |
| Reynolds American Inc. | 0.09 | 261,491 | 20.2 | 12,974 |
| Robert Half International Inc. | 0.04 | 123,955 | 20.8 | 5,954 |
| Rockwell Automation, Inc. | 0.06 | 175,065 | 32.2 | 5,430 |
| Rockwell Collins, Inc. | 0.08 | 237,476 | 39.1 | 6,075 |
| Rohm & Haas Co. | 0.10 | 296,230 | 61.8 | 4,794 |
| Rowan Cos. Plc Class A | 0.02 | 68,950 | 15.9 | 4,336 |
| Ryder System, Inc. | 0.03 | 82,769 | 38.8 | 2,134 |
| Safeway Inc. | 0.13 | 391,051 | 23.8 | 16,451 |
| salesforce.com, inc. | 0.04 | 128,882 | 8.0 | 16,105 |
| SanDisk Corporation | 0.03 | 83,272 | 9.6 | 8,674 |
| Sara Lee Corp. | 0.09 | 265,583 | 49.0 | 5,426 |
| Schering-Plough Corp. | 0.35 | 1,062,371 | 17.0 | 62,382 |
| Schlumberger NV | 0.65 | 1,943,079 | 42.3 | 45,903 |
| Scripps Networks Interactive, Inc. Class A | 0.03 | 76,034 | 22.0 | 3,456 |
| Sealed Air Corporation | 0.03 | 90,512 | 14.9 | 6,058 |
| Sears Holdings Corporation | 0.03 | 82,998 | 38.9 | 2,135 |
| Sempra Energy | 0.13 | 398,563 | 42.6 | 9,349 |
| Sherwin-Williams Company | 0.08 | 225,158 | 59.8 | 3,768 |
| Sigma-Aldrich Corporation | 0.07 | 203,199 | 42.2 | 4,811 |
| Simon Property Group, Inc. | 0.15 | 460,399 | 51.9 | 8,872 |
| SLM Corp | 0.05 | 159,595 | 8.9 | 17,932 |
| Smith International | 0.06 | 192,246 | 22.9 | 8,399 |
| Snap-on Incorporated | 0.03 | 86,803 | 39.4 | 2,204 |
| Southern Company | 0.37 | 1,099,810 | 37.0 | 29,725 |
| Southwest Airlines Co. | 0.08 | 244,696 | 8.6 | 28,387 |
| Southwestern Energy Company | 0.13 | 381,686 | 29.0 | 13,175 |
| Sovereign Bancorp Inc. | 0.02 | 62,261 | 3.0 | 20,893 |
| Spectra Energy Corp | 0.12 | 369,088 | 15.7 | 23,449 |
| Sprint Nextel Corporation | 0.07 | 200,622 | 1.8 | 109,630 |
| St. Jude Medical, Inc. | 0.15 | 435,335 | 33.0 | 13,208 |
| Staples, Inc. | 0.16 | 490,585 | 17.9 | 27,376 |
| Starbucks Corporation | 0.09 | 267,008 | 9.5 | 28,225 |
| Starwood Hotels & Resorts Worldwide, Inc. | 0.04 | 125,724 | 17.9 | 7,024 |
| State Street Corporation | 0.22 | 651,946 | 39.3 | 16,576 |
| Stericycle, Inc. | 0.06 | 171,015 | 52.1 | 3,284 |
| Stryker Corporation | 0.12 | 371,375 | 40.0 | 9,296 |
| Sun Microsystems | 0.04 | 108,272 | 3.8 | 28,343 |
| Sunoco Inc. | 0.06 | 194,900 | 43.5 | 4,485 |
| SunTrust Banks, Inc. | 0.13 | 401,419 | 29.5 | 13,589 |
| SUPERVALU INC. | 0.04 | 118,640 | 14.6 | 8,126 |
| Symantec Corporation | 0.14 | 433,751 | 13.5 | 32,082 |
| Sysco Corporation | 0.18 | 527,439 | 22.9 | 22,992 |
| T. Rowe Price Group | 0.12 | 351,422 | 35.4 | 9,916 |

APPENDIX 1-continued

Example MMACC embodiments (initial purchases)
2008 Tranche - 5 Year Maturity
Initialization (Dec. 31, 2008)

| Company Name | Initial Weight (%) | $ Invested | Purchase Price* | Shares |
|---|---|---|---|---|
| Target Corporation | 0.33 | 997,504 | 34.5 | 28,888 |
| TECO Energy, Inc. | 0.03 | 100,844 | 12.4 | 8,166 |
| Tellabs, Inc. | 0.02 | 62,930 | 4.1 | 15,274 |
| Tenet Healthcare Corporation | 0.01 | 18,320 | 4.6 | 3,983 |
| Teradata Corporation | 0.03 | 100,163 | 14.8 | 6,754 |
| Teradyne, Inc. | 0.01 | 27,414 | 4.2 | 6,496 |
| Tesoro Corporation | 0.02 | 69,978 | 13.2 | 5,313 |
| Texas Instruments Incorporated | 0.26 | 772,128 | 15.5 | 49,751 |
| Textron Inc. | 0.04 | 128,328 | 13.9 | 9,252 |
| The Stanley Works | 0.03 | 103,110 | 34.1 | 3,024 |
| Thermo Fisher Scientific Inc. | 0.18 | 549,405 | 34.1 | 16,126 |
| Tiffany & Co. | 0.04 | 111,635 | 23.6 | 4,724 |
| Time Warner Inc. | 0.46 | 1,384,951 | 30.2 | 45,890 |
| Titanium Metals Corp. | 0.01 | 28,770 | 8.8 | 3,266 |
| TJX Companies, Inc. | 0.11 | 328,648 | 10.3 | 31,954 |
| Torchmark Corporation | 0.05 | 145,864 | 19.9 | 7,342 |
| Total System Services, Inc. | 0.04 | 105,747 | 14.0 | 7,553 |
| Travelers Companies, Inc. | 0.34 | 1,013,887 | 45.2 | 22,431 |
| Tyco Electronics Ltd. | 0.09 | 284,671 | 16.2 | 17,561 |
| Tyco International Ltd. | 0.13 | 392,015 | 21.6 | 18,149 |
| Tyson Foods, Inc. Class A | 0.03 | 101,559 | 8.8 | 11,593 |
| U.S. Bancorp | 0.56 | 1,683,977 | 25.0 | 67,332 |
| Union Pacific Corporation | 0.31 | 928,963 | 23.9 | 38,869 |
| United Parcel Service, Inc. Class B | 0.70 | 2,106,579 | 55.2 | 38,190 |
| United States Steel Corporation | 0.06 | 165,962 | 37.2 | 4,461 |
| United Technologies Corporation | 0.65 | 1,955,327 | 53.6 | 36,480 |
| UnitedHealth Group Incorporated | 0.41 | 1,232,907 | 26.6 | 46,350 |
| Unum Group | 0.08 | 236,343 | 18.6 | 12,707 |
| UST Inc. | 0.13 | 395,095 | 69.4 | 5,695 |
| V.F. Corporation | 0.06 | 185,086 | 13.7 | 13,517 |
| Valero Energy Corporation | 0.14 | 428,520 | 21.6 | 19,802 |
| Varian Medical Systems, Inc. | 0.06 | 167,071 | 35.0 | 4,768 |
| VeriSign, Inc. | 0.05 | 142,074 | 19.1 | 7,446 |
| Verizon Communications Inc. | 1.23 | 3,695,235 | 33.9 | 109,004 |
| Viacom Inc. Class B | 0.15 | 448,750 | 19.1 | 23,544 |
| Vornado Realty Trust | 0.11 | 318,154 | 60.4 | 5,272 |
| Vulcan Materials Company | 0.10 | 294,106 | 69.6 | 4,227 |
| W.W. Grainger, Inc. | 0.07 | 195,620 | 78.8 | 2,481 |
| Walgreen Co. | 0.31 | 937,138 | 24.7 | 37,987 |
| Wal-Mart Stores, Inc. | 1.60 | 4,810,018 | 56.1 | 85,801 |
| Walt Disney Company | 0.54 | 1,611,749 | 22.7 | 71,033 |
| Waste Management, Inc. | 0.21 | 623,884 | 33.1 | 18,826 |
| Waters Corporation | 0.05 | 138,268 | 36.7 | 3,773 |
| Watson Pharmaceuticals Inc. | 0.04 | 106,660 | 26.6 | 4,014 |
| Weatherford International Ltd. | 0.09 | 282,806 | 10.8 | 26,137 |
| WellPoint, Inc. | 0.27 | 822,988 | 42.1 | 19,534 |
| Wells Fargo & Company | 1.43 | 4,287,306 | 29.5 | 145,431 |
| Western Union Company | 0.13 | 393,781 | 14.3 | 27,460 |
| Weyerhaeuser Company | 0.08 | 248,194 | 12.1 | 20,535 |
| Whirlpool Corporation | 0.04 | 116,636 | 41.4 | 2,821 |
| Whole Foods Market, Inc. | 0.02 | 50,832 | 4.7 | 10,769 |
| Williams Companies, Inc. | 0.11 | 321,552 | 14.5 | 22,207 |
| Windstream Corp. | 0.05 | 155,139 | 9.2 | 16,863 |
| Wisconsin Energy Corporation | 0.06 | 188,356 | 21.0 | 8,974 |
| Wyeth | 0.64 | 1,916,611 | 37.5 | 51,096 |
| Wyndham Worldwide Corporation | 0.01 | 44,571 | 6.6 | 6,805 |
| Wynn Resorts, Limited | 0.03 | 99,910 | 42.3 | 2,364 |
| Xcel Energy Inc. | 0.11 | 319,660 | 18.6 | 17,232 |
| Xerox Corporation | 0.09 | 264,742 | 8.0 | 33,217 |
| Xilinx, Inc. | 0.06 | 187,307 | 17.8 | 10,511 |
| XL Capital Ltd. | 0.02 | 46,969 | 3.7 | 12,694 |
| XTO Energy Inc | 0.26 | 780,719 | 35.3 | 22,135 |
| Yahoo! Inc. | 0.22 | 649,698 | 12.2 | 53,254 |
| YUM! Brands, Inc. | 0.19 | 559,149 | 31.5 | 17,751 |
| Zimmer Holdings, Inc. | 0.12 | 348,336 | 40.4 | 8,618 |
| Zions Bancorporation | 0.04 | 108,489 | 24.5 | 4,426 |

*Split adjusted for consistency
** - Companies that stop trading have their cash balances carried forward

APPENDIX 2

Example MMACC embodiments (5 years of dividends)
2008 Tranche - 5 Year Maturity

| | | 2009-2013 Dividend Income Row | | | | | | | | |
|---|---|---|---|---|---|---|---|---|---|---|
| Company Name | | Y1 Divs P/S* | Y1 Div $ Rec'd | Y2 Divs P/S* | Y2 Div $ Rec'd | Y3 Divs P/S* | Y3 Div $ Rec'd | Y4 Divs P/S* | Y4 Div $ Rec'd | Y5 Divs P/S* | Y5 Div $ Rec'd |
| | Sum: | | 8,044,745 | | 8,287,523 | | 10,444,385 | | 13,651,874 | | 14,405,821 |
| 3M Company | | 2.04 | 54,248 | 2.10 | 55,843 | 2.20 | 58,502 | 2.36 | 62,757 | 2.54 | 67,544 |
| Abbott Laboratories | | 1.56 | 92,885 | 1.72 | 102,412 | 1.88 | 111,939 | 2.01 | 119,679 | 34.72 | 2,067,298 |
| Abercrombie & Fitch Co. Class A | | 0.70 | 2,338 | 0.70 | 2,338 | 0.70 | 2,338 | 0.70 | 2,338 | 0.80 | 2,672 |
| Adobe Systems Incorporated | | 0.00 | 0 | 0.00 | 0 | 0.00 | 0 | 0.00 | 0 | 0.00 | 0 |
| Advanced Micro Devices, Inc. | | 0.00 | 0 | 0.00 | 0 | 0.00 | 0 | 0.00 | 0 | 0.00 | 0 |
| AES Corporation | | 0.00 | 0 | 0.00 | 0 | 0.00 | 0 | 0.04 | 1,033 | 0.16 | 4,131 |
| Aetna Inc. | | 0.04 | 708 | 0.04 | 708 | 0.45 | 7,963 | 0.70 | 12,386 | 0.80 | 14,156 |
| Affiliated Computer Services Inc. Cl A | | 0.00 | 0 | 0.00 | 0 | 0.00 | 0 | 0.00 | 0 | 0.00 | 0 |
| Aflac Incorporated | | 1.12 | 20,035 | 1.14 | 20,392 | 1.23 | 22,002 | 1.34 | 23,970 | 1.42 | 25,401 |
| Agilent Technologies, Inc. | | 0.00 | 0 | 0.00 | 0 | 0.00 | 0 | 0.40 | 5,372 | 0.49 | 6,608 |
| Air Products and Chemicals, Inc. | | 1.80 | 14,476 | 1.96 | 15,762 | 2.32 | 18,657 | 2.56 | 20,588 | 2.84 | 22,839 |
| AK Steel Holding Corporation | | 0.20 | 860 | 0.20 | 860 | 0.20 | 860 | 0.10 | 430 | 0.00 | 0 |
| Akamai Technologies, Inc. | | 0.00 | 0 | 0.00 | 0 | 0.00 | 0 | 0.00 | 0 | 0.00 | 0 |
| Alcoa Inc. | | 0.26 | 7,985 | 0.12 | 3,685 | 0.12 | 3,685 | 0.12 | 3,685 | 0.12 | 3,685 |
| Allegheny Energy | | 0.60 | 3,892 | 0.60 | 3,892 | 0.00 | 0 | 0.00 | 0 | 0.00 | 0 |
| Allegheny Technologies Incorporated | | 0.72 | 2,660 | 0.72 | 2,660 | 0.72 | 2,660 | 0.72 | 2,660 | 0.72 | 2,660 |
| Allergan, Inc. | | 0.20 | 2,360 | 0.20 | 2,360 | 0.20 | 2,360 | 0.20 | 2,360 | 0.20 | 2,360 |
| Allstate Corporation | | 0.80 | 16,454 | 0.80 | 16,454 | 0.84 | 17,277 | 0.88 | 18,100 | 1.00 | 20,568 |
| Altera Corporation | | 0.20 | 2,282 | 0.22 | 2,510 | 0.28 | 3,195 | 0.36 | 4,108 | 0.50 | 5,706 |
| Altria Group, Inc. | | 1.32 | 104,369 | 1.46 | 115,439 | 1.58 | 124,928 | 1.70 | 134,417 | 1.84 | 145,486 |
| Amazon.com, Inc. | | 0.00 | 0 | 0.00 | 0 | 0.00 | 0 | 0.00 | 0 | 0.00 | 0 |
| Ameren Corporation | | 1.54 | 12,497 | 1.54 | 12,497 | 1.55 | 12,619 | 1.60 | 12,984 | 1.60 | 12,984 |
| American Capital, Ltd. | | 1.07 | 8,490 | 0.00 | 0 | 0.00 | 0 | 0.00 | 0 | 0.00 | 0 |
| American Electric Power Company, Inc. | | 1.64 | 25,397 | 1.71 | 26,481 | 1.85 | 28,649 | 1.88 | 29,114 | 1.95 | 30,198 |
| American Express Company | | 0.72 | 32,048 | 0.72 | 32,048 | 0.72 | 32,048 | 0.78 | 34,719 | 0.86 | 38,279 |
| American International Group, Inc. | | 0.00 | 0 | 0.00 | 0 | 8.28 | 42,696 | 0.00 | 0 | 0.20 | 1,032 |
| American Tower Corporation | | 0.00 | 0 | 0.00 | 0 | 0.35 | 5,328 | 0.90 | 13,701 | 1.10 | 16,745 |
| Ameriprise Financial, Inc. | | 0.68 | 5,652 | 0.71 | 5,902 | 0.87 | 7,231 | 1.43 | 11,886 | 2.01 | 16,707 |
| AmerisourceBergen Corporation | | 0.24 | 2,878 | 0.34 | 4,077 | 0.46 | 5,515 | 0.60 | 7,194 | 0.87 | 10,371 |
| Amgen Inc. | | 0.00 | 0 | 0.00 | 0 | 0.56 | 22,769 | 1.44 | 58,549 | 1.88 | 76,439 |
| Amphenol Corporation Class A | | 0.03 | 405 | 0.03 | 405 | 0.03 | 405 | 0.21 | 2,833 | 0.31 | 4,115 |
| Anadarko Petroleum Corporation | | 0.36 | 6,342 | 0.36 | 6,342 | 0.36 | 6,342 | 0.36 | 6,342 | 0.54 | 9,513 |
| Analog Devices, Inc. | | 0.80 | 8,940 | 0.86 | 9,610 | 0.97 | 10,840 | 1.20 | 13,410 | 1.36 | 15,198 |
| Aon plc | | 0.60 | 6,212 | 0.60 | 6,212 | 0.60 | 6,212 | 0.62 | 6,445 | 0.68 | 7,066 |
| Apache Corporation | | 0.60 | 7,706 | 0.60 | 7,706 | 0.60 | 7,706 | 0.66 | 8,476 | 0.77 | 9,889 |
| Apartment Investment and Management Company C | | 0.40 | 1,554 | 0.30 | 1,166 | 0.48 | 1,865 | 0.76 | 2,953 | 0.96 | 3,731 |
| Apollo Education Group, Inc. Class A | | 0.00 | 0 | 0.00 | 0 | 0.00 | 0 | 0.00 | 0 | 0.00 | 0 |
| Apple Inc. | | 0.00 | 0 | 0.00 | 0 | 0.00 | 0 | 0.76 | 180,799 | 1.69 | 402,533 |
| Applied Materials, Inc. | | 0.24 | 12,357 | 0.27 | 13,901 | 0.31 | 15,961 | 0.35 | 18,020 | 0.39 | 20,080 |
| Archer-Daniels-Midland Company | | 0.56 | 13,786 | 0.60 | 14,770 | 0.65 | 16,124 | 0.70 | 17,232 | 0.76 | 18,709 |
| Assurant, Inc. | | 0.59 | 2,663 | 0.63 | 2,844 | 0.70 | 3,160 | 0.81 | 3,656 | 0.96 | 4,333 |
| AT&T Inc. | | 1.64 | 370,878 | 1.68 | 379,922 | 1.72 | 388,970 | 1.76 | 398,014 | 1.80 | 407,062 |
| Autodesk, Inc. | | 0.00 | 0 | 0.00 | 0 | 0.00 | 0 | 0.00 | 0 | 0.00 | 0 |
| Automatic Data Processing, Inc. | | 1.33 | 25,922 | 1.38 | 26,896 | 1.48 | 28,748 | 1.62 | 31,574 | 1.78 | 34,790 |
| AutoNation, Inc. | | 0.00 | 0 | 0.00 | 0 | 0.00 | 0 | 0.00 | 0 | 0.00 | 0 |
| AutoZone, Inc. | | 0.00 | 0 | 0.00 | 0 | 0.00 | 0 | 0.00 | 0 | 0.00 | 0 |
| AvalonBay Communities, Inc. | | 3.57 | 10,564 | 3.57 | 10,564 | 3.57 | 10,564 | 3.88 | 11,481 | 4.28 | 12,665 |
| Avery Dennison Corporation | | 1.22 | 4,976 | 0.80 | 3,263 | 1.00 | 4,079 | 1.08 | 4,405 | 1.14 | 4,650 |
| Avon Products, Inc. | | 0.84 | 13,742 | 0.88 | 14,396 | 0.92 | 15,050 | 0.75 | 12,269 | 0.24 | 3,926 |
| Baker Hughes Incorporated | | 0.60 | 7,081 | 0.60 | 7,081 | 0.60 | 7,081 | 0.60 | 7,081 | 0.60 | 7,081 |
| Ball Corporation | | 0.20 | 1,452 | 0.20 | 1,452 | 0.28 | 2,033 | 0.40 | 2,904 | 0.52 | 3,775 |
| Bank of America Corporation | | 0.04 | 7,702 | 0.04 | 7,702 | 0.04 | 7,702 | 0.04 | 7,702 | 0.04 | 7,702 |
| Bank of New York Mellon Corporation | | 0.51 | 22,459 | 0.36 | 15,854 | 0.48 | 21,138 | 0.52 | 22,900 | 0.58 | 25,542 |
| Baxter International Inc. | | 1.07 | 25,465 | 1.18 | 28,083 | 1.26 | 30,106 | 1.57 | 37,364 | 1.92 | 45,694 |
| BB&T Corporation | | 1.24 | 26,290 | 0.60 | 12,721 | 0.64 | 13,569 | 0.76 | 16,114 | 1.12 | 23,746 |
| Becton, Dickinson and Company | | 1.36 | 12,689 | 1.52 | 14,182 | 1.68 | 15,674 | 1.84 | 17,214 | 2.03 | 18,940 |
| Bed Bath & Beyond Inc. | | 0.00 | 0 | 0.00 | 0 | 0.00 | 0 | 0.00 | 0 | 0.00 | 0 |
| Bemis Company, Inc. | | 0.90 | 3,443 | 0.92 | 3,519 | 0.96 | 3,672 | 1.00 | 3,825 | 1.04 | 3,978 |
| Best Buy Co., Inc. | | 0.70 | 9,073 | 0.72 | 9,333 | 0.77 | 9,981 | 0.66 | 8,555 | 0.68 | 8,814 |
| Big Lots, Inc. | | 0.00 | 0 | 0.00 | 0 | 0.00 | 0 | 0.00 | 0 | 0.00 | 0 |
| Biogen Idec Inc. | | 0.00 | 0 | 0.00 | 0 | 0.00 | 0 | 0.00 | 0 | 0.00 | 0 |
| BJ Services Co | | 0.20 | 2,241 | 0.05 | 560 | 0.00 | 0 | 0.00 | 0 | 0.00 | 0 |
| Black & Decker Corporation | | 0.78 | 1,799 | 0.12 | 277 | 0.00 | 0 | 0.00 | 0 | 0.00 | 0 |
| BMC Software, Inc. | | 0.00 | 0 | 0.00 | 0 | 0.00 | 0 | 0.00 | 0 | 0.00 | 0 |
| Boeing Company | | 1.68 | 47,247 | 1.68 | 47,247 | 1.68 | 47,247 | 1.76 | 49,497 | 1.94 | 54,559 |
| Boston Properties, Inc. | | 2.18 | 10,106 | 2.00 | 9,272 | 2.05 | 9,504 | 2.30 | 10,663 | 4.85 | 22,485 |
| Boston Scientific Corporation | | 0.00 | 0 | 0.00 | 0 | 0.00 | 0 | 0.00 | 0 | 0.00 | 0 |
| Bristol-Myers Squibb Company | | 1.25 | 94,960 | 0.96 | 72,929 | 1.32 | 100,278 | 1.36 | 103,317 | 1.76 | 133,704 |
| Broadcom Corporation Class A | | 0.00 | 0 | 0.32 | 5,454 | 0.36 | 6,136 | 0.40 | 6,818 | 0.44 | 7,499 |

APPENDIX 2-continued

Example MMACC embodiments (5 years of dividends)
2008 Tranche - 5 Year Maturity

| | 2009-2013 Dividend Income Row | | | | | | | | | |
|---|---|---|---|---|---|---|---|---|---|---|
| Company Name | Y1 Divs P/S* | Y1 Div $ Rec'd | Y2 Divs P/S* | Y2 Div $ Rec'd | Y3 Divs P/S* | Y3 Div $ Rec'd | Y4 Divs P/S* | Y4 Div $ Rec'd | Y5 Divs P/S* | Y5 Div $ Rec'd |
| Brown-Forman Corporation Class B | 0.77 | 4,376 | 1.48 | 8,356 | 0.87 | 4,931 | 4.95 | 27,976 | 1.05 | 5,957 |
| Burlington Northern | 1.60 | 17,235 | 0.00 | 0 | 0.00 | 0 | 0.00 | 0 | 0.00 | 0 |
| C. R. Bard, Inc. | 0.66 | 2,513 | 0.70 | 2,665 | 0.74 | 2,817 | 0.78 | 2,969 | 0.82 | 3,122 |
| C.H. Robinson Worldwide, Inc. | 0.97 | 6,298 | 1.04 | 6,753 | 1.20 | 7,792 | 1.34 | 8,701 | 1.40 | 9,090 |
| CA, Inc. | 0.16 | 2,419 | 0.16 | 2,419 | 0.19 | 2,872 | 1.00 | 15,116 | 1.00 | 15,116 |
| Cabot Oil & Gas Corporation | 0.03 | 476 | 0.03 | 476 | 0.03 | 476 | 0.04 | 635 | 0.06 | 952 |
| Cameron International Corporation | 0.00 | 0 | 0.00 | 0 | 0.00 | 0 | 0.00 | 0 | 0.00 | 0 |
| Campbell Soup Company | 1.02 | 8,092 | 1.11 | 8,803 | 1.16 | 9,158 | 1.45 | 11,448 | 0.60 | 4,753 |
| Capital One Financial Corporation | 0.52 | 7,891 | 0.20 | 3,006 | 0.20 | 3,006 | 0.20 | 3,006 | 0.95 | 14,279 |
| Cardinal Health, Inc. | 10.42 | 143,727 | 0.76 | 10,488 | 0.84 | 11,592 | 0.97 | 13,317 | 1.18 | 16,318 |
| Carnival Corporation | 0.00 | 0 | 0.40 | 6,708 | 1.00 | 16,770 | 1.50 | 25,155 | 1.00 | 16,770 |
| Caterpillar Inc. | 1.68 | 38,890 | 1.72 | 39,816 | 1.80 | 41,668 | 2.48 | 57,410 | 1.72 | 39,816 |
| CB Richard Ellis Group Inc. | 0.00 | 0 | 0.00 | 0 | 0.00 | 0 | 0.00 | 0 | 0.00 | 0 |
| CBS Corporation Class B | 0.20 | 5,218 | 0.20 | 5,218 | 0.35 | 9,132 | 0.44 | 11,480 | 0.48 | 12,524 |
| Celgene Corporation | 0.00 | 0 | 0.00 | 0 | 0.00 | 0 | 0.00 | 0 | 0.00 | 0 |
| CenterPoint Energy, Inc. | 0.76 | 10,037 | 0.78 | 10,301 | 0.79 | 10,433 | 0.81 | 10,698 | 0.83 | 10,962 |
| Centex Corp. | 0.00 | 0 | 0.00 | 0 | 0.00 | 0 | 0.00 | 0 | 0.00 | 0 |
| CenturyLink, Inc. | 2.80 | 10,760 | 2.90 | 11,145 | 2.90 | 11,145 | 2.90 | 11,145 | 2.16 | 8,301 |
| Cephalon Inc | 0.00 | 0 | 0.00 | 0 | 0.00 | 0 | 0.00 | 0 | 0.00 | 0 |
| CF Industries Holdings, Inc. | 0.40 | 873 | 0.40 | 873 | 1.00 | 2,182 | 1.60 | 3,491 | 2.20 | 4,800 |
| Charles Schwab Corporation | 0.24 | 8,618 | 0.24 | 8,618 | 0.24 | 8,618 | 0.24 | 8,618 | 0.24 | 8,618 |
| Chesapeake Energy Corporation | 0.30 | 6,227 | 0.30 | 6,227 | 0.25 | 5,189 | 0.35 | 7,264 | 0.35 | 7,264 |
| Chevron Corporation | 2.66 | 207,400 | 2.84 | 221,435 | 3.09 | 240,927 | 3.51 | 273,675 | 3.90 | 304,083 |
| Chubb Corporation | 1.40 | 19,110 | 1.48 | 20,202 | 1.56 | 21,294 | 1.64 | 22,386 | 1.76 | 24,024 |
| Ciena Corporation | 0.00 | 0 | 0.00 | 0 | 0.00 | 0 | 0.00 | 0 | 0.00 | 0 |
| Cigna Corporation | 0.04 | 422 | 0.04 | 422 | 0.04 | 422 | 0.04 | 422 | 0.04 | 422 |
| Cincinnati Financial Corporation | 1.57 | 9,783 | 1.59 | 9,907 | 1.60 | 10,001 | 1.62 | 10,094 | 1.65 | 10,312 |
| Cintas Corporation | 0.47 | 2,370 | 0.97 | 4,891 | 0.54 | 2,723 | 0.64 | 3,227 | 0.77 | 3,882 |
| Cisco Systems, Inc. | 0.00 | 0 | 0.00 | 0 | 0.18 | 40,444 | 0.50 | 112,345 | 0.51 | 114,592 |
| CIT Group Inc. (Old) | 0.02 | 277 | 0.00 | 0 | 0.00 | 0 | 0.00 | 0 | 0.00 | 0 |
| Citigroup Inc. | 0.10 | 2,091 | 0.00 | 0 | 0.03 | 627 | 0.04 | 836 | 0.04 | 836 |
| Citrix Systems, Inc. | 0.00 | 0 | 0.00 | 0 | 0.00 | 0 | 0.00 | 0 | 0.00 | 0 |
| Clorox Company | 1.92 | 10,220 | 2.10 | 11,178 | 2.30 | 12,243 | 2.48 | 13,201 | 2.70 | 14,372 |
| CME Group Inc. Class A | 0.92 | 11,825 | 0.92 | 11,825 | 1.12 | 14,395 | 3.69 | 47,453 | 4.40 | 56,553 |
| CMS Energy Corporation | 0.50 | 4,341 | 0.66 | 5,729 | 0.84 | 7,292 | 0.96 | 8,334 | 1.02 | 8,855 |
| Coach, Inc. | 0.23 | 2,823 | 0.53 | 6,587 | 0.83 | 10,350 | 1.13 | 14,114 | 1.31 | 16,467 |
| Coca-Cola Company | 0.82 | 125,220 | 0.88 | 134,382 | 0.94 | 143,544 | 1.02 | 155,761 | 1.12 | 171,032 |
| Coca-Cola Enterprises, Inc. | 0.30 | 3,651 | 10.39 | 126,457 | 0.51 | 6,207 | 0.64 | 7,789 | 0.80 | 9,737 |
| Cognizant Technology Solutions Corporation Class A | 0.00 | 0 | 0.00 | 0 | 0.00 | 0 | 0.00 | 0 | 0.00 | 0 |
| Colgate-Palmolive Company | 0.86 | 33,314 | 1.02 | 39,318 | 1.14 | 43,967 | 1.22 | 47,259 | 1.33 | 51,520 |
| Comcast Corporation Class A | 0.27 | 29,286 | 0.38 | 41,774 | 0.54 | 60,174 | 0.76 | 84,265 | 0.78 | 86,199 |
| Comerica Incorporated | 0.20 | 1,155 | 0.25 | 1,444 | 0.40 | 2,310 | 0.55 | 3,176 | 0.68 | 3,927 |
| Computer Sciences Corporation | 0.00 | 0 | 0.50 | 2,907 | 0.80 | 4,650 | 0.80 | 4,650 | 0.80 | 4,650 |
| Compuware Corporation | 0.00 | 0 | 0.00 | 0 | 0.00 | 0 | 0.00 | 0 | 0.38 | 3,547 |
| ConAgra Foods, Inc. | 0.77 | 13,211 | 0.83 | 14,240 | 0.93 | 15,956 | 0.97 | 16,642 | 1.00 | 17,157 |
| ConocoPhillips | 1.91 | 109,271 | 2.15 | 123,001 | 2.64 | 151,034 | 19.66 | 1,125,035 | 2.70 | 154,467 |
| CONSOL Energy Inc. | 0.40 | 2,781 | 0.40 | 2,781 | 0.42 | 2,955 | 0.63 | 4,346 | 0.38 | 2,607 |
| Consolidated Edison, Inc. | 2.36 | 24,782 | 2.38 | 24,992 | 2.40 | 25,202 | 2.42 | 25,412 | 2.46 | 25,833 |
| Constellation Brands, Inc. Class A | 0.00 | 0 | 0.00 | 0 | 0.00 | 0 | 0.00 | 0 | 0.00 | 0 |
| Constellation Energy Group Inc. | 0.96 | 6,573 | 0.96 | 6,573 | 0.96 | 6,573 | 0.24 | 1,643 | 0.00 | 0 |
| Convergys Corporation | 0.00 | 0 | 0.00 | 0 | 0.00 | 0 | 0.15 | 703 | 0.24 | 1,124 |
| Cooper Industries PLC Cl A | 1.00 | 6,651 | 1.08 | 7,183 | 1.16 | 7,715 | 1.14 | 7,582 | 0.00 | 0 |
| Corning Incorporated | 0.20 | 11,930 | 0.20 | 11,930 | 0.23 | 13,421 | 0.31 | 18,789 | 0.39 | 23,263 |
| Costco Wholesale Corporation | 0.70 | 11,596 | 0.79 | 13,170 | 0.92 | 15,324 | 8.07 | 133,605 | 1.21 | 19,962 |
| Coventry Health Care Inc. | 0.00 | 0 | 0.00 | 0 | 0.00 | 0 | 0.50 | 2,859 | 0.13 | 715 |
| Covidien Plc | 0.66 | 12,754 | 0.74 | 14,301 | 0.83 | 15,943 | 1.19 | 23,093 | 6.52 | 125,975 |
| CSX Corporation | 0.29 | 13,321 | 0.33 | 14,835 | 0.45 | 20,284 | 0.54 | 24,523 | 0.59 | 26,794 |
| Cummins Inc. | 0.70 | 5,410 | 0.88 | 6,762 | 1.32 | 10,240 | 1.80 | 13,910 | 2.25 | 17,388 |
| CVS Health Corporation | 0.31 | 16,810 | 0.35 | 19,290 | 0.50 | 27,558 | 0.65 | 35,825 | 0.90 | 49,604 |
| D.R. Horton, Inc. | 0.15 | 1,586 | 0.15 | 1,586 | 0.15 | 1,586 | 0.30 | 3,172 | 0.00 | 0 |
| Danaher Corporation | 0.06 | 1,276 | 0.08 | 1,570 | 0.09 | 1,766 | 0.10 | 1,962 | 0.10 | 1,962 |
| Darden Restaurants, Inc. | 0.90 | 4,792 | 1.14 | 6,069 | 1.50 | 7,986 | 1.86 | 9,903 | 2.10 | 11,180 |
| DaVita HealthCare Partners Inc. | 0.00 | 0 | 0.00 | 0 | 0.00 | 0 | 0.00 | 0 | 0.00 | 0 |
| Dean Foods Company | 0.00 | 0 | 0.00 | 0 | 0.00 | 0 | 0.00 | 0 | 21.84 | 64,507 |
| Deere & Company | 1.12 | 18,352 | 1.23 | 20,155 | 1.58 | 25,890 | 1.84 | 30,150 | 2.04 | 33,427 |
| Dell Inc. | 0.00 | 0 | 0.00 | 0 | 0.00 | 0 | 0.16 | 10,626 | 0.37 | 24,572 |
| DENTSPLY International Inc. | 0.20 | 1,143 | 0.20 | 1,143 | 0.20 | 1,172 | 0.22 | 1,258 | 0.25 | 1,429 |
| Developers Diversified Realty Corp. | 0.44 | 2,031 | 0.08 | 369 | 0.22 | 1,015 | 0.48 | 2,215 | 0.54 | 2,492 |
| Devon Energy Corporation | 0.64 | 10,851 | 0.64 | 10,851 | 0.67 | 11,359 | 0.80 | 13,563 | 0.86 | 14,580 |
| DirecTV Group Inc. | 0.00 | 0 | 0.00 | 0 | 0.00 | 0 | 0.00 | 0 | 0.00 | 0 |

APPENDIX 2-continued

Example MMACC embodiments (5 years of dividends)
2008 Tranche - 5 Year Maturity

|  | 2009-2013 Dividend Income Row | | | | | | | | | |
|---|---|---|---|---|---|---|---|---|---|---|
| Company Name | Y1 Divs P/S* | Y1 Div $ Rec'd | Y2 Divs P/S* | Y2 Div $ Rec'd | Y3 Divs P/S* | Y3 Div $ Rec'd | Y4 Divs P/S* | Y4 Div $ Rec'd | Y5 Divs P/S* | Y5 Div $ Rec'd |
| Discover Financial Services | 0.08 | 1,473 | 0.08 | 1,473 | 0.28 | 5,157 | 0.44 | 8,103 | 0.74 | 13,629 |
| Dominion Resources, Inc. | 1.75 | 39,041 | 1.83 | 40,825 | 1.97 | 43,949 | 2.11 | 47,072 | 2.25 | 50,195 |
| Dover Corporation | 1.02 | 7,279 | 1.07 | 7,636 | 1.18 | 8,420 | 1.33 | 9,491 | 1.45 | 10,347 |
| Dow Chemical Company | 0.60 | 21,270 | 0.60 | 21,270 | 0.90 | 31,905 | 1.21 | 42,894 | 1.28 | 45,376 |
| Dr Pepper Snapple Group, Inc. | 0.15 | 1,460 | 0.90 | 8,762 | 1.21 | 11,779 | 1.36 | 13,240 | 1.52 | 14,797 |
| DTE Energy Company | 2.12 | 13,263 | 2.18 | 13,638 | 2.32 | 14,530 | 2.42 | 15,108 | 2.58 | 16,172 |
| Duke Energy Corporation | 2.82 | 45,642 | 2.91 | 47,098 | 2.97 | 48,069 | 3.03 | 49,041 | 3.09 | 50,012 |
| Dun & Bradstreet Corporation | 1.36 | 2,814 | 1.40 | 2,897 | 1.44 | 2,979 | 1.52 | 3,145 | 1.60 | 3,310 |
| Dynegy Inc. | 0.00 | 0 | 0.00 | 0 | 0.00 | 0 | 23.41 | 749 | 0.00 | 0 |
| E*TRADE Financial Corporation | 0.00 | 0 | 0.00 | 0 | 0.00 | 0 | 0.00 | 0 | 0.00 | 0 |
| E. I. du Pont de Nemours and Company | 1.64 | 56,790 | 1.64 | 56,790 | 1.64 | 56,790 | 1.70 | 58,868 | 1.78 | 61,638 |
| Eastman Chemical Company | 0.88 | 4,900 | 0.90 | 4,983 | 0.99 | 5,512 | 1.08 | 6,013 | 1.25 | 6,960 |
| Eastman Kodak Company | 0.00 | 0 | 0.00 | 0 | 0.00 | 0 | 0.00 | 0 | 0.00 | 0 |
| Eaton Corp. | 1.00 | 12,656 | 1.08 | 13,668 | 1.36 | 17,212 | 1.52 | 19,237 | 1.68 | 21,262 |
| eBay Inc. | 0.00 | 0 | 0.00 | 0 | 0.00 | 0 | 0.00 | 0 | 0.00 | 0 |
| Ecolab Inc. | 0.57 | 3,700 | 0.64 | 4,118 | 0.73 | 4,665 | 0.83 | 5,340 | 0.96 | 6,209 |
| Edison International | 1.24 | 15,566 | 1.27 | 15,816 | 1.28 | 16,066 | 1.31 | 16,410 | 1.37 | 17,098 |
| El Paso Corp. | 0.16 | 4,305 | 0.04 | 1,076 | 0.04 | 1,076 | 0.01 | 269 | 0.00 | 0 |
| Electronic Arts Inc. | 0.00 | 0 | 0.00 | 0 | 0.00 | 0 | 0.00 | 0 | 0.00 | 0 |
| Eli Lilly and Company | 1.96 | 75,254 | 1.96 | 75,254 | 1.96 | 75,254 | 1.96 | 75,254 | 1.96 | 75,254 |
| Embarq Corp. | 1.38 | 7,499 | 0.00 | 0 | 0.00 | 0 | 0.00 | 0 | 0.00 | 0 |
| EMC Corporation | 0.00 | 0 | 0.00 | 0 | 0.00 | 0 | 0.00 | 0 | 0.20 | 15,663 |
| Emerson Electric Co. | 1.32 | 39,003 | 1.35 | 39,739 | 1.43 | 42,241 | 1.61 | 47,392 | 1.66 | 48,864 |
| Ensco plc | 0.10 | 544 | 1.07 | 5,850 | 1.40 | 7,619 | 1.50 | 8,163 | 2.25 | 12,245 |
| Entergy Corporation | 3.00 | 21,798 | 3.24 | 23,542 | 3.32 | 24,123 | 3.32 | 24,123 | 3.32 | 24,123 |
| EOG Resources, Inc. | 0.28 | 5,459 | 0.30 | 5,842 | 0.32 | 6,082 | 0.34 | 6,417 | 0.37 | 7,016 |
| Equifax Inc. | 0.16 | 776 | 0.28 | 1,357 | 0.64 | 3,102 | 0.72 | 3,490 | 0.88 | 4,265 |
| Equitable Resources Inc. | 0.88 | 4,419 | 0.88 | 4,419 | 0.88 | 4,419 | 0.88 | 4,419 | 0.12 | 603 |
| Equity Residential | 1.64 | 17,120 | 1.47 | 15,345 | 1.58 | 16,494 | 1.78 | 18,581 | 1.85 | 19,312 |
| Estee Lauder Companies Inc. Class A | 0.28 | 2,445 | 0.38 | 3,335 | 0.53 | 4,668 | 0.72 | 6,402 | 0.74 | 6,580 |
| Exelon Corporation | 2.10 | 53,021 | 2.10 | 53,021 | 2.10 | 53,021 | 2.10 | 53,021 | 1.46 | 36,736 |
| Expedia, Inc. | 0.00 | 0 | 0.56 | 2,251 | 30.81 | 123,825 | 0.96 | 3,858 | 0.56 | 2,251 |
| Expeditors International of Washington, Inc. | 0.38 | 3,092 | 0.40 | 3,255 | 0.50 | 4,069 | 0.56 | 4,557 | 0.60 | 4,883 |
| Express Scripts Holding Company | 0.00 | 0 | 0.00 | 0 | 0.00 | 0 | 0.00 | 0 | 0.00 | 0 |
| Exxon Mobil Corporation | 1.66 | 324,034 | 1.74 | 339,650 | 1.85 | 361,122 | 2.18 | 425,538 | 2.46 | 480,194 |
| Family Dollar Stores, Inc. | 0.54 | 2,895 | 0.62 | 3,324 | 0.72 | 3,861 | 0.84 | 4,504 | 1.04 | 5,576 |
| Fastenal Company | 0.36 | 3,570 | 0.62 | 6,149 | 0.65 | 6,447 | 1.24 | 12,298 | 0.80 | 7,934 |
| Federated Investors, Inc. Class B | 0.96 | 3,263 | 2.22 | 7,546 | 0.96 | 3,263 | 2.47 | 8,396 | 0.98 | 3,331 |
| FedEx Corporation | 0.44 | 5,255 | 0.47 | 5,614 | 0.51 | 6,091 | 0.55 | 6,569 | 0.59 | 7,047 |
| Fidelity National Information Services, Inc. | 0.20 | 1,458 | 0.20 | 1,458 | 0.20 | 1,458 | 0.80 | 5,833 | 0.88 | 6,416 |
| Fifth Third Bancorp | 0.04 | 886 | 0.04 | 886 | 0.28 | 6,205 | 0.36 | 7,978 | 0.47 | 10,416 |
| First Horizon National Corporation | 0.00 | 0 | 0.00 | 0 | 0.04 | 360 | 0.04 | 360 | 0.20 | 1,802 |
| FirstEnergy Corp. | 2.20 | 25,736 | 2.20 | 25,736 | 2.20 | 25,736 | 2.20 | 25,736 | 2.20 | 25,736 |
| Fiserv, Inc. | 0.00 | 0 | 0.00 | 0 | 0.00 | 0 | 0.00 | 0 | 0.00 | 0 |
| Flowserve Corporation | 0.36 | 2,343 | 0.39 | 2,517 | 0.43 | 2,777 | 0.48 | 3,124 | 0.56 | 3,645 |
| Fluor Corporation | 0.50 | 3,483 | 0.50 | 3,483 | 0.50 | 3,482 | 0.64 | 4,458 | 0.64 | 4,458 |
| Ford Motor Company | 0.00 | 0 | 0.00 | 0 | 0.00 | 0 | 0.20 | 18,336 | 0.40 | 36,668 |
| Forest Laboratories, Inc. | 0.00 | 0 | 0.00 | 0 | 0.00 | 0 | 0.00 | 0 | 0.00 | 0 |
| Fortune Brands Inc. | 1.01 | 5,810 | 0.76 | 4,372 | 13.06 | 75,134 | 0.82 | 4,718 | 0.90 | 5,178 |
| FPL Group Inc. | 1.89 | 29,645 | 2.00 | 31,370 | 2.20 | 34,507 | 2.40 | 37,644 | 2.64 | 41,408 |
| Franklin Resources, Inc. | 1.28 | 22,348 | 0.30 | 5,282 | 1.01 | 17,530 | 1.37 | 23,799 | 0.41 | 7,198 |
| Freeport-McMoRan, Inc. | 0.00 | 0 | 0.95 | 27,536 | 1.50 | 43,478 | 1.19 | 34,420 | 2.25 | 65,216 |
| Frontier Communications Corporation Class B | 1.00 | 11,947 | 0.88 | 10,454 | 0.75 | 8,960 | 0.40 | 4,779 | 0.40 | 4,779 |
| GameStop Corp. Class A | 0.00 | 0 | 0.00 | 0 | 0.00 | 0 | 0.80 | 5,028 | 1.10 | 6,913 |
| Gannett Co., Inc. | 0.16 | 1,401 | 0.16 | 1,401 | 0.24 | 2,101 | 0.80 | 7,003 | 0.80 | 7,003 |
| Gap, Inc. | 0.34 | 6,084 | 0.38 | 6,889 | 0.55 | 9,842 | 0.61 | 10,960 | 0.50 | 8,947 |
| General Dynamics Corporation | 1.49 | 22,290 | 1.64 | 24,534 | 1.83 | 27,377 | 2.51 | 37,550 | 1.68 | 25,133 |
| General Electric Company | 0.61 | 245,870 | 0.46 | 185,410 | 0.61 | 245,870 | 0.70 | 282,145 | 0.79 | 318,421 |
| General Mills, Inc. | 0.90 | 23,080 | 1.05 | 26,927 | 1.17 | 30,005 | 1.27 | 32,569 | 1.42 | 36,416 |
| General Motors Corporation | 0.00 | 0 | 0.00 | 0 | 0.00 | 0 | 0.00 | 0 | 0.00 | 0 |
| Genuine Parts Company | 1.60 | 9,789 | 1.64 | 10,034 | 1.80 | 11,012 | 1.98 | 12,114 | 2.15 | 13,154 |
| Genworth Financial, Inc. Class A | 0.00 | 0 | 0.00 | 0 | 0.00 | 0 | 0.00 | 0 | 0.00 | 0 |
| Genzyme Corp. | 0.00 | 0 | 0.00 | 0 | 0.00 | 0 | 0.00 | 0 | 0.00 | 0 |
| Gilead Sciences, Inc. | 0.00 | 0 | 0.00 | 0 | 0.00 | 0 | 0.00 | 0 | 0.00 | 0 |
| Goldman Sachs Group, Inc. | 1.52 | 25,736 | 1.40 | 23,757 | 1.40 | 23,757 | 1.77 | 30,035 | 2.05 | 34,786 |
| Goodrich Corp. | 1.02 | 4,818 | 1.10 | 5,196 | 1.16 | 5,480 | 0.58 | 2,740 | 0.00 | 0 |
| Goodyear Tire & Rubber Company | 0.00 | 0 | 0.00 | 0 | 0.00 | 0 | 0.00 | 0 | 0.05 | 463 |
| Google Inc. Class A | 0.00 | 0 | 0.00 | 0 | 0.00 | 0 | 0.00 | 0 | 0.00 | 0 |
| Graham Holdings Co. | 8.60 | 1,978 | 9.00 | 2,070 | 9.40 | 2,162 | 19.60 | 4,508 | 0.00 | 0 |
| H&R Block, Inc. | 0.60 | 7,804 | 0.60 | 7,804 | 0.65 | 8,455 | 0.80 | 10,406 | 0.80 | 10,406 |
| H. J. Heinz Company | 1.68 | 20,212 | 1.77 | 21,359 | 1.89 | 22,807 | 2.02 | 24,436 | 0.51 | 6,214 |

APPENDIX 2-continued

Example MMACC embodiments (5 years of dividends)
2008 Tranche - 5 Year Maturity

| | 2009-2013 Dividend Income Row ||||||||||
|---|---|---|---|---|---|---|---|---|---|---|
| Company Name | Y1 Divs P/S* | Y1 Div $ Rec'd | Y2 Divs P/S* | Y2 Div $ Rec'd | Y3 Divs P/S* | Y3 Div $ Rec'd | Y4 Divs P/S* | Y4 Div $ Rec'd | Y5 Divs P/S* | Y5 Div $ Rec'd |
| Halliburton Company | 0.36 | 12,347 | 0.36 | 12,347 | 0.36 | 12,347 | 0.36 | 12,347 | 0.52 | 18,006 |
| Harley-Davidson, Inc. | 0.40 | 3,574 | 0.40 | 3,574 | 0.47 | 4,244 | 0.62 | 5,540 | 0.84 | 7,505 |
| Harman International Industries, Incorporated | 0.01 | 28 | 0.00 | 0 | 0.20 | 449 | 0.45 | 1,011 | 0.90 | 2,022 |
| Harris Corporation | 2.43 | 12,576 | 0.94 | 4,855 | 1.06 | 5,475 | 1.40 | 7,231 | 1.58 | 8,161 |
| Hartford Financial Services Group, Inc. | 0.20 | 2,312 | 0.20 | 2,312 | 0.40 | 4,625 | 0.40 | 4,625 | 0.50 | 5,781 |
| Hasbro, Inc. | 0.80 | 3,803 | 0.95 | 4,516 | 1.15 | 5,467 | 1.74 | 8,272 | 1.20 | 5,705 |
| HCP, Inc. | 1.84 | 17,841 | 1.86 | 18,035 | 1.92 | 18,616 | 2.00 | 19,392 | 2.10 | 20,362 |
| Hershey Company | 1.19 | 7,574 | 1.28 | 8,147 | 1.38 | 8,784 | 1.56 | 9,929 | 1.81 | 11,521 |
| Hess Corporation | 0.40 | 4,354 | 0.40 | 4,354 | 0.40 | 4,354 | 0.40 | 4,354 | 0.70 | 7,620 |
| Hewlett-Packard Company | 0.32 | 30,075 | 0.32 | 30,075 | 0.44 | 41,354 | 0.52 | 48,496 | 0.57 | 53,346 |
| Home Depot, Inc. | 0.90 | 58,557 | 0.94 | 61,485 | 1.04 | 67,666 | 1.16 | 75,473 | 1.56 | 101,498 |
| Honeywell International Inc. | 1.21 | 33,724 | 1.21 | 33,724 | 1.37 | 38,183 | 1.53 | 42,573 | 1.68 | 46,823 |
| Hospira, Inc. | 0.00 | 0 | 0.00 | 0 | 0.00 | 0 | 0.00 | 0 | 0.00 | 0 |
| Host Hotels & Resorts, Inc. | 0.25 | 5,013 | 0.04 | 802 | 0.14 | 2,807 | 0.30 | 6,016 | 0.46 | 9,224 |
| Hudson City Bancorp, Inc. | 0.59 | 11,802 | 0.60 | 12,002 | 0.39 | 7,801 | 0.32 | 6,401 | 0.20 | 4,001 |
| Humana Inc. | 0.00 | 0 | 0.00 | 0 | 0.75 | 4,856 | 1.03 | 6,668 | 1.07 | 6,927 |
| Huntington Bancshares Incorporated | 0.04 | 562 | 0.04 | 562 | 0.10 | 1,405 | 0.16 | 2,248 | 0.19 | 2,669 |
| Illinois Tool Works Inc. | 1.24 | 18,729 | 1.30 | 19,635 | 1.40 | 21,146 | 1.48 | 22,354 | 1.60 | 24,166 |
| IMS Health Inc. | 0.12 | 837 | 0.00 | 0 | 0.00 | 0 | 0.00 | 0 | 0.00 | 0 |
| Ingersoll-Rand Plc | 0.50 | 6,116 | 0.28 | 3,425 | 0.43 | 5,260 | 0.64 | 7,829 | 15.25 | 186,594 |
| Integrys Energy Group, Inc. | 2.72 | 7,978 | 2.72 | 7,978 | 2.72 | 7,978 | 2.72 | 7,978 | 2.72 | 7,978 |
| Intel Corporation | 0.56 | 119,528 | 0.63 | 134,469 | 0.78 | 166,998 | 0.87 | 185,695 | 0.90 | 192,099 |
| IntercontinentalExchange, Inc. | 0.00 | 0 | 0.00 | 0 | 0.00 | 0 | 0.00 | 0 | 0.65 | 1,802 |
| International Business Machines Corporation | 2.15 | 110,843 | 2.50 | 128,887 | 2.90 | 149,509 | 3.30 | 170,132 | 3.70 | 190,754 |
| International Flavors & Fragrances Inc. | 1.00 | 3,018 | 1.04 | 3,139 | 1.16 | 3,501 | 1.30 | 3,923 | 1.46 | 4,406 |
| International Game Technology | 0.38 | 4,354 | 0.24 | 2,714 | 0.24 | 2,714 | 0.25 | 2,827 | 0.38 | 4,297 |
| International Paper Company | 0.32 | 5,332 | 0.40 | 6,563 | 0.98 | 15,997 | 1.09 | 17,843 | 1.25 | 20,509 |
| Interpublic Group of Companies, Inc. | 0.00 | 0 | 0.00 | 0 | 0.24 | 4,389 | 0.24 | 4,389 | 0.30 | 5,486 |
| Intuit Inc. | 0.00 | 0 | 0.00 | 0 | 0.15 | 1,842 | 0.62 | 7,615 | 0.70 | 8,597 |
| Intuitive Surgical, Inc. | 0.00 | 0 | 0.00 | 0 | 0.00 | 0 | 0.00 | 0 | 0.00 | 0 |
| Invesco Ltd. | 0.41 | 6,020 | 0.43 | 6,389 | 0.48 | 7,054 | 0.64 | 9,455 | 0.85 | 12,520 |
| ITT Corporation | 1.70 | 5,923 | 2.00 | 6,968 | 77.67 | 270,606 | 0.36 | 1,268 | 0.40 | 1,394 |
| J. C. Penney Company, Inc. | 0.80 | 6,821 | 0.80 | 6,821 | 0.80 | 6,821 | 0.40 | 3,410 | 0.00 | 0 |
| J. M. Smucker Company | 1.37 | 6,227 | 1.55 | 7,045 | 1.84 | 8,363 | 2.00 | 9,090 | 2.20 | 9,999 |
| Jabil Circuit, Inc. | 0.28 | 2,264 | 0.28 | 2,264 | 0.29 | 2,344 | 0.32 | 2,587 | 0.32 | 2,587 |
| Jacobs Engineering Group Inc. | 0.00 | 0 | 0.00 | 0 | 0.00 | 0 | 0.00 | 0 | 0.00 | 0 |
| Janus Capital Group Inc. | 0.04 | 242 | 0.04 | 242 | 0.15 | 909 | 0.29 | 1,757 | 0.21 | 1,272 |
| JDS Uniphase Corporation | 0.00 | 0 | 0.00 | 0 | 0.00 | 0 | 0.00 | 0 | 0.00 | 0 |
| Johnson & Johnson | 1.93 | 205,495 | 2.11 | 224,660 | 2.25 | 239,567 | 2.40 | 255,538 | 2.59 | 275,768 |
| Johnson Controls, Inc. | 0.52 | 11,857 | 0.55 | 12,541 | 0.66 | 15,049 | 0.73 | 16,645 | 0.79 | 18,014 |
| Jones Apparel Group Inc. | 0.20 | 640 | 0.20 | 640 | 0.20 | 640 | 0.20 | 640 | 0.20 | 640 |
| JPMorgan Chase & Co. | 0.53 | 75,911 | 0.20 | 28,646 | 0.80 | 114,584 | 1.15 | 164,714 | 1.36 | 194,792 |
| Juniper Networks, Inc. | 0.00 | 0 | 0.00 | 0 | 0.00 | 0 | 0.00 | 0 | 0.00 | 0 |
| KB Home | 0.25 | 722 | 0.25 | 722 | 0.25 | 722 | 0.14 | 397 | 0.10 | 289 |
| Kellogg Company | 1.43 | 13,825 | 1.56 | 15,082 | 1.67 | 16,146 | 1.74 | 16,822 | 1.80 | 17,402 |
| KeyCorp | 0.09 | 1,757 | 0.04 | 760 | 0.10 | 1,900 | 0.18 | 3,419 | 0.22 | 4,084 |
| Kimberly-Clark Corporation | 2.40 | 38,107 | 2.64 | 41,918 | 2.80 | 44,458 | 2.96 | 46,999 | 3.24 | 51,445 |
| Kimco Realty Corporation | 0.72 | 6,327 | 0.66 | 5,800 | 0.73 | 6,415 | 0.97 | 8,524 | 0.85 | 7,514 |
| King Pharmaceuticals | 0.00 | 0 | 0.00 | 0 | 0.00 | 0 | 0.00 | 0 | 0.00 | 0 |
| KLA-Tencor Corporation | 0.60 | 3,888 | 0.80 | 5,184 | 1.20 | 7,776 | 1.50 | 9,720 | 1.70 | 11,016 |
| Kohl's Corporation | 0.00 | 0 | 0.00 | 0 | 1.00 | 11,694 | 1.28 | 14,968 | 1.40 | 16,372 |
| Kraft Foods Inc. | 1.16 | 65,398 | 1.16 | 65,398 | 1.16 | 65,398 | 15.70 | 885,135 | 0.54 | 30,444 |
| Kroger Co. | 0.37 | 9,139 | 0.39 | 9,765 | 0.43 | 10,767 | 0.49 | 12,394 | 0.61 | 15,399 |
| L-3 Communications Holdings, Inc. | 1.40 | 6,415 | 1.60 | 7,331 | 1.80 | 8,248 | 4.97 | 22,780 | 2.20 | 10,080 |
| Laboratory Corporation of America Holdings | 0.00 | 0 | 0.00 | 0 | 0.00 | 0 | 0.00 | 0 | 0.00 | 0 |
| Legg Mason, Inc. | 0.33 | 1,797 | 0.17 | 926 | 0.30 | 1,634 | 0.41 | 2,233 | 0.50 | 2,723 |
| Leggett & Platt, Incorporated | 1.02 | 6,114 | 1.06 | 6,354 | 1.10 | 6,593 | 1.14 | 6,833 | 1.18 | 7,073 |
| Lennar Corporation Class A | 0.16 | 868 | 0.16 | 868 | 0.16 | 868 | 0.16 | 868 | 0.16 | 868 |
| Leucadia National Corporation | 0.00 | 0 | 0.25 | 1,698 | 0.25 | 1,698 | 0.25 | 1,698 | 0.98 | 6,629 |
| Lexmark International, Inc. Class A | 0.00 | 0 | 0.00 | 0 | 0.25 | 752 | 1.15 | 3,460 | 1.20 | 3,611 |
| Life Technologies Corporation | 0.00 | 0 | 0.00 | 0 | 0.00 | 0 | 0.00 | 0 | 0.00 | 0 |
| Limited Brands Inc. | 0.60 | 6,230 | 4.60 | 47,766 | 3.80 | 39,459 | 5.00 | 51,920 | 1.20 | 12,461 |
| Lincoln National Corporation | 0.24 | 2,357 | 0.04 | 393 | 0.20 | 1,964 | 0.32 | 3,142 | 0.48 | 4,713 |
| Linear Technology Corporation | 0.88 | 7,488 | 0.92 | 7,828 | 0.96 | 8,169 | 1.26 | 10,721 | 0.78 | 6,637 |
| Lockheed Martin Corporation | 2.34 | 29,896 | 2.64 | 33,729 | 3.25 | 41,522 | 4.15 | 53,020 | 4.78 | 61,069 |
| Loews Corporation | 0.25 | 3,473 | 0.25 | 3,473 | 0.25 | 3,473 | 0.25 | 3,473 | 0.25 | 3,473 |
| Lorillard, Inc. | 1.28 | 24,767 | 1.42 | 27,411 | 1.73 | 33,538 | 2.07 | 39,988 | 2.20 | 42,568 |
| Lowe's Companies, Inc. | 0.35 | 19,686 | 0.40 | 22,498 | 0.50 | 28,123 | 0.60 | 33,748 | 0.68 | 38,247 |
| LSI Corporation | 0.00 | 0 | 0.00 | 0 | 0.00 | 0 | 0.00 | 0 | 0.06 | 1,485 |
| M&T Bank Corporation | 2.80 | 8,296 | 2.80 | 8,296 | 2.80 | 8,296 | 2.80 | 8,296 | 2.80 | 8,296 |
| Macy's Inc | 0.20 | 3,228 | 0.20 | 3,228 | 0.35 | 5,649 | 0.80 | 12,911 | 0.95 | 15,332 |

APPENDIX 2-continued

Example MMACC embodiments (5 years of dividends)
2008 Tranche - 5 Year Maturity

|  | 2009-2013 Dividend Income Row | | | | | | | | | |
|---|---|---|---|---|---|---|---|---|---|---|
| Company Name | Y1 Divs P/S* | Y1 Div $ Rec'd | Y2 Divs P/S* | Y2 Div $ Rec'd | Y3 Divs P/S* | Y3 Div $ Rec'd | Y4 Divs P/S* | Y4 Div $ Rec'd | Y5 Divs P/S* | Y5 Div $ Rec'd |
| Manitowoc Company, Inc. | 0.08 | 400 | 0.08 | 400 | 0.08 | 400 | 0.08 | 400 | 0.08 | 400 |
| Marathon Oil Corporation | 0.96 | 25,994 | 0.99 | 26,806 | 21.50 | 582,156 | 0.68 | 18,412 | 0.72 | 19,495 |
| Marriott International, Inc. Class A | 0.09 | 985 | 0.21 | 2,361 | 2.12 | 24,148 | 0.49 | 5,575 | 0.64 | 7,281 |
| Marsh & McLennan Companies, Inc. | 0.80 | 15,782 | 0.81 | 15,980 | 0.86 | 16,966 | 0.90 | 17,755 | 0.96 | 18,939 |
| Marshall & Ilsley | 0.04 | 400 | 0.04 | 400 | 0.02 | 200 | 0.00 | 0 | 0.00 | 0 |
| Masco Corporation | 0.46 | 6,353 | 0.30 | 4,143 | 0.30 | 4,143 | 0.30 | 4,143 | 0.30 | 4,143 |
| Massey Energy Co. | 0.24 | 784 | 0.24 | 784 | 0.06 | 196 | 0.00 | 0 | 0.00 | 0 |
| MasterCard Incorporated Class A | 0.06 | 1,666 | 0.06 | 1,666 | 0.06 | 1,666 | 0.10 | 2,916 | 0.21 | 5,832 |
| Mattel, Inc. | 0.75 | 10,316 | 0.83 | 11,417 | 0.92 | 12,655 | 1.24 | 17,056 | 1.44 | 19,807 |
| MBIA Inc. | 0.00 | 0 | 0.00 | 0 | 0.00 | 0 | 0.00 | 0 | 0.00 | 0 |
| McAfee | 0.00 | 0 | 0.00 | 0 | 0.00 | 0 | 0.00 | 0 | 0.00 | 0 |
| McCormick & Company, Incorporated | 0.98 | 4,889 | 1.06 | 5,288 | 1.15 | 5,737 | 1.27 | 6,336 | 1.39 | 6,935 |
| McDonald's Corporation | 2.05 | 87,681 | 2.26 | 96,662 | 2.53 | 108,211 | 2.87 | 122,753 | 3.12 | 133,446 |
| McGraw Hill Financial, Inc. | 0.90 | 10,862 | 0.94 | 11,345 | 1.00 | 12,069 | 3.52 | 42,483 | 1.12 | 13,517 |
| McKesson Corporation | 0.48 | 5,082 | 0.66 | 6,988 | 0.78 | 8,259 | 0.80 | 8,470 | 0.88 | 9,317 |
| MeadWestvaco Corporation | 0.92 | 6,031 | 0.94 | 6,162 | 1.00 | 6,555 | 4.48 | 29,367 | 1.00 | 6,555 |
| Medco Health Solutions | 0.00 | 0 | 0.00 | 0 | 0.00 | 0 | 0.00 | 0 | 0.00 | 0 |
| Medtronic, Inc. | 0.60 | 25,640 | 0.86 | 36,904 | 0.93 | 40,123 | 1.26 | 54,284 | 1.10 | 47,203 |
| Memc Electronic Materials Inc. | 0.00 | 0 | 0.00 | 0 | 0.00 | 0 | 0.00 | 0 | 0.00 | 0 |
| Merck & Co., Inc. | 1.52 | 123,320 | 1.52 | 123,320 | 1.56 | 126,566 | 1.69 | 137,113 | 1.73 | 140,358 |
| Meredith Corporation | 0.90 | 1,248 | 0.92 | 1,276 | 1.15 | 1,592 | 1.53 | 2,122 | 1.63 | 2,261 |
| MetLife, Inc. | 0.74 | 22,536 | 0.74 | 22,536 | 0.74 | 22,536 | 0.74 | 22,536 | 1.01 | 30,759 |
| Microchip Technology Incorporated | 1.36 | 9,472 | 1.71 | 11,971 | 1.04 | 7,266 | 1.40 | 9,786 | 1.42 | 9,877 |
| Micron Technology, Inc. | 0.00 | 0 | 0.00 | 0 | 0.00 | 0 | 0.00 | 0 | 0.00 | 0 |
| Microsoft Corporation | 0.52 | 152,660 | 0.55 | 161,467 | 0.68 | 199,632 | 0.83 | 243,669 | 0.97 | 284,770 |
| Millipore Corp | 0.00 | 0 | 0.00 | 0 | 0.00 | 0 | 0.00 | 0 | 0.00 | 0 |
| Molex Incorporated | 0.61 | 3,297 | 0.63 | 3,419 | 0.78 | 4,189 | 0.86 | 4,648 | 0.70 | 3,783 |
| Molson Coors Brewing Company Class B | 0.92 | 5,255 | 1.08 | 6,169 | 1.24 | 7,083 | 1.28 | 7,311 | 1.28 | 7,311 |
| Monsanto Company | 1.03 | 21,763 | 1.07 | 22,604 | 1.14 | 23,971 | 1.28 | 26,809 | 1.55 | 32,697 |
| Monster Worldwide, Inc. | 0.00 | 0 | 0.00 | 0 | 0.00 | 0 | 0.00 | 0 | 0.00 | 0 |
| Moody's Corporation | 0.40 | 2,982 | 0.42 | 3,131 | 0.53 | 3,988 | 0.64 | 4,771 | 0.90 | 6,709 |
| Morgan Stanley | 0.44 | 17,796 | 0.20 | 8,151 | 0.20 | 8,151 | 0.20 | 8,151 | 0.20 | 8,151 |
| Motorola Inc. | 0.00 | 0 | 0.00 | 0 | 26.90 | 334,233 | 0.96 | 11,928 | 1.14 | 14,164 |
| Murphy Oil Corporation | 1.00 | 7,310 | 1.05 | 7,675 | 1.10 | 8,041 | 3.67 | 26,864 | 10.49 | 76,664 |
| Mylan Inc. | 0.00 | 0 | 0.00 | 0 | 0.00 | 0 | 0.00 | 0 | 0.00 | 0 |
| Nabors Industries Ltd. | 0.00 | 0 | 0.00 | 0 | 0.00 | 0 | 0.00 | 0 | 0.16 | 1,747 |
| NASDAQ OMX Group, Inc. | 0.00 | 0 | 0.00 | 0 | 0.00 | 0 | 0.39 | 2,037 | 0.52 | 2,716 |
| National Oilwell Varco, Inc. | 1.10 | 17,617 | 0.41 | 6,566 | 0.45 | 7,207 | 0.49 | 7,847 | 0.91 | 14,574 |
| National Semiconductor Corp | 0.32 | 2,396 | 0.36 | 2,695 | 0.10 | 749 | 0.00 | 0 | 0.00 | 0 |
| NetApp, Inc. | 0.00 | 0 | 0.00 | 0 | 0.00 | 0 | 0.00 | 0 | 0.30 | 3,801 |
| New York Times Company Class A | 0.00 | 0 | 0.00 | 0 | 0.00 | 0 | 0.00 | 0 | 0.04 | 179 |
| Newell Rubbermaid Inc. | 0.26 | 2,713 | 0.20 | 2,128 | 0.29 | 3,085 | 0.43 | 4,574 | 0.60 | 6,383 |
| Newmont Mining Corporation | 0.40 | 6,974 | 0.50 | 8,717 | 1.00 | 17,434 | 1.40 | 24,408 | 1.23 | 21,357 |
| News Corp. Cl A | 0.12 | 10,591 | 0.15 | 13,239 | 0.17 | 15,004 | 0.17 | 15,004 | 4.02 | 355,026 |
| Nicor Inc | 1.86 | 3,225 | 1.86 | 3,225 | 1.40 | 2,419 | 0.00 | 0 | 0.00 | 0 |
| NIKE, Inc. Class B | 0.51 | 15,357 | 0.56 | 16,862 | 0.65 | 19,422 | 0.75 | 22,583 | 0.87 | 26,197 |
| NiSource Inc. | 0.92 | 9,682 | 0.92 | 9,682 | 0.92 | 9,682 | 0.94 | 9,893 | 0.98 | 10,314 |
| Noble Corp. | 0.18 | 1,858 | 0.89 | 9,008 | 0.60 | 6,090 | 0.54 | 5,490 | 0.76 | 7,698 |
| Noble Energy, Inc. | 0.36 | 4,773 | 0.36 | 4,773 | 0.40 | 5,303 | 0.45 | 6,032 | 0.55 | 7,226 |
| Nordstrom, Inc. | 0.64 | 3,914 | 0.76 | 4,648 | 0.92 | 5,627 | 1.08 | 6,605 | 1.20 | 7,339 |
| Norfolk Southern Corporation | 1.36 | 19,326 | 1.40 | 19,894 | 1.66 | 23,589 | 1.94 | 27,567 | 2.04 | 28,988 |
| Northern Trust Corporation | 1.12 | 9,586 | 1.12 | 9,586 | 1.12 | 9,586 | 1.18 | 10,100 | 1.23 | 10,528 |
| Northrop Grumman Corporation | 1.69 | 21,203 | 1.84 | 23,085 | 8.34 | 104,589 | 2.15 | 26,974 | 2.38 | 29,859 |
| Novell, Inc. | 0.00 | 0 | 0.00 | 0 | 0.00 | 0 | 0.00 | 0 | 0.00 | 0 |
| Novellus Systems Inc. | 0.00 | 0 | 0.00 | 0 | 0.00 | 0 | 0.00 | 0 | 0.00 | 0 |
| Nucor Corporation | 1.41 | 16,988 | 1.44 | 17,379 | 1.45 | 17,500 | 1.46 | 17,620 | 1.47 | 17,741 |
| NVIDIA Corporation | 0.00 | 0 | 0.00 | 0 | 0.00 | 0 | 0.08 | 1,546 | 0.31 | 6,389 |
| NYSE Euronext | 1.20 | 12,203 | 1.20 | 12,203 | 1.20 | 12,203 | 1.20 | 12,203 | 0.90 | 9,152 |
| Occidental Petroleum Corporation | 1.31 | 40,713 | 1.47 | 45,686 | 1.84 | 57,185 | 2.16 | 67,131 | 2.56 | 79,562 |
| Office Depot, Inc. | 0.00 | 0 | 0.00 | 0 | 0.00 | 0 | 0.00 | 0 | 0.00 | 0 |
| Omnicom Group Inc | 0.60 | 7,156 | 0.80 | 9,542 | 1.00 | 11,927 | 1.20 | 14,312 | 1.60 | 19,083 |
| Oracle Corporation | 0.15 | 22,550 | 0.20 | 30,066 | 0.23 | 34,576 | 0.42 | 63,139 | 0.24 | 36,079 |
| PACCAR Inc | 0.54 | 7,516 | 0.69 | 9,603 | 1.30 | 18,093 | 1.58 | 21,990 | 1.70 | 23,661 |
| Pactiv Corp | 0.00 | 0 | 0.00 | 0 | 0.00 | 0 | 0.00 | 0 | 0.00 | 0 |
| Pall Corporation | 0.58 | 2,628 | 0.64 | 2,900 | 0.70 | 3,172 | 0.88 | 3,987 | 1.02 | 4,644 |
| Parker-Hannifin Corporation | 1.00 | 6,184 | 1.07 | 6,617 | 1.43 | 8,843 | 1.62 | 10,018 | 1.78 | 11,008 |
| Patterson Companies, Inc. | 0.00 | 0 | 0.30 | 1,050 | 0.46 | 1,610 | 0.68 | 2,379 | 0.48 | 1,680 |
| Paychex, Inc. | 1.24 | 15,281 | 1.24 | 15,281 | 1.25 | 15,404 | 1.95 | 24,030 | 0.70 | 8,626 |
| Peabody Energy Corporation | 0.25 | 2,558 | 0.30 | 3,018 | 0.34 | 3,479 | 0.34 | 3,479 | 0.34 | 3,479 |
| People's United Financial, Inc. | 0.61 | 8,108 | 0.62 | 8,241 | 0.63 | 8,375 | 0.64 | 8,508 | 0.65 | 8,642 |
| Pepco Holdings, Inc. | 1.08 | 8,961 | 1.08 | 8,961 | 1.08 | 8,961 | 1.08 | 8,961 | 1.08 | 8,961 |

APPENDIX 2-continued

Example MMACC embodiments (5 years of dividends)
2008 Tranche - 5 Year Maturity

| | 2009-2013 Dividend Income Row | | | | | | | | | |
|---|---|---|---|---|---|---|---|---|---|---|
| Company Name | Y1 Divs P/S* | Y1 Div $ Rec'd | Y2 Divs P/S* | Y2 Div $ Rec'd | Y3 Divs P/S* | Y3 Div $ Rec'd | Y4 Divs P/S* | Y4 Div $ Rec'd | Y5 Divs P/S* | Y5 Div $ Rec'd |
| Pepsi Bottling | 0.71 | 3,682 | 0.18 | 933 | 0.00 | 0 | 0.00 | 0 | 0.00 | 0 |
| PepsiCo, Inc. | 1.78 | 105,792 | 1.89 | 112,646 | 2.02 | 120,692 | 2.13 | 126,801 | 2.24 | 133,506 |
| PerkinElmer, Inc. | 0.28 | 1,269 | 0.28 | 1,269 | 0.28 | 1,269 | 0.28 | 1,269 | 0.28 | 1,269 |
| Pfizer Inc. | 0.80 | 207,009 | 0.72 | 186,308 | 0.80 | 207,009 | 0.88 | 227,710 | 0.96 | 248,410 |
| PG&E Corporation | 1.68 | 23,273 | 1.82 | 25,213 | 1.82 | 25,213 | 1.82 | 25,213 | 1.82 | 25,213 |
| Philip Morris International Inc. | 2.24 | 173,900 | 2.44 | 189,427 | 2.82 | 218,928 | 3.24 | 251,534 | 3.58 | 277,930 |
| Pinnacle West Capital Corporation | 2.10 | 8,125 | 2.10 | 8,125 | 2.10 | 8,125 | 2.12 | 8,202 | 2.20 | 8,521 |
| Pioneer Natural Resources Company | 0.08 | 361 | 0.08 | 361 | 0.08 | 361 | 0.08 | 361 | 0.08 | 361 |
| Pitney Bowes Inc. | 1.44 | 11,390 | 1.46 | 11,549 | 1.48 | 11,707 | 1.50 | 11,865 | 0.94 | 7,416 |
| Plum Creek Timber Company, Inc. | 1.68 | 10,754 | 1.68 | 10,754 | 1.68 | 10,754 | 1.68 | 10,754 | 1.74 | 11,138 |
| PNC Financial Services Group, Inc. | 0.96 | 12,826 | 0.40 | 5,344 | 1.15 | 15,364 | 1.55 | 20,708 | 1.72 | 22,979 |
| Polo Ralph Lauren Corp. | 0.25 | 540 | 0.40 | 864 | 0.80 | 1,727 | 1.40 | 3,023 | 1.65 | 3,562 |
| PPG Industries, Inc. | 2.13 | 13,423 | 2.18 | 13,738 | 2.26 | 14,243 | 2.34 | 14,747 | 2.42 | 15,251 |
| PPL Corporation | 1.38 | 19,860 | 1.40 | 20,147 | 1.40 | 20,147 | 1.44 | 20,723 | 1.47 | 21,155 |
| Praxair, Inc. | 1.60 | 18,936 | 1.80 | 21,303 | 2.00 | 23,670 | 2.20 | 26,037 | 2.40 | 28,404 |
| Precision Castparts Corp. | 0.12 | 642 | 0.12 | 642 | 0.12 | 642 | 0.12 | 642 | 0.12 | 642 |
| Principal Financial Group, Inc. | 0.50 | 4,976 | 0.55 | 5,474 | 0.70 | 6,966 | 0.78 | 7,763 | 0.98 | 9,753 |
| Procter & Gamble Company | 1.72 | 197,072 | 1.89 | 216,024 | 2.06 | 235,662 | 2.21 | 253,330 | 2.37 | 271,146 |
| Progress Energy Inc. | 2.48 | 25,038 | 2.48 | 25,038 | 2.74 | 27,653 | 1.24 | 12,519 | 0.00 | 0 |
| Progressive Corporation | 0.00 | 0 | 1.16 | 30,109 | 0.40 | 10,337 | 1.41 | 36,484 | 0.28 | 7,376 |
| Prologis | 0.70 | 7,136 | 0.56 | 5,735 | 0.22 | 2,294 | 0.00 | 0 | 0.00 | 0 |
| Prudential Financial, Inc. | 0.70 | 11,390 | 1.15 | 18,712 | 1.45 | 23,593 | 1.60 | 26,034 | 1.73 | 28,149 |
| Public Service Enterprise Group Incorporated | 1.33 | 25,831 | 1.37 | 26,608 | 1.37 | 26,608 | 1.42 | 27,579 | 1.44 | 27,968 |
| Public Storage | 2.20 | 10,584 | 3.05 | 14,674 | 3.65 | 17,560 | 4.40 | 21,168 | 5.15 | 24,777 |
| PulteGroup, Inc. | 0.00 | 0 | 0.00 | 0 | 0.00 | 0 | 0.00 | 0 | 0.15 | 1,230 |
| QLogic Corporation | 0.00 | 0 | 0.00 | 0 | 0.00 | 0 | 0.00 | 0 | 0.00 | 0 |
| QUALCOMM Incorporated | 0.67 | 42,564 | 0.74 | 47,011 | 0.84 | 53,047 | 0.97 | 61,305 | 1.30 | 82,588 |
| Quest Diagnostics Incorporated | 0.40 | 2,432 | 0.40 | 2,432 | 0.40 | 2,432 | 0.68 | 4,134 | 1.20 | 7,296 |
| Questar Corporation | 0.51 | 3,361 | 31.37 | 208,799 | 0.62 | 4,127 | 0.66 | 4,426 | 0.71 | 4,726 |
| Qwest Communications International Inc | 0.32 | 17,990 | 0.32 | 17,990 | 0.08 | 4,497 | 0.00 | 0 | 0.00 | 0 |
| R.R. Donnelley & Sons Company | 1.04 | 8,182 | 1.04 | 8,182 | 1.04 | 8,182 | 1.04 | 8,182 | 1.04 | 8,182 |
| RadioShack Corporation | 0.25 | 1,200 | 0.25 | 1,200 | 0.50 | 2,400 | 0.25 | 1,200 | 0.00 | 0 |
| Range Resources Corporation | 0.16 | 954 | 0.16 | 954 | 0.16 | 954 | 0.16 | 954 | 0.16 | 954 |
| Raytheon Company | 1.24 | 19,704 | 1.13 | 17,876 | 2.10 | 33,290 | 2.43 | 38,613 | 2.20 | 34,958 |
| Regions Financial Corporation | 0.13 | 3,452 | 0.04 | 1,062 | 0.04 | 1,062 | 0.04 | 1,062 | 0.10 | 2,655 |
| Republic Services, Inc. | 0.76 | 9,363 | 0.78 | 9,610 | 0.84 | 10,349 | 0.91 | 11,211 | 0.99 | 12,197 |
| Reynolds American Inc. | 1.73 | 22,380 | 1.84 | 23,872 | 2.15 | 27,894 | 2.33 | 30,229 | 2.48 | 32,175 |
| Robert Half International Inc. | 0.48 | 2,858 | 0.52 | 3,096 | 0.56 | 3,334 | 0.60 | 3,572 | 0.64 | 3,811 |
| Rockwell Automation, Inc. | 1.16 | 6,299 | 1.28 | 6,950 | 1.55 | 8,417 | 1.79 | 9,720 | 2.09 | 11,349 |
| Rockwell Collins, Inc. | 0.96 | 5,832 | 0.96 | 5,832 | 0.96 | 5,832 | 1.14 | 6,926 | 1.20 | 7,290 |
| Rohm & Haas Co. | 0.41 | 1,966 | 0.00 | 0 | 0.00 | 0 | 0.00 | 0 | 0.00 | 0 |
| Rowan Cos. Plc Class A | 0.00 | 0 | 0.00 | 0 | 0.00 | 0 | 0.00 | 0 | 0.00 | 0 |
| Ryder System, Inc. | 0.96 | 2,049 | 1.04 | 2,219 | 1.12 | 2,390 | 1.20 | 2,561 | 1.30 | 2,774 |
| Safeway Inc. | 0.38 | 6,297 | 0.46 | 7,567 | 0.55 | 9,130 | 0.67 | 11,022 | 0.77 | 12,750 |
| salesforce.com, inc. | 0.00 | 0 | 0.00 | 0 | 0.00 | 0 | 0.00 | 0 | 0.00 | 0 |
| SanDisk Corporation | 0.00 | 0 | 0.00 | 0 | 0.00 | 0 | 0.00 | 0 | 0.45 | 3,903 |
| Sara Lee Corp. | 2.20 | 11,937 | 2.22 | 12,073 | 2.30 | 12,480 | 68.26 | 370,406 | 0.60 | 3,256 |
| Schering-Plough Corp. | 0.26 | 16,219 | 0.00 | 0 | 0.00 | 0 | 0.00 | 0 | 0.00 | 0 |
| Schlumberger NV | 0.84 | 38,559 | 0.84 | 38,559 | 1.00 | 45,903 | 1.10 | 50,493 | 1.25 | 57,379 |
| Scripps Networks Interactive, Inc. Class A | 0.30 | 1,037 | 0.30 | 1,037 | 0.38 | 1,296 | 0.48 | 1,659 | 0.60 | 2,074 |
| Sealed Air Corporation | 0.48 | 2,908 | 0.50 | 3,029 | 0.52 | 3,150 | 0.52 | 3,150 | 0.52 | 3,150 |
| Sears Holdings Corporation | 0.00 | 0 | 0.00 | 0 | 0.33 | 705 | 4.59 | 9,791 | 0.00 | 0 |
| Sempra Energy | 1.56 | 14,584 | 1.56 | 14,584 | 1.92 | 17,950 | 2.40 | 22,438 | 2.52 | 23,560 |
| Sherwin-Williams Company | 1.42 | 5,351 | 1.44 | 5,426 | 1.46 | 5,501 | 1.56 | 5,878 | 2.00 | 7,536 |
| Sigma-Aldrich Corporation | 0.58 | 2,790 | 0.64 | 3,079 | 0.72 | 3,464 | 0.80 | 3,849 | 0.86 | 4,137 |
| Simon Property Group, Inc. | 2.68 | 23,768 | 2.60 | 23,067 | 3.50 | 31,052 | 4.10 | 36,375 | 4.65 | 41,255 |
| SLM Corp | 0.00 | 0 | 0.00 | 0 | 0.30 | 5,380 | 0.50 | 8,966 | 0.60 | 10,759 |
| Smith International | 0.48 | 4,032 | 0.24 | 2,016 | 0.00 | 0 | 0.00 | 0 | 0.00 | 0 |
| Snap-on Incorporated | 1.20 | 2,645 | 1.22 | 2,689 | 1.30 | 2,865 | 1.40 | 3,086 | 1.58 | 3,482 |
| Southern Company | 1.73 | 51,499 | 1.80 | 53,579 | 1.87 | 55,660 | 1.94 | 57,741 | 2.01 | 59,822 |
| Southwest Airlines Co. | 0.02 | 511 | 0.02 | 511 | 0.02 | 511 | 0.03 | 979 | 0.13 | 3,690 |
| Southwestern Energy Company | 0.00 | 0 | 0.00 | 0 | 0.00 | 0 | 0.00 | 0 | 0.00 | 0 |
| Sovereign Bancorp Inc. | 0.00 | 0 | 0.00 | 0 | 0.00 | 0 | 0.00 | 0 | 0.00 | 0 |
| Spectra Energy Corp | 1.00 | 23,449 | 1.00 | 23,449 | 1.06 | 24,856 | 1.15 | 26,849 | 1.22 | 28,608 |
| Sprint Nextel Corporation | 0.00 | 0 | 0.00 | 0 | 0.00 | 0 | 0.00 | 0 | 0.00 | 0 |
| St. Jude Medical, Inc. | 0.00 | 0 | 0.00 | 0 | 0.84 | 11,095 | 0.92 | 12,151 | 1.00 | 13,208 |
| Staples, Inc. | 0.33 | 9,034 | 0.36 | 9,855 | 0.40 | 10,950 | 0.44 | 12,045 | 0.48 | 13,140 |
| Starbucks Corporation | 0.00 | 0 | 0.36 | 10,161 | 0.56 | 15,806 | 0.72 | 20,322 | 0.89 | 25,120 |
| Starwood Hotels & Resorts Worldwide, Inc. | 0.20 | 1,405 | 0.30 | 2,107 | 0.50 | 3,512 | 1.25 | 8,780 | 1.35 | 9,482 |
| State Street Corporation | 0.04 | 663 | 0.04 | 663 | 0.72 | 11,935 | 0.96 | 15,913 | 1.04 | 17,239 |
| Stericycle, Inc. | 0.00 | 0 | 0.00 | 0 | 0.00 | 0 | 0.00 | 0 | 0.00 | 0 |

APPENDIX 2-continued

Example MMACC embodiments (5 years of dividends)
2008 Tranche - 5 Year Maturity

| | 2009-2013 Dividend Income Row | | | | | | | | | |
|---|---|---|---|---|---|---|---|---|---|---|
| Company Name | Y1 Divs P/S* | Y1 Div $ Rec'd | Y2 Divs P/S* | Y2 Div $ Rec'd | Y3 Divs P/S* | Y3 Div $ Rec'd | Y4 Divs P/S* | Y4 Div $ Rec'd | Y5 Divs P/S* | Y5 Div $ Rec'd |
| Stryker Corporation | 0.25 | 2,324 | 0.63 | 5,856 | 0.75 | 6,995 | 0.90 | 8,390 | 1.10 | 10,226 |
| Sun Microsystems | 0.00 | 0 | 0.00 | 0 | 0.00 | 0 | 0.00 | 0 | 0.00 | 0 |
| Sunoco Inc. | 1.20 | 5,382 | 0.60 | 2,691 | 0.60 | 2,691 | 7.71 | 34,571 | 0.00 | 0 |
| SunTrust Banks, Inc. | 0.22 | 2,990 | 0.04 | 544 | 0.12 | 1,631 | 0.20 | 2,718 | 0.35 | 4,756 |
| SUPERVALU INC. | 0.69 | 5,648 | 0.35 | 2,844 | 0.35 | 2,844 | 0.17 | 1,422 | 0.00 | 0 |
| Symantec Corporation | 0.00 | 0 | 0.00 | 0 | 0.00 | 0 | 0.00 | 0 | 0.45 | 14,437 |
| Sysco Corporation | 0.97 | 22,302 | 0.75 | 17,244 | 1.04 | 23,912 | 1.08 | 24,831 | 1.41 | 32,419 |
| T. Rowe Price Group | 1.00 | 9,916 | 1.08 | 10,709 | 1.24 | 12,296 | 2.36 | 23,402 | 1.52 | 15,072 |
| Target Corporation | 0.66 | 19,066 | 0.84 | 24,266 | 1.10 | 31,777 | 1.32 | 38,132 | 1.58 | 45,643 |
| TECO Energy, Inc. | 0.80 | 6,533 | 0.82 | 6,655 | 0.85 | 6,941 | 0.88 | 7,186 | 0.88 | 7,186 |
| Tellabs, Inc. | 0.00 | 0 | 0.08 | 1,222 | 0.08 | 1,222 | 1.08 | 16,496 | 0.00 | 0 |
| Tenet Healthcare Corporation | 0.00 | 0 | 0.00 | 0 | 0.00 | 0 | 0.00 | 0 | 0.00 | 0 |
| Teradata Corporation | 0.00 | 0 | 0.00 | 0 | 0.00 | 0 | 0.00 | 0 | 0.00 | 0 |
| Teradyne, Inc. | 0.00 | 0 | 0.00 | 0 | 0.00 | 0 | 0.00 | 0 | 0.00 | 0 |
| Tesoro Corporation | 0.35 | 1,860 | 0.00 | 0 | 0.00 | 0 | 0.27 | 1,435 | 0.90 | 4,782 |
| Texas Instruments Incorporated | 0.45 | 22,388 | 0.49 | 24,378 | 0.56 | 27,861 | 0.72 | 35,821 | 1.07 | 53,234 |
| Textron Inc. | 0.08 | 740 | 0.08 | 740 | 0.08 | 740 | 0.08 | 740 | 0.08 | 740 |
| The Stanley Works | 1.30 | 3,931 | 1.34 | 4,052 | 1.64 | 4,959 | 1.80 | 5,443 | 1.98 | 5,988 |
| Thermo Fisher Scientific Inc. | 0.00 | 0 | 0.00 | 0 | 0.00 | 0 | 0.54 | 8,708 | 0.60 | 9,676 |
| Tiffany & Co. | 0.68 | 3,212 | 0.95 | 4,488 | 1.12 | 5,291 | 1.25 | 5,905 | 1.34 | 6,330 |
| Time Warner Inc. | 9.51 | 436,340 | 0.85 | 39,006 | 0.94 | 43,137 | 1.04 | 47,726 | 1.15 | 52,774 |
| Titanium Metals Corp. | 0.00 | 0 | 0.00 | 0 | 0.22 | 735 | 0.30 | 980 | 0.00 | 0 |
| TJX Companies, Inc. | 0.23 | 7,509 | 0.29 | 9,107 | 0.36 | 11,503 | 0.44 | 14,060 | 0.55 | 17,575 |
| Torchmark Corporation | 0.19 | 1,371 | 0.27 | 1,990 | 0.27 | 1,990 | 0.38 | 2,790 | 0.55 | 4,063 |
| Total System Services, Inc. | 0.28 | 2,115 | 0.28 | 2,115 | 0.31 | 2,341 | 0.40 | 3,021 | 0.40 | 3,021 |
| Travelers Companies, Inc. | 1.23 | 27,590 | 1.41 | 31,628 | 1.59 | 35,665 | 1.79 | 40,151 | 1.96 | 43,965 |
| Tyco Electronics Ltd. | 0.64 | 11,239 | 0.64 | 11,239 | 0.70 | 12,293 | 0.81 | 14,224 | 0.96 | 16,859 |
| Tyco International Ltd. | 0.85 | 15,372 | 0.86 | 15,548 | 0.99 | 17,904 | 29.52 | 535,713 | 0.63 | 11,434 |
| Tyson Foods, Inc. Class A | 0.16 | 1,855 | 0.16 | 1,855 | 0.16 | 1,855 | 0.27 | 3,130 | 0.22 | 2,608 |
| U.S. Bancorp | 0.20 | 13,466 | 0.20 | 13,466 | 0.50 | 33,666 | 0.78 | 52,519 | 0.88 | 59,589 |
| Union Pacific Corporation | 0.54 | 20,989 | 0.65 | 25,459 | 0.97 | 37,509 | 1.24 | 48,392 | 1.48 | 57,526 |
| United Parcel Service, Inc. Class B | 1.80 | 68,742 | 1.88 | 71,797 | 2.08 | 79,435 | 2.28 | 87,073 | 2.48 | 94,711 |
| United States Steel Corporation | 0.45 | 2,007 | 0.20 | 892 | 0.20 | 892 | 0.20 | 892 | 0.20 | 892 |
| United Technologies Corporation | 1.54 | 56,179 | 1.70 | 62,016 | 1.86 | 68,035 | 2.03 | 74,054 | 2.19 | 80,074 |
| UnitedHealth Group Incorporated | 0.03 | 1,391 | 0.41 | 18,772 | 0.61 | 28,389 | 0.80 | 37,080 | 1.05 | 48,783 |
| Unum Group | 0.32 | 4,003 | 0.35 | 4,447 | 0.39 | 5,019 | 0.47 | 5,972 | 0.55 | 6,989 |
| UST Inc. | 0.00 | 0 | 0.00 | 0 | 0.00 | 0 | 0.00 | 0 | 0.00 | 0 |
| V.F. Corporation | 0.59 | 8,009 | 0.61 | 8,212 | 0.65 | 8,820 | 0.76 | 10,239 | 0.91 | 12,368 |
| Valero Energy Corporation | 0.60 | 11,881 | 0.20 | 3,960 | 0.30 | 5,941 | 0.65 | 12,871 | 4.21 | 83,278 |
| Varian Medical Systems, Inc. | 0.00 | 0 | 0.00 | 0 | 0.00 | 0 | 0.00 | 0 | 0.00 | 0 |
| VeriSign, Inc. | 0.00 | 0 | 3.00 | 22,338 | 2.75 | 20,477 | 0.00 | 0 | 0.00 | 0 |
| Verizon Communications Inc. | 1.85 | 202,202 | 3.76 | 409,681 | 1.96 | 213,920 | 2.01 | 219,643 | 2.07 | 226,183 |
| Viacom Inc. Class B | 0.00 | 0 | 0.45 | 10,595 | 0.90 | 21,190 | 1.08 | 25,310 | 1.18 | 27,664 |
| Vornado Realty Trust | 3.20 | 16,870 | 2.60 | 13,707 | 2.76 | 14,551 | 3.76 | 19,823 | 2.92 | 15,394 |
| Vulcan Materials Company | 1.48 | 6,256 | 1.00 | 4,227 | 0.76 | 3,213 | 0.04 | 169 | 0.04 | 169 |
| W.W. Grainger, Inc. | 1.78 | 4,416 | 2.08 | 5,160 | 2.52 | 6,252 | 3.06 | 7,592 | 3.59 | 8,907 |
| Walgreen Co. | 0.50 | 18,994 | 0.63 | 23,742 | 0.80 | 30,390 | 1.00 | 37,987 | 1.18 | 44,825 |
| Wal-Mart Stores, Inc. | 1.09 | 93,523 | 1.21 | 103,819 | 1.46 | 125,269 | 1.59 | 136,424 | 1.88 | 161,306 |
| Walt Disney Company | 0.35 | 24,862 | 0.40 | 28,413 | 0.60 | 42,620 | 0.75 | 53,275 | 0.86 | 61,088 |
| Waste Management, Inc. | 1.16 | 21,838 | 1.26 | 23,721 | 1.36 | 25,603 | 1.42 | 26,733 | 1.46 | 27,486 |
| Waters Corporation | 0.00 | 0 | 0.00 | 0 | 0.00 | 0 | 0.00 | 0 | 0.00 | 0 |
| Watson Pharmaceuticals Inc. | 0.00 | 0 | 0.00 | 0 | 0.00 | 0 | 0.00 | 0 | 0.00 | 0 |
| Weatherford International Ltd. | 0.00 | 0 | 0.00 | 0 | 0.00 | 0 | 0.00 | 0 | 0.00 | 0 |
| WellPoint, Inc. | 0.00 | 0 | 0.00 | 0 | 1.00 | 19,534 | 1.15 | 22,464 | 1.50 | 29,301 |
| Wells Fargo & Company | 0.49 | 71,261 | 0.20 | 29,086 | 0.48 | 69,807 | 0.88 | 127,979 | 1.15 | 167,246 |
| Western Union Company | 0.06 | 1,648 | 0.25 | 6,865 | 0.31 | 8,513 | 0.43 | 11,671 | 0.50 | 13,730 |
| Weyerhaeuser Company | 0.24 | 4,865 | 1.13 | 23,295 | 0.60 | 12,321 | 0.62 | 12,732 | 0.81 | 16,633 |
| Whirlpool Corporation | 1.72 | 4,852 | 1.72 | 4,852 | 1.93 | 5,445 | 2.00 | 5,642 | 2.38 | 6,700 |
| Whole Foods Market, Inc. | 0.00 | 0 | 0.00 | 0 | 0.20 | 2,154 | 1.28 | 13,784 | 0.40 | 4,308 |
| Williams Companies, Inc. | 0.44 | 9,771 | 0.48 | 10,770 | 0.77 | 17,210 | 7.25 | 161,064 | 1.44 | 31,923 |
| Windstream Corp. | 1.00 | 16,863 | 1.00 | 16,863 | 1.00 | 16,863 | 1.00 | 16,863 | 1.00 | 16,863 |
| Wisconsin Energy Corporation | 0.67 | 6,057 | 0.80 | 7,179 | 1.04 | 9,333 | 1.20 | 10,769 | 1.44 | 12,967 |
| Wyeth | 0.90 | 45,986 | 0.00 | 0 | 0.00 | 0 | 0.00 | 0 | 0.00 | 0 |
| Wyndham Worldwide Corporation | 0.16 | 1,089 | 0.48 | 3,266 | 0.60 | 4,083 | 0.92 | 6,261 | 1.16 | 7,894 |
| Wynn Resorts, Limited | 4.00 | 9,456 | 8.50 | 20,094 | 6.50 | 15,366 | 9.50 | 22,458 | 7.00 | 16,548 |
| Xcel Energy Inc. | 0.97 | 16,758 | 1.00 | 17,275 | 1.03 | 17,792 | 1.07 | 18,438 | 1.11 | 19,127 |
| Xerox Corporation | 0.17 | 5,647 | 0.17 | 5,647 | 0.17 | 5,647 | 0.17 | 5,647 | 0.23 | 7,640 |
| Xilinx, Inc. | 0.58 | 6,096 | 0.64 | 6,727 | 0.73 | 7,673 | 0.85 | 8,934 | 0.97 | 10,196 |
| XL Capital Ltd. | 0.40 | 5,078 | 0.40 | 5,078 | 0.44 | 5,585 | 0.44 | 5,585 | 0.56 | 7,109 |
| XTO Energy Inc | 0.50 | 11,068 | 0.25 | 5,534 | 0.00 | 0 | 0.00 | 0 | 0.00 | 0 |
| Yahoo! Inc. | 0.00 | 0 | 0.00 | 0 | 0.00 | 0 | 0.00 | 0 | 0.00 | 0 |

APPENDIX 2-continued

Example MMACC embodiments (5 years of dividends)
2008 Tranche - 5 Year Maturity

| | 2009-2013 Dividend Income Row | | | | | | | | | |
|---|---|---|---|---|---|---|---|---|---|---|
| Company Name | Y1 Divs P/S* | Y1 Div $ Rec'd | Y2 Divs P/S* | Y2 Div $ Rec'd | Y3 Divs P/S* | Y3 Div $ Rec'd | Y4 Divs P/S* | Y4 Div $ Rec'd | Y5 Divs P/S* | Y5 Div $ Rec'd |
| YUM! Brands, Inc. | 0.78 | 13,846 | 0.88 | 15,621 | 1.03 | 18,372 | 1.19 | 21,124 | 1.38 | 24,408 |
| Zimmer Holdings, Inc. | 0.00 | 0 | 0.00 | 0 | 0.00 | 0 | 0.72 | 6,205 | 0.80 | 6,894 |
| Zions Bancorporation | 0.10 | 443 | 0.04 | 177 | 0.04 | 177 | 0.04 | 177 | 0.13 | 575 |

*Split adjusted for consistency
** - Companies that stop trading have their cash balances carried forward

APPENDIX 3

Example MMACC embodiments (liquidation Dec. 31, 2013)
2008 Tranche - 5 Year Maturity
Liquidation (Dec. 31, 2013)

| Company Name | Y5 Ending Valuation Price | As Of:** | Y5 $ MV |
|---|---|---|---|
| Sum: | | | 595,740,879 |
| 3M Company | 140.25 | 20131231 | 3,729,528 |
| Abbott Laboratories | 38.33 | 20131231 | 2,282,245 |
| Abercrombie & Fitch Co. Class A | 32.91 | 20131231 | 109,919 |
| Adobe Systems Incorporated | 59.88 | 20131231 | 1,220,095 |
| Advanced Micro Devices, Inc. | 3.87 | 20131231 | 90,368 |
| AES Corporation | 14.51 | 20131231 | 374,605 |
| Aetna Inc. | 68.59 | 20131231 | 1,213,700 |
| Affiliated Computer Services Inc. Cl A | 59.64 | 20100205 | 223,292 |
| Aflac Incorporated | 66.80 | 20131231 | 1,194,919 |
| Agilent Technologies, Inc. | 57.19 | 20131231 | 768,119 |
| Air Products and Chemicals, Inc. | 111.78 | 20131231 | 898,935 |
| AK Steel Holding Corporation | 8.20 | 20131231 | 35,252 |
| Akamai Technologies, Inc. | 47.18 | 20131231 | 306,198 |
| Alcoa Inc. | 10.63 | 20131231 | 326,469 |
| Allegheny Energy | 24.99 | 20110225 | 162,110 |
| Allegheny Technologies Incorporated | 35.63 | 20131231 | 131,653 |
| Allergan, Inc. | 111.08 | 20131231 | 1,310,855 |
| Allstate Corporation | 54.54 | 20131231 | 1,121,779 |
| Altera Corporation | 32.51 | 20131231 | 370,983 |
| Altria Group, Inc. | 38.39 | 20131231 | 3,035,421 |
| Amazon.com, Inc. | 398.79 | 20131231 | 4,921,867 |
| Ameren Corporation | 36.16 | 20131231 | 293,438 |
| American Capital, Ltd. | 15.64 | 20131231 | 124,103 |
| American Electric Power Company, Inc. | 46.74 | 20131231 | 723,816 |
| American Express Company | 90.73 | 20131231 | 4,038,483 |
| American International Group, Inc. | 51.05 | 20131231 | 263,367 |
| American Tower Corporation | 79.82 | 20131231 | 1,215,100 |
| Ameriprise Financial, Inc. | 115.05 | 20131231 | 956,296 |
| AmerisourceBergen Corporation | 70.31 | 20131231 | 843,017 |
| Amgen Inc. | 114.08 | 20131231 | 4,638,379 |
| Amphenol Corporation Class A | 44.59 | 20131231 | 601,564 |
| Anadarko Petroleum Corporation | 79.32 | 20131231 | 1,397,301 |
| Analog Devices, Inc. | 50.93 | 20131231 | 569,143 |
| Aon plc | 83.89 | 20131231 | 868,513 |
| Apache Corporation | 85.94 | 20131231 | 1,103,728 |
| Apartment Investment and Management Company C | 25.91 | 20131231 | 100,686 |
| Apollo Education Group, Inc. Class A | 27.32 | 20131231 | 111,711 |
| Apple Inc. | 80.15 | 20131231 | 19,138,076 |
| Applied Materials, Inc. | 17.68 | 20131231 | 910,273 |
| Archer-Daniels-Midland Company | 43.40 | 20131231 | 1,068,378 |
| Assurant, Inc. | 66.37 | 20131231 | 299,594 |
| AT&T Inc. | 35.16 | 20131231 | 7,951,258 |
| Autodesk, Inc. | 50.32 | 20131231 | 436,970 |
| Automatic Data Processing, Inc. | 80.80 | 20131231 | 1,574,773 |
| AutoNation, Inc. | 49.69 | 20131231 | 205,717 |
| AutoZone, Inc. | 477.94 | 20131231 | 701,616 |
| AvalonBay Communities, Inc. | 118.23 | 20131231 | 349,843 |
| Avery Dennison Corporation | 50.19 | 20131231 | 204,725 |
| Avon Products, Inc. | 17.22 | 20131231 | 281,702 |
| Baker Hughes Incorporated | 55.26 | 20131231 | 652,179 |
| Ball Corporation | 51.66 | 20131231 | 375,052 |

APPENDIX 3-continued

Example MMACC embodiments (liquidation Dec. 31, 2013)
2008 Tranche - 5 Year Maturity
Liquidation (Dec. 31, 2013)

| Company Name | Y5 Ending Valuation Price | As Of:** | Y5 $ MV |
|---|---|---|---|
| Bank of America Corporation | 15.57 | 20131231 | 2,998,004 |
| Bank of New York Mellon Corporation | 34.94 | 20131231 | 1,538,688 |
| Baxter International Inc. | 69.55 | 20131231 | 1,655,221 |
| BB&T Corporation | 37.32 | 20131231 | 791,259 |
| Becton, Dickinson and Company | 110.49 | 20131231 | 1,030,872 |
| Bed Bath & Beyond Inc. | 80.30 | 20131231 | 800,270 |
| Bemis Company, Inc. | 40.96 | 20131231 | 156,672 |
| Best Buy Co., Inc. | 39.88 | 20131231 | 516,925 |
| Big Lots, Inc. | 32.29 | 20131231 | 101,746 |
| Biogen Idec Inc. | 279.57 | 20131231 | 3,130,088 |
| BJ Services Co | 23.18 | 20100428 | 259,686 |
| Black & Decker Corporation | 74.05 | 20100312 | 170,759 |
| BMC Software, Inc. | 46.30 | 20130910 | 333,175 |
| Boeing Company | 136.49 | 20131231 | 3,838,509 |
| Boston Properties, Inc. | 100.37 | 20131231 | 465,315 |
| Boston Scientific Corporation | 12.02 | 20131231 | 692,604 |
| Bristol-Myers Squibb Company | 53.15 | 20131231 | 4,037,699 |
| Broadcom Corporation Class A | 29.65 | 20131231 | 505,269 |
| Brown-Forman Corporation Class B | 75.57 | 20131231 | 426,668 |
| Burlington Northern | 100.21 | 20100212 | 1,079,462 |
| C. R. Bard, Inc. | 133.94 | 20131231 | 509,910 |
| C.H. Robinson Worldwide, Inc. | 58.35 | 20131231 | 378,867 |
| CA, Inc. | 33.65 | 20131231 | 508,653 |
| Cabot Oil & Gas Corporation | 38.76 | 20131231 | 614,927 |
| Cameron International Corporation | 59.53 | 20131231 | 501,481 |
| Campbell Soup Company | 43.28 | 20131231 | 341,696 |
| Capital One Financial Corporation | 76.61 | 20131231 | 1,151,448 |
| Cardinal Health, Inc. | 66.81 | 20131231 | 921,978 |
| Carnival Corporation | 40.17 | 20131231 | 673,651 |
| Caterpillar Inc. | 90.81 | 20131231 | 2,102,161 |
| CB Richard Ellis Group Inc. | 26.30 | 20131231 | 225,075 |
| CBS Corporation Class B | 63.74 | 20131231 | 1,663,104 |
| Celgene Corporation | 84.48 | 20131231 | 2,970,965 |
| CenterPoint Energy, Inc. | 23.18 | 20131231 | 306,138 |
| Centex Corp. | 11.95 | 20090818 | 57,013 |
| CenturyLink, Inc. | 31.85 | 20131231 | 122,400 |
| Cephalon Inc | 81.50 | 20111014 | 214,087 |
| CF Industries Holdings, Inc. | 233.04 | 20131231 | 508,493 |
| Charles Schwab Corporation | 26.00 | 20131231 | 933,608 |
| Chesapeake Energy Corporation | 27.14 | 20131231 | 563,291 |
| Chevron Corporation | 124.91 | 20131231 | 9,739,233 |
| Chubb Corporation | 96.63 | 20131231 | 1,319,000 |
| Ciena Corporation | 23.93 | 20131231 | 82,941 |
| Cigna Corporation | 87.48 | 20131231 | 922,739 |
| Cincinnati Financial Corporation | 52.37 | 20131231 | 326,317 |
| Cintas Corporation | 59.59 | 20131231 | 300,453 |
| Cisco Systems, Inc. | 22.43 | 20131231 | 5,039,797 |
| CIT Group Inc. (Old) | 0.05 | 20091209 | 623 |
| Citigroup Inc. | 52.11 | 20131231 | 1,089,777 |
| Citrix Systems, Inc. | 63.25 | 20131231 | 440,916 |
| Clorox Company | 92.76 | 20131231 | 493,762 |
| CME Group Inc. Class A | 78.46 | 20131231 | 1,008,446 |
| CMS Energy Corporation | 26.77 | 20131231 | 232,390 |
| Coach, Inc. | 56.13 | 20131231 | 704,207 |
| Coca-Cola Company | 41.31 | 20131231 | 6,308,327 |
| Coca-Cola Enterprises, Inc. | 44.13 | 20131231 | 537,106 |
| Cognizant Technology Solutions Corporation Class A | 50.49 | 20131231 | 1,128,401 |
| Colgate-Palmolive Company | 65.21 | 20131231 | 2,526,040 |
| Comcast Corporation Class A | 51.97 | 20131231 | 5,742,756 |
| Comerica Incorporated | 47.54 | 20131231 | 274,544 |
| Computer Sciences Corporation | 55.88 | 20131231 | 324,830 |
| Compuware Corporation | 11.21 | 20131231 | 106,035 |
| ConAgra Foods, Inc. | 33.70 | 20131231 | 578,191 |
| ConocoPhillips | 70.65 | 20131231 | 4,041,887 |
| CONSOL Energy Inc. | 38.04 | 20131231 | 264,492 |
| Consolidated Edison, Inc. | 55.28 | 20131231 | 580,495 |
| Constellation Brands, Inc. Class A | 70.38 | 20131231 | 525,739 |
| Constellation Energy Group Inc. | 37.23 | 20120312 | 254,914 |
| Convergys Corporation | 21.05 | 20131231 | 98,598 |
| Cooper Industries PLC Cl A | 74.50 | 20121130 | 495,500 |
| Corning Incorporated | 17.82 | 20131231 | 1,062,927 |
| Costco Wholesale Corporation | 119.02 | 20131231 | 1,971,685 |

APPENDIX 3-continued

Example MMACC embodiments (liquidation Dec. 31, 2013)
2008 Tranche - 5 Year Maturity
Liquidation (Dec. 31, 2013)

| Company Name | Y5 Ending Valuation Price | As Of:** | Y5 $ MV |
|---|---|---|---|
| Coventry Health Care Inc. | 49.99 | 20130506 | 285,793 |
| Covidien Plc | 68.10 | 20131231 | 1,316,033 |
| CSX Corporation | 28.77 | 20131231 | 1,306,532 |
| Cummins Inc. | 140.97 | 20131231 | 1,089,416 |
| CVS Health Corporation | 71.57 | 20131231 | 3,944,581 |
| D.R. Horton, Inc. | 22.32 | 20131231 | 235,967 |
| Danaher Corporation | 77.20 | 20131231 | 1,514,973 |
| Darden Restaurants, Inc. | 54.37 | 20131231 | 289,466 |
| DaVita HealthCare Partners Inc. | 63.37 | 20131231 | 504,869 |
| Dean Foods Company | 17.19 | 20131231 | 50,779 |
| Deere & Company | 91.33 | 20131231 | 1,496,533 |
| Dell Inc. | 13.86 | 20131029 | 920,443 |
| DENTSPLY International Inc. | 48.48 | 20131231 | 277,112 |
| Developers Diversified Realty Corp. | 15.37 | 20131231 | 70,933 |
| Devon Energy Corporation | 61.87 | 20131231 | 1,048,944 |
| DirecTV Group Inc. | 69.06 | 20131231 | 1,447,429 |
| Discover Financial Services | 55.95 | 20131231 | 1,030,431 |
| Dominion Resources, Inc. | 64.69 | 20131231 | 1,443,169 |
| Dover Corporation | 96.54 | 20131231 | 688,909 |
| Dow Chemical Company | 44.40 | 20131231 | 1,573,980 |
| Dr Pepper Snapple Group, Inc. | 48.72 | 20131231 | 474,289 |
| DTE Energy Company | 66.39 | 20131231 | 415,336 |
| Duke Energy Corporation | 69.01 | 20131231 | 1,116,927 |
| Dun & Bradstreet Corporation | 122.75 | 20131231 | 253,970 |
| Dynegy Inc. | 21.52 | 20131231 | 689 |
| E*TRADE Financial Corporation | 19.64 | 20131231 | 42,422 |
| E. I. du Pont de Nemours and Company | 64.97 | 20131231 | 2,249,781 |
| Eastman Chemical Company | 80.70 | 20131231 | 449,338 |
| Eastman Kodak Company | 0.06 | 20130830 | 567 |
| Eaton Corp. | 76.12 | 20131231 | 963,375 |
| eBay Inc. | 54.87 | 20131231 | 2,258,353 |
| Ecolab Inc. | 104.27 | 20131231 | 670,873 |
| Edison International | 46.30 | 20131231 | 578,889 |
| El Paso Corp. | 28.75 | 20120524 | 773,634 |
| Electronic Arts Inc. | 22.94 | 20131231 | 282,483 |
| Eli Lilly and Company | 51.00 | 20131231 | 1,958,145 |
| Embarq Corp. | 42.06 | 20090630 | 229,395 |
| EMC Corporation | 25.15 | 20131231 | 1,969,597 |
| Emerson Electric Co. | 70.18 | 20131231 | 2,065,819 |
| Ensco plc | 57.18 | 20131231 | 311,174 |
| Entergy Corporation | 63.27 | 20131231 | 459,720 |
| EOG Resources, Inc. | 83.92 | 20131231 | 1,607,488 |
| Equifax Inc. | 69.09 | 20131231 | 334,879 |
| Equitable Resources Inc. | 89.78 | 20131231 | 450,875 |
| Equity Residential | 51.87 | 20131231 | 541,471 |
| Estee Lauder Companies Inc. Class A | 75.32 | 20131231 | 669,745 |
| Exelon Corporation | 27.39 | 20131231 | 691,543 |
| Expedia, Inc. | 69.66 | 20131231 | 279,964 |
| Expeditors International of Washington, Inc. | 44.25 | 20131231 | 360,107 |
| Express Scripts Holding Company | 70.24 | 20131231 | 1,334,068 |
| Exxon Mobil Corporation | 101.20 | 20131231 | 19,754,340 |
| Family Dollar Stores, Inc. | 64.97 | 20131231 | 348,369 |
| Fastenal Company | 47.51 | 20131231 | 471,204 |
| Federated Investors, Inc. Class B | 28.80 | 20131231 | 97,891 |
| FedEx Corporation | 143.77 | 20131231 | 1,717,189 |
| Fidelity National Information Services, Inc. | 53.68 | 20131231 | 391,381 |
| Fifth Third Bancorp | 21.03 | 20131231 | 466,046 |
| First Horizon National Corporation | 11.65 | 20131231 | 104,978 |
| FirstEnergy Corp. | 32.98 | 20131231 | 385,800 |
| Fiserv, Inc. | 59.05 | 20131231 | 725,843 |
| Flowserve Corporation | 78.83 | 20131231 | 513,104 |
| Fluor Corporation | 80.29 | 20131231 | 559,220 |
| Ford Motor Company | 15.43 | 20131231 | 1,414,499 |
| Forest Laboratories, Inc. | 60.03 | 20131231 | 694,247 |
| Fortune Brands Inc. | 68.06 | 20131231 | 391,549 |
| FPL Group Inc. | 85.62 | 20131231 | 1,342,950 |
| Franklin Resources, Inc. | 57.73 | 20131231 | 1,005,310 |
| Freeport-McMoRan, Inc. | 37.74 | 20131231 | 1,093,894 |
| Frontier Communications Corporation Class B | 4.65 | 20131231 | 55,554 |
| GameStop Corp. Class A | 49.26 | 20131231 | 309,599 |
| Gannett Co., Inc. | 29.58 | 20131231 | 258,943 |
| Gap, Inc. | 39.08 | 20131231 | 699,298 |

APPENDIX 3-continued

Example MMACC embodiments (liquidation Dec. 31, 2013)
2008 Tranche - 5 Year Maturity
Liquidation (Dec. 31, 2013)

| Company Name | Y5 Ending Valuation Price | As Of:** | Y5 $ MV |
|---|---|---|---|
| General Dynamics Corporation | 95.55 | 20131231 | 1,429,428 |
| General Electric Company | 28.03 | 20131231 | 11,297,912 |
| General Mills, Inc. | 49.91 | 20131231 | 1,279,942 |
| General Motors Corporation | 0.04 | 20110331 | 989 |
| Genuine Parts Company | 83.19 | 20131231 | 508,956 |
| Genworth Financial, Inc. Class A | 15.53 | 20131231 | 258,124 |
| Genzyme Corp. | 76.25 | 20110408 | 791,551 |
| Gilead Sciences, Inc. | 75.10 | 20131231 | 5,302,361 |
| Goldman Sachs Group, Inc. | 177.26 | 20131231 | 3,007,925 |
| Goodrich Corp. | 127.48 | 20120726 | 602,216 |
| Goodyear Tire & Rubber Company | 23.85 | 20131231 | 220,851 |
| Google Inc. Class A | 560.90 | 20131231 | 10,287,980 |
| Graham Holdings Co. | 663.32 | 20131231 | 152,564 |
| H&R Block, Inc. | 29.04 | 20131231 | 377,723 |
| H. J. Heinz Company | 72.49 | 20130607 | 874,737 |
| Halliburton Company | 50.75 | 20131231 | 1,740,624 |
| Harley-Davidson, Inc. | 69.24 | 20131231 | 618,659 |
| Harman International Industries, Incorporated | 81.85 | 20131231 | 183,917 |
| Harris Corporation | 69.81 | 20131231 | 360,569 |
| Hartford Financial Services Group, Inc. | 36.23 | 20131231 | 418,891 |
| Hasbro, Inc. | 55.01 | 20131231 | 261,518 |
| HCP, Inc. | 36.32 | 20131231 | 352,159 |
| Hershey Company | 97.23 | 20131231 | 618,869 |
| Hess Corporation | 83.00 | 20131231 | 903,538 |
| Hewlett-Packard Company | 27.98 | 20131231 | 2,629,700 |
| Home Depot, Inc. | 82.34 | 20131231 | 5,357,287 |
| Honeywell International Inc. | 91.37 | 20131231 | 2,546,573 |
| Hospira, Inc. | 41.28 | 20131231 | 252,840 |
| Host Hotels & Resorts, Inc. | 19.44 | 20131231 | 389,830 |
| Hudson City Bancorp, Inc. | 9.43 | 20131231 | 188,628 |
| Humana Inc. | 103.22 | 20131231 | 668,246 |
| Huntington Bancshares Incorporated | 9.65 | 20131231 | 135,554 |
| Illinois Tool Works Inc. | 84.08 | 20131231 | 1,269,944 |
| IMS Health Inc. | 21.98 | 20100225 | 153,398 |
| Ingersoll-Rand Plc | 61.60 | 20131231 | 753,553 |
| Integrys Energy Group, Inc. | 54.41 | 20131231 | 159,585 |
| Intel Corporation | 25.96 | 20131231 | 5,539,913 |
| IntercontinentalExchange, Inc. | 224.92 | 20131231 | 623,478 |
| International Business Machines Corporation | 187.57 | 20131231 | 9,670,172 |
| International Flavors & Fragrances Inc. | 85.98 | 20131231 | 259,488 |
| International Game Technology | 18.16 | 20131231 | 205,371 |
| International Paper Company | 49.03 | 20131231 | 804,435 |
| Interpublic Group of Companies, Inc. | 17.70 | 20131231 | 323,680 |
| Intuit Inc. | 76.32 | 20131231 | 937,362 |
| Intuitive Surgical, Inc. | 384.08 | 20131231 | 576,504 |
| Invesco Ltd. | 36.40 | 20131231 | 537,737 |
| ITT Corporation | 43.42 | 20131231 | 151,275 |
| J. C. Penney Company, Inc. | 9.15 | 20131231 | 78,013 |
| J. M. Smucker Company | 103.62 | 20131231 | 470,953 |
| Jabil Circuit, Inc. | 17.44 | 20131231 | 140,985 |
| Jacobs Engineering Group Inc. | 62.99 | 20131231 | 296,998 |
| Janus Capital Group Inc. | 12.37 | 20131231 | 74,937 |
| JDS Uniphase Corporation | 12.99 | 20131231 | 109,554 |
| Johnson & Johnson | 91.59 | 20131231 | 9,751,953 |
| Johnson Controls, Inc. | 51.30 | 20131231 | 1,169,743 |
| Jones Apparel Group Inc. | 14.96 | 20131231 | 47,887 |
| JPMorgan Chase & Co. | 58.48 | 20131231 | 8,376,091 |
| Juniper Networks, Inc. | 22.57 | 20131231 | 457,268 |
| KB Home | 18.28 | 20131231 | 52,811 |
| Kellogg Company | 61.07 | 20131231 | 590,425 |
| KeyCorp | 13.42 | 20131231 | 254,926 |
| Kimberly-Clark Corporation | 104.46 | 20131231 | 1,658,616 |
| Kimco Realty Corporation | 19.75 | 20131231 | 173,563 |
| King Pharmaceuticals | 14.24 | 20110228 | 134,696 |
| KLA-Tencor Corporation | 64.46 | 20131231 | 417,701 |
| Kohl's Corporation | 56.75 | 20131231 | 663,635 |
| Kraft Foods Inc. | 35.30 | 20131231 | 1,990,143 |
| Kroger Co. | 39.53 | 20131231 | 989,792 |
| L-3 Communications Holdings, Inc. | 106.86 | 20131231 | 489,633 |
| Laboratory Corporation of America Holdings | 91.37 | 20131231 | 378,729 |
| Legg Mason, Inc. | 43.48 | 20131231 | 236,792 |
| Leggett & Platt, Incorporated | 30.94 | 20131231 | 185,454 |

APPENDIX 3-continued

Example MMACC embodiments (liquidation Dec. 31, 2013)
2008 Tranche - 5 Year Maturity
Liquidation (Dec. 31, 2013)

| Company Name | Y5 Ending Valuation Price | As Of:** | Y5 $ MV |
|---|---:|---:|---:|
| Lennar Corporation Class A | 39.56 | 20131231 | 214,494 |
| Leucadia National Corporation | 28.34 | 20131231 | 192,485 |
| Lexmark International, Inc. Class A | 35.52 | 20131231 | 106,880 |
| Life Technologies Corporation | 75.80 | 20131231 | 501,948 |
| Limited Brands Inc. | 61.85 | 20131231 | 642,250 |
| Lincoln National Corporation | 51.62 | 20131231 | 506,857 |
| Linear Technology Corporation | 45.55 | 20131231 | 387,585 |
| Lockheed Martin Corporation | 148.66 | 20131231 | 1,899,280 |
| Loews Corporation | 48.24 | 20131231 | 670,054 |
| Lorillard, Inc. | 50.68 | 20131231 | 980,607 |
| Lowe's Companies, Inc. | 49.55 | 20131231 | 2,786,989 |
| LSI Corporation | 11.04 | 20131231 | 273,182 |
| M&T Bank Corporation | 116.42 | 20131231 | 344,952 |
| Macy's Inc | 53.40 | 20131231 | 861,823 |
| Manitowoc Company, Inc. | 23.32 | 20131231 | 116,647 |
| Marathon Oil Corporation | 35.30 | 20131231 | 955,818 |
| Marriott International, Inc. Class A | 49.35 | 20131231 | 561,466 |
| Marsh & McLennan Companies, Inc. | 48.36 | 20131231 | 954,046 |
| Marshall & Ilsley | 7.90 | 20110705 | 78,913 |
| Masco Corporation | 22.77 | 20131231 | 314,476 |
| Massey Energy Co. | 65.14 | 20110601 | 212,812 |
| MasterCard Incorporated Class A | 83.55 | 20131231 | 2,320,323 |
| Mattel, Inc. | 47.58 | 20131231 | 654,463 |
| MBIA Inc. | 11.94 | 20131231 | 86,314 |
| McAfee | 47.95 | 20110228 | 280,891 |
| McCormick & Company, Incorporated | 68.92 | 20131231 | 343,842 |
| McDonald's Corporation | 97.03 | 20131231 | 4,150,070 |
| McGraw Hill Financial, Inc. | 78.20 | 20131231 | 943,796 |
| McKesson Corporation | 161.40 | 20131231 | 1,708,903 |
| MeadWestvaco Corporation | 36.93 | 20131231 | 242,076 |
| Medco Health Solutions | 70.30 | 20120330 | 1,343,574 |
| Medtronic, Inc. | 57.39 | 20131231 | 2,462,720 |
| Memc Electronic Materials Inc. | 13.05 | 20131231 | 112,400 |
| Merck & Co., Inc. | 50.05 | 20131231 | 4,060,657 |
| Meredith Corporation | 51.80 | 20131231 | 71,847 |
| MetLife, Inc. | 53.92 | 20131231 | 1,642,080 |
| Microchip Technology Incorporated | 44.75 | 20131231 | 312,355 |
| Micron Technology, Inc. | 21.75 | 20131231 | 637,493 |
| Microsoft Corporation | 37.41 | 20131231 | 10,982,716 |
| Millipore Corp | 106.95 | 20100714 | 226,734 |
| Molex Incorporated | 38.68 | 20131209 | 209,038 |
| Molson Coors Brewing Company Class B | 56.15 | 20131231 | 320,729 |
| Monsanto Company | 116.55 | 20131231 | 2,450,697 |
| Monster Worldwide, Inc. | 7.13 | 20131231 | 33,718 |
| Moody's Corporation | 78.47 | 20131231 | 584,915 |
| Morgan Stanley | 31.36 | 20131231 | 1,278,046 |
| Motorola Inc. | 67.50 | 20131231 | 838,688 |
| Murphy Oil Corporation | 64.88 | 20131231 | 474,273 |
| Mylan Inc. | 43.40 | 20131231 | 507,476 |
| Nabors Industries Ltd. | 16.99 | 20131231 | 185,548 |
| NASDAQ OMX Group, Inc. | 39.80 | 20131231 | 207,915 |
| National Oilwell Varco, Inc. | 79.53 | 20131231 | 1,273,673 |
| National Semiconductor Corp | 24.99 | 20110923 | 187,075 |
| NetApp, Inc. | 41.14 | 20131231 | 521,244 |
| New York Times Company Class A | 15.87 | 20131231 | 70,939 |
| Newell Rubbermaid Inc. | 32.41 | 20131231 | 344,778 |
| Newmont Mining Corporation | 23.03 | 20131231 | 401,505 |
| News Corp. ClA | 35.17 | 20131231 | 3,104,104 |
| Nicor Inc | 54.84 | 20111209 | 95,093 |
| NIKE, Inc. Class B | 78.64 | 20131231 | 2,367,929 |
| NiSource Inc. | 32.88 | 20131231 | 346,029 |
| Noble Corp. | 37.47 | 20131231 | 379,534 |
| Noble Energy, Inc. | 68.11 | 20131231 | 903,002 |
| Nordstrom, Inc. | 61.80 | 20131231 | 377,969 |
| Norfolk Southern Corporation | 92.83 | 20131231 | 1,319,114 |
| Northern Trust Corporation | 61.89 | 20131231 | 529,717 |
| Northrop Grumman Corporation | 114.61 | 20131231 | 1,437,897 |
| Novell, Inc. | 6.10 | 20110427 | 80,806 |
| Novellus Systems Inc. | 40.39 | 20120604 | 151,382 |
| Nucor Corporation | 53.38 | 20131231 | 643,122 |
| NVIDIA Corporation | 16.02 | 20131231 | 330,172 |
| NYSE Euronext | 45.29 | 20131112 | 460,554 |

APPENDIX 3-continued

Example MMACC embodiments (liquidation Dec. 31, 2013)
2008 Tranche - 5 Year Maturity
Liquidation (Dec. 31, 2013)

| Company Name | Y5 Ending Valuation Price | As Of:** | Y5 $ MV |
|---|---|---|---|
| Occidental Petroleum Corporation | 95.10 | 20131231 | 2,955,613 |
| Office Depot, Inc. | 5.29 | 20131231 | 55,804 |
| Omnicom Group Inc | 74.37 | 20131231 | 887,011 |
| Oracle Corporation | 38.26 | 20131231 | 5,751,626 |
| PACCAR Inc | 59.17 | 20131231 | 823,528 |
| Pactiv Corp | 33.23 | 20101116 | 167,546 |
| Pall Corporation | 85.35 | 20131231 | 386,721 |
| Parker-Hannifin Corporation | 128.64 | 20131231 | 795,510 |
| Patterson Companies, Inc. | 41.20 | 20131231 | 144,159 |
| Paychex, Inc. | 45.53 | 20131231 | 561,066 |
| Peabody Energy Corporation | 19.53 | 20131231 | 199,831 |
| People's United Financial, Inc. | 15.12 | 20131231 | 201,792 |
| Pepco Holdings, Inc. | 19.13 | 20131231 | 158,722 |
| Pepsi Bottling | 38.23 | 20100226 | 198,261 |
| PepsiCo, Inc. | 82.94 | 20131231 | 4,943,307 |
| PerkinElmer, Inc. | 41.23 | 20131231 | 186,854 |
| Pfizer Inc. | 30.63 | 20131231 | 7,925,849 |
| PG&E Corporation | 40.28 | 20131231 | 557,999 |
| Philip Morris International Inc. | 87.13 | 20131231 | 6,764,250 |
| Pinnacle West Capital Corporation | 52.92 | 20131231 | 204,747 |
| Pioneer Natural Resources Company | 184.07 | 20131231 | 831,260 |
| Pitney Bowes Inc. | 23.30 | 20131231 | 184,303 |
| Plum Creek Timber Company, Inc. | 46.51 | 20131231 | 297,711 |
| PNC Financial Services Group, Inc. | 77.58 | 20131231 | 1,036,469 |
| Polo Ralph Lauren Corp. | 176.57 | 20131231 | 381,215 |
| PPG Industries, Inc. | 189.66 | 20131231 | 1,195,237 |
| PPL Corporation | 30.09 | 20131231 | 433,025 |
| Praxair, Inc. | 130.03 | 20131231 | 1,538,905 |
| Precision Castparts Corp. | 269.30 | 20131231 | 1,440,755 |
| Principal Financial Group, Inc. | 49.31 | 20131231 | 490,733 |
| Procter & Gamble Company | 81.41 | 20131231 | 9,327,714 |
| Progress Energy Inc. | 60.82 | 20120702 | 614,039 |
| Progressive Corporation | 27.27 | 20131231 | 707,029 |
| Prologis | 15.21 | 20110602 | 155,066 |
| Prudential Financial, Inc. | 92.22 | 20131231 | 1,500,512 |
| Public Service Enterprise Group Incorporated | 32.04 | 20131231 | 622,281 |
| Public Storage | 150.52 | 20131231 | 724,152 |
| PulteGroup, Inc. | 20.37 | 20131231 | 167,054 |
| QLogic Corporation | 11.83 | 20131231 | 58,073 |
| QUALCOMM Incorporated | 74.25 | 20131231 | 4,717,028 |
| Quest Diagnostics Incorporated | 53.54 | 20131231 | 325,523 |
| Questar Corporation | 22.99 | 20131231 | 153,021 |
| Qwest Communications International Inc | 6.83 | 20110331 | 383,969 |
| R.R. Donnelley & Sons Company | 20.28 | 20131231 | 159,543 |
| RadioShack Corporation | 2.60 | 20131231 | 12,480 |
| Range Resources Corporation | 84.31 | 20131231 | 502,572 |
| Raytheon Company | 90.70 | 20131231 | 1,441,223 |
| Regions Financial Corporation | 9.89 | 20131231 | 262,619 |
| Republic Services, Inc. | 33.20 | 20131231 | 409,024 |
| Reynolds American Inc. | 49.99 | 20131231 | 648,570 |
| Robert Half International Inc. | 41.99 | 20131231 | 250,008 |
| Rockwell Automation, Inc. | 118.16 | 20131231 | 641,609 |
| Rockwell Collins, Inc. | 73.92 | 20131231 | 449,064 |
| Rohm & Haas Co. | 78.94 | 20090401 | 378,438 |
| Rowan Cos. Plc Class A | 35.36 | 20131231 | 153,321 |
| Ryder System, Inc. | 73.78 | 20131231 | 157,447 |
| Safeway Inc. | 32.57 | 20131231 | 535,809 |
| salesforce.com, inc. | 55.19 | 20131231 | 888,835 |
| SanDisk Corporation | 70.54 | 20131231 | 611,864 |
| Sara Lee Corp. | 33.44 | 20131231 | 181,445 |
| Schering-Plough Corp. | 28.15 | 20091103 | 1,756,053 |
| Schlumberger NV | 90.11 | 20131231 | 4,136,319 |
| Scripps Networks Interactive, Inc. Class A | 86.41 | 20131231 | 298,633 |
| Sealed Air Corporation | 34.05 | 20131231 | 206,275 |
| Sears Holdings Corporation | 49.04 | 20131231 | 104,700 |
| Sempra Energy | 89.76 | 20131231 | 839,166 |
| Sherwin-Williams Company | 183.50 | 20131231 | 691,428 |
| Sigma-Aldrich Corporation | 94.01 | 20131231 | 452,282 |
| Simon Property Group, Inc. | 152.16 | 20131231 | 1,349,964 |
| SLM Corp | 26.28 | 20131231 | 471,253 |
| Smith International | 38.84 | 20100827 | 326,217 |
| Snap-on Incorporated | 109.52 | 20131231 | 241,382 |

APPENDIX 3-continued

Example MMACC embodiments (liquidation Dec. 31, 2013)
2008 Tranche - 5 Year Maturity
Liquidation (Dec. 31, 2013)

| Company Name | Y5 Ending Valuation Price | As Of:** | Y5 $ MV |
|---|---|---|---|
| Southern Company | 41.11 | 20131231 | 1,221,995 |
| Southwest Airlines Co. | 18.84 | 20131231 | 534,811 |
| Southwestern Energy Company | 39.33 | 20131231 | 518,173 |
| Sovereign Bancorp Inc. | 2.47 | 20090129 | 51,606 |
| Spectra Energy Corp | 35.62 | 20131231 | 835,253 |
| Sprint Nextel Corporation | 7.18 | 20130710 | 787,143 |
| St. Jude Medical, Inc. | 61.95 | 20131231 | 818,236 |
| Staples, Inc. | 15.89 | 20131231 | 435,005 |
| Starbucks Corporation | 78.39 | 20131231 | 2,212,558 |
| Starwood Hotels & Resorts Worldwide, Inc. | 79.45 | 20131231 | 558,057 |
| State Street Corporation | 73.39 | 20131231 | 1,216,513 |
| Stericycle, Inc. | 116.17 | 20131231 | 381,502 |
| Stryker Corporation | 75.14 | 20131231 | 698,501 |
| Sun Microsystems | 9.49 | 20100126 | 268,975 |
| Sunoco Inc. | 46.75 | 20121004 | 209,674 |
| SunTrust Banks, Inc. | 36.81 | 20131231 | 500,211 |
| SUPERVALU INC. | 7.29 | 20131231 | 59,239 |
| Symantec Corporation | 23.58 | 20131231 | 756,494 |
| Sysco Corporation | 36.10 | 20131231 | 830,011 |
| T. Rowe Price Group | 83.77 | 20131231 | 830,663 |
| Target Corporation | 63.27 | 20131231 | 1,827,744 |
| TECO Energy, Inc. | 17.24 | 20131231 | 140,782 |
| Tellabs, Inc. | 2.44 | 20131203 | 37,269 |
| Tenet Healthcare Corporation | 42.12 | 20131231 | 167,764 |
| Teradata Corporation | 45.49 | 20131231 | 307,239 |
| Teradyne, Inc. | 17.62 | 20131231 | 114,460 |
| Tesoro Corporation | 58.50 | 20131231 | 310,811 |
| Texas Instruments Incorporated | 43.91 | 20131231 | 2,184,567 |
| Textron Inc. | 36.76 | 20131231 | 340,104 |
| The Stanley Works | 80.69 | 20131231 | 244,007 |
| Thermo Fisher Scientific Inc. | 111.35 | 20131231 | 1,795,630 |
| Tiffany & Co. | 92.78 | 20131231 | 438,293 |
| Time Warner Inc. | 69.72 | 20131231 | 3,199,451 |
| Titanium Metals Corp. | 16.50 | 20130107 | 53,889 |
| TJX Companies, Inc. | 63.73 | 20131231 | 2,036,428 |
| Torchmark Corporation | 52.10 | 20131231 | 382,518 |
| Total System Services, Inc. | 33.28 | 20131231 | 251,364 |
| Travelers Companies, Inc. | 90.54 | 20131231 | 2,030,903 |
| Tyco Electronics Ltd. | 55.11 | 20131231 | 967,787 |
| Tyco International Ltd. | 41.04 | 20131231 | 744,835 |
| Tyson Foods, Inc. Class A | 33.46 | 20131231 | 387,902 |
| U.S. Bancorp | 40.40 | 20131231 | 2,720,213 |
| Union Pacific Corporation | 84.00 | 20131231 | 3,264,996 |
| United Parcel Service, Inc. Class B | 105.08 | 20131231 | 4,013,005 |
| United States Steel Corporation | 29.50 | 20131231 | 131,600 |
| United Technologies Corporation | 113.80 | 20131231 | 4,151,424 |
| United Health Group Incorporated | 75.30 | 20131231 | 3,490,155 |
| Unum Group | 35.08 | 20131231 | 445,762 |
| UST Inc. | 69.46 | 20090105 | 395,575 |
| V.F. Corporation | 62.34 | 20131231 | 842,650 |
| Valero Energy Corporation | 50.40 | 20131231 | 998,021 |
| Varian Medical Systems, Inc. | 77.69 | 20131231 | 370,426 |
| VeriSign, Inc. | 59.78 | 20131231 | 445,122 |
| Verizon Communications Inc. | 49.14 | 20131231 | 5,356,457 |
| Viacom Inc. Class B | 87.34 | 20131231 | 2,056,333 |
| Vornado Realty Trust | 88.79 | 20131231 | 468,101 |
| Vulcan Materials Company | 59.42 | 20131231 | 251,168 |
| W.W. Grainger, Inc. | 255.42 | 20131231 | 633,697 |
| Walgreen Co. | 57.44 | 20131231 | 2,181,973 |
| Wal-Mart Stores, Inc. | 78.69 | 20131231 | 6,751,681 |
| Walt Disney Company | 76.40 | 20131231 | 5,426,922 |
| Waste Management, Inc. | 44.87 | 20131231 | 844,723 |
| Waters Corporation | 100.00 | 20131231 | 377,300 |
| Watson Pharmaceuticals Inc. | 168.00 | 20131231 | 674,352 |
| Weatherford International Ltd. | 15.49 | 20131231 | 404,862 |
| WellPoint, Inc. | 92.39 | 20131231 | 1,804,746 |
| Wells Fargo & Company | 45.40 | 20131231 | 6,602,568 |
| Western Union Company | 17.25 | 20131231 | 473,685 |
| Weyerhaeuser Company | 31.57 | 20131231 | 648,290 |
| Whirlpool Corporation | 156.86 | 20131231 | 442,502 |
| Whole Foods Market, Inc. | 57.83 | 20131231 | 622,771 |
| Williams Companies, Inc. | 38.57 | 20131231 | 856,524 |

APPENDIX 3-continued

Example MMACC embodiments (liquidation Dec. 31, 2013)
2008 Tranche - 5 Year Maturity
Liquidation (Dec. 31, 2013)

| Company Name | Y5 Ending Valuation Price | As Of:** | Y5 $ MV |
|---|---|---|---|
| Windstream Corp. | 7.98 | 20131231 | 134,567 |
| Wisconsin Energy Corporation | 41.34 | 20131231 | 370,985 |
| Wyeth | 50.39 | 20091015 | 2,574,728 |
| Wyndham Worldwide Corporation | 73.69 | 20131231 | 501,460 |
| Wynn Resorts, Limited | 194.21 | 20131231 | 459,112 |
| Xcel Energy Inc. | 27.94 | 20131231 | 481,462 |
| Xerox Corporation | 12.17 | 20131231 | 404,251 |
| Xilinx, Inc. | 45.92 | 20131231 | 482,665 |
| XL Capital Ltd. | 31.84 | 20131231 | 404,177 |
| XTO Energy Inc | 41.81 | 20100625 | 925,464 |
| Yahoo! Inc. | 40.44 | 20131231 | 2,153,592 |
| YUM! Brands, Inc. | 75.61 | 20131231 | 1,342,153 |
| Zimmer Holdings, Inc. | 93.19 | 20131231 | 803,111 |
| Zions Bancorporation | 29.96 | 20131231 | 132,603 |

\* - Split adjusted for consistency
\*\*Companies that stop trading have their cash balances carried forward

What is claimed is:

1. A processor-readable non-transient value stream user interface component medium storing processor-issuable instructions, for access by a processor-executable program component to provide a(n) datastructure value stream, comprising:

a processor-operable capital structure component interaction-interface stored in the medium, the interaction-interface having a plurality of interaction-interface mechanisms, wherein the processor-issuable instructions embody the interaction-interface mechanisms and associated data, including:

a specification interface mechanism to specify a capital structure component class for a capital structure component data structure;

an interaction interface mechanism to specify slice type subcomponents of the capital structure component data structure including:

income generation components, growth and income generation components, and a capital appreciation component(s);

a widget interface mechanism to initiate generation of a value stream data structure, wherein engagement of the widget interface:

effectuates population of the capital structure component data structure, effectuates population of each slice type subcomponent with assets according to the specification of the slice type subcomponent and according to the specified capital structure component type value stream data structure, instantiates the value stream data structure and associates the value stream data structure to the values in the capital structure component data structure; and a stream value interface for reading stream values of the value stream data structure;

and a display region for display of any the mechanisms.

2. The processor-readable non-transient value stream user interface component medium of claim 1 storing processor-issuable instructions for allocating a portion of each of a plurality of a stock's return to different funds, said different funds being correlated to said income generation component, said growth and income generation component, and said capital appreciation component.

3. The processor-readable non-transient value stream user interface component medium storing processor-issuable instructions of claim 1, wherein the stream value interface may stream various equity component constituents and assessing appropriate allocation to said income generation component, said growth and income generation component, and said capital appreciation component.

4. The processor-readable non-transient value stream user interface component medium storing processor-issuable instructions of claim 1, wherein the capital appreciation component comprises one or more of a UIT allocation sub-component, a CLO and CEO allocation sub-component and an ETF sub-component.

5. The processor-readable non-transient value stream user interface component medium storing processor-issuable instructions of claim 1, wherein the preferred share class component comprises one or more of an income share class sub-component and a growth and income sub-component.

6. The processor-readable non-transient MMACC medium storing processor-issuable instructions of claim 1, wherein the common share class component comprises a capital appreciation share class sub-component.

\* \* \* \* \*